US012329700B2

(12) United States Patent
Lafleche et al.

(10) Patent No.: US 12,329,700 B2
(45) Date of Patent: Jun. 17, 2025

(54) PATIENT/INVALID HANDLING SUPPORT WITH IMMERSION SENSING

(71) Applicant: Stryker Corporation, Kalamazoo, MI (US)

(72) Inventors: Patrick Lafleche, Kalamazoo, MI (US); Jean-Francois Girard, Trois-Riviéres (CA); Sylvain LaCasse, Saint-Romuald (CA)

(73) Assignee: Stryker Corporation, Portage, MI (US)

( * ) Notice: Subject to any disclaimer, the term of this patent is extended or adjusted under 35 U.S.C. 154(b) by 80 days.

(21) Appl. No.: 17/838,790

(22) Filed: Jun. 13, 2022

(65) Prior Publication Data

US 2022/0304877 A1 Sep. 29, 2022

Related U.S. Application Data

(63) Continuation of application No. 17/233,865, filed on Apr. 19, 2021, now Pat. No. 12,213,926, which is a (Continued)

(51) Int. Cl.
*A61G 7/057* (2006.01)
*A61H 9/00* (2006.01)
(Continued)

(52) U.S. Cl.
CPC ..... *A61G 7/05776* (2013.01); *A61G 7/05715* (2013.01); *A61G 7/05761* (2013.01); (Continued)

(58) Field of Classification Search
CPC ........ A61G 2005/1045; A61G 7/05769; A61G 7/05776; A47C 27/08; A47C 27/081; A47C 27/082; A47C 27/10
See application file for complete search history.

(56) References Cited

U.S. PATENT DOCUMENTS 611,585 A * 9/1898 Andres ................ A47C 27/081 5/706
2,491,557 A 12/1949 Goolsbee
(Continued)

FOREIGN PATENT DOCUMENTS

DE 102006028665 A1 12/2007
EP 0296689 A1 12/1988
(Continued)

OTHER PUBLICATIONS

PCT International Search Report for Application No. PCT/US2012/046685 filed Jul. 13, 2012.
(Continued)

*Primary Examiner* — Eric J Kurilla
(74) *Attorney, Agent, or Firm* — Warner Norcross + Judd LLP

(57) ABSTRACT

A patient support includes a mattress with an inflatable bladder, where the inflatable bladder has a cavity and an upper bladder wall forming an outwardly facing side for facing and supporting the patient on the patient mattress and forming an inwardly facing side facing into the cavity. The patient support further includes a light transmitter operable to emit light through the cavity to impinge on the inwardly facing side of the upper bladder wall and a light receiver operable to detect a reflection of the light off the inwardly facing side of the bladder wall, with the light receiver generating a signal responsive to detecting the reflection. A controller is in communication with the light transmitter and is operable to determine immersion of a patient into the mattress based on the signal from the light receiver.

20 Claims, 47 Drawing Sheets

Related U.S. Application Data continuation of application No. 15/817,987, filed on Nov. 20, 2017, now Pat. No. 10,987,265, which is a continuation of application No. 13/548,591, filed on Jul. 13, 2012, now Pat. No. 9,820,904.

(60) Provisional application No. 61/507,371, filed on Jul. 13, 2011.

(51) Int. Cl.
*A61H 23/00* (2006.01)
*A61H 23/04* (2006.01)

(52) U.S. Cl.
CPC ....... *A61G 7/05792* (2016.11); *A61H 9/0078* (2013.01); *A61H 23/006* (2013.01); *A61H 23/04* (2013.01); *A61G 2203/16* (2013.01); *A61G 2203/30* (2013.01); *A61G 2203/34* (2013.01); *A61G 2203/42* (2013.01); *A61H 2201/0146* (2013.01); *A61H 2201/0176* (2013.01); *A61H 2201/0184* (2013.01); *A61H 2201/1697* (2013.01); *A61H 2201/5002* (2013.01); *A61H 2201/5038* (2013.01); *A61H 2201/5046* (2013.01); *A61H 2201/5064* (2013.01); *A61H 2201/5092* (2013.01)

(56) References Cited

U.S. PATENT DOCUMENTS 2,575,764 A 11/1951 Morner
D180,063 S 4/1957 Burton et al.
3,192,541 A 7/1965 Moore
3,485,787 A 12/1969 Haefele et al.
3,605,145 A 9/1971 Graebe
3,676,387 A 7/1972 Lindlof
3,827,999 A 8/1974 Crossland
3,870,450 A 3/1975 Graebe
3,889,305 A 6/1975 Goldberg
3,988,790 A 11/1976 Mracek et al.
4,005,236 A 1/1977 Graebe
4,031,579 A 6/1977 Larned
4,259,540 A 3/1981 Sabia
4,279,044 A 7/1981 Douglas
4,351,913 A 9/1982 Patel
4,369,284 A 1/1983 Chen
4,403,356 A 9/1983 Urai
4,422,194 A 12/1983 Viesturs et al.
4,432,607 A 2/1984 Levy
4,483,030 A 11/1984 Flick et al.
4,492,428 A 1/1985 Levy
4,497,538 A 2/1985 Patel
4,509,821 A 4/1985 Stenger
4,541,136 A 9/1985 Graebe
4,618,213 A 10/1986 Chen
4,622,706 A 11/1986 Takeuchi
4,651,369 A 3/1987 Guldager
4,694,515 A 9/1987 Rogers, Jr.
4,698,864 A 10/1987 Graebe
4,709,982 A 12/1987 Corne et al.
4,716,183 A 12/1987 Gamarra et al.
4,722,105 A 2/1988 Douglas
4,798,853 A 1/1989 Handlin, Jr.
4,843,664 A 7/1989 Farnworth et al.
4,852,195 A 8/1989 Schulamn
4,860,397 A 8/1989 Gusakov
4,942,270 A 7/1990 Gamarra
4,944,060 A 7/1990 Peery et al.
4,982,466 A 1/1991 Higgins et al.
4,989,283 A * 2/1991 Krouskop .............. A47C 27/10
5/713
5,020,176 A 6/1991 Dotson
5,052,068 A 10/1991 Graebe
5,105,488 A 4/1992 Hutchinson et al.
5,142,717 A 9/1992 Everard et al.
5,149,736 A 9/1992 Gamarra
5,152,023 A 10/1992 Graebe
5,163,196 A 11/1992 Graebe et al.
5,193,237 A 3/1993 Holdredge
5,239,723 A 8/1993 Chen
5,243,722 A 9/1993 Gusakov
5,262,468 A 11/1993 Chen
5,304,271 A 4/1994 Gusakov
5,331,036 A 7/1994 Kang et al.
5,334,646 A 8/1994 Chen
5,336,708 A 8/1994 Chen
5,360,653 A 11/1994 Ackley
5,369,828 A 12/1994 Graebe
D355,558 S 2/1995 Graebe
5,390,384 A 2/1995 Dinsmoor, III et al.
5,413,837 A 5/1995 Rock et al.
5,444,881 A 8/1995 Landi et al.
5,446,933 A 9/1995 Gabelhouse
5,461,741 A 10/1995 Graebe
5,475,890 A 12/1995 Chen
5,487,196 A 1/1996 Wilkinson et al.
5,501,891 A 3/1996 Saika et al.
5,502,855 A 4/1996 Graebe
5,508,334 A 4/1996 Chen
5,533,220 A 7/1996 Sebag et al.
5,539,942 A 7/1996 Melou
5,551,107 A 9/1996 Graebe
5,558,398 A 9/1996 Santos
5,561,875 A 10/1996 Graebe
5,572,754 A 11/1996 Lazar et al.
5,586,347 A 12/1996 Frischknecht
5,592,706 A 1/1997 Pearce
5,596,781 A 1/1997 Graebe
5,611,096 A 3/1997 Bartlett et al.
5,613,257 A 3/1997 Graebe
5,634,224 A 6/1997 Gates
5,674,513 A 10/1997 Snyder, Jr. et al.
5,689,845 A 11/1997 Sobieralski
5,699,570 A 12/1997 Wilkinson et al.
5,731,062 A 3/1998 Kim et al.
5,749,111 A 5/1998 Pearce
5,794,289 A 8/1998 Wortman et al.
5,797,155 A 8/1998 Maier et al.
5,815,864 A 10/1998 Sloop
5,836,027 A 11/1998 Leventhal et al.
5,870,785 A 2/1999 Hoorens
5,881,409 A 3/1999 Pearce
5,907,878 A 6/1999 Thomas et al.
5,916,664 A 6/1999 Rudy
5,994,450 A 11/1999 Pearce
6,014,783 A 1/2000 Collier et al.
6,026,527 A 2/2000 Pearce
6,036,271 A 3/2000 Wilkinson et al.
6,047,423 A 4/2000 Larson
6,085,369 A 7/2000 Feher
6,092,249 A 7/2000 Kamen et al.
6,099,951 A 8/2000 Flick et al.
6,116,059 A 9/2000 Rock et al.
6,156,406 A 12/2000 Rock et al.
6,182,315 B1 2/2001 Lee
6,197,099 B1 3/2001 Pearce
6,212,719 B1 4/2001 Thomas et al.
6,269,505 B1 8/2001 Wilkinson
6,272,707 B1 8/2001 Robrecht et al.
6,286,167 B1 9/2001 Stolpmann
6,306,112 B2 10/2001 Bird
6,317,912 B1 11/2001 Graebe et al.
6,321,404 B1 11/2001 Tsai
6,370,716 B1 4/2002 Wilkinson
6,413,458 B1 7/2002 Pearce
6,447,865 B1 9/2002 Flick et al.
6,489,000 B1 12/2002 Ogura et al.
6,510,573 B1 1/2003 Grabe
6,519,797 B1 2/2003 Brubaker et al.
6,550,085 B2 4/2003 Roux
6,554,785 B1 4/2003 Sroufe et al.
6,564,410 B2 5/2003 Graebe et al.
6,564,411 B2 5/2003 Pirzada
6,623,080 B2 9/2003 Clapper

(56) References Cited

U.S. PATENT DOCUMENTS

| | | | | |
|---|---|---|---|---|
| 6,626,612 | B2 | 9/2003 | Knapp | |
| 6,644,070 | B2 | 11/2003 | Ikenaga et al. | |
| 6,684,430 | B2 | 2/2004 | Roux | |
| 6,687,933 | B2 | 2/2004 | Habboub et al. | |
| 6,687,936 | B2 | 2/2004 | Graebe et al. | |
| 6,687,937 | B2 | 2/2004 | Harker | |
| 6,691,355 | B1 | 2/2004 | Liu | |
| 6,694,556 | B2 | 2/2004 | Stolpmann | |
| 6,715,171 | B2 | 4/2004 | Grabe | |
| 6,715,174 | B2 | 4/2004 | Tsai | |
| 6,721,979 | B1 | 4/2004 | Vrzalik et al. | |
| 6,735,800 | B1 | 5/2004 | Salvatini et al. | |
| 6,767,621 | B2 * | 7/2004 | Flick | B32B 37/04 5/613 |
| 6,774,067 | B2 | 8/2004 | Demott et al. | |
| 6,813,790 | B2 | 11/2004 | Flick et al. | |
| 6,865,759 | B2 | 3/2005 | Pearce | |
| 6,901,617 | B2 | 6/2005 | Sprouse, II et al. | |
| 6,910,238 | B2 | 6/2005 | Biggie et al. | |
| 6,912,749 | B2 | 7/2005 | Thomas et al. | |
| 6,920,691 | B2 | 7/2005 | Ham | |
| 6,941,602 | B2 | 9/2005 | Brubaker et al. | |
| 6,943,694 | B1 | 9/2005 | Ellis | |
| 6,986,182 | B2 | 1/2006 | Mossbeck | |
| 6,990,701 | B1 | 1/2006 | Litvak | |
| 7,060,213 | B2 | 6/2006 | Pearce | |
| 7,107,642 | B2 | 9/2006 | Wong et al. | |
| 7,127,075 | B2 | 10/2006 | Park | |
| 7,168,116 | B2 | 1/2007 | Reger et al. | |
| 7,191,482 | B2 | 3/2007 | Romano et al. | |
| 7,219,380 | B2 * | 5/2007 | Beck | A61G 7/05776 5/713 |
| 7,278,179 | B2 | 10/2007 | Schneider | |
| 7,296,315 | B2 | 11/2007 | Totton et al. | |
| 7,330,127 | B2 | 2/2008 | Price et al. | |
| 7,406,734 | B1 | 8/2008 | Mai et al. | |
| 7,409,735 | B2 | 8/2008 | Kramer et al. | |
| 7,414,536 | B2 | 8/2008 | Call et al. | |
| 7,426,840 | B2 | 9/2008 | Sytz | |
| 7,434,282 | B2 | 10/2008 | Fraser et al. | |
| 7,434,283 | B2 | 10/2008 | Wilkinson et al. | |
| 7,444,704 | B2 * | 11/2008 | Phillips | G16H 40/63 5/713 |
| 7,451,506 | B2 | 11/2008 | Kummer et al. | |
| 7,469,432 | B2 | 12/2008 | Chambers | |
| 7,469,436 | B2 | 12/2008 | Meyer et al. | |
| 7,480,953 | B2 | 1/2009 | Romano et al. | |
| 7,513,003 | B2 | 4/2009 | Mossbeck | |
| 7,536,739 | B2 | 5/2009 | Poulos | |
| 7,557,718 | B2 | 7/2009 | Petrosenko et al. | |
| 7,565,710 | B2 | 7/2009 | Chambers et al. | |
| 7,587,776 | B2 | 9/2009 | Poulos | |
| 7,610,640 | B2 | 11/2009 | Post | |
| 7,657,956 | B2 | 2/2010 | Stacy et al. | |
| 7,685,664 | B2 | 3/2010 | Stolpmann et al. | |
| 7,698,765 | B2 | 4/2010 | Bobey et al. | |
| D617,131 | S | 6/2010 | Sprouse, II | |
| 7,730,566 | B2 | 6/2010 | Flick et al. | |
| 7,832,039 | B2 | 11/2010 | Chambers et al. | |
| 7,837,270 | B2 | 11/2010 | Eriksson et al. | |
| 7,883,478 | B2 | 2/2011 | Skinner et al. | |
| 7,914,611 | B2 | 3/2011 | Vrzalik et al. | |
| 7,921,488 | B2 | 4/2011 | King et al. | |
| 7,937,789 | B2 | 5/2011 | Feher | |
| 7,937,791 | B2 | 5/2011 | Meyer et al. | |
| 7,964,664 | B2 | 6/2011 | Pearce | |
| 7,966,680 | B2 | 6/2011 | Romano et al. | |
| 7,971,300 | B2 | 7/2011 | Wilker, Jr. | |
| 8,037,563 | B2 | 10/2011 | Richards et al. | |
| 8,397,326 | B2 | 3/2013 | Lafleche et al. | |
| 8,910,334 | B2 * | 12/2014 | Lafleche | A61G 7/05715 5/724 |
| 9,056,037 | B1 | 6/2015 | Thomas | |
| 10,987,265 | B2 * | 4/2021 | Lafleche | A61H 9/0078 |
| 2002/0053108 | A1 | 5/2002 | Goyarts | |
| 2002/0129449 | A1 | 9/2002 | Harker | |
| 2003/0096899 | A1 | 5/2003 | Pearce | |
| 2003/0208849 | A1 | 11/2003 | Wilkinson | |
| 2004/0045090 | A1 | 3/2004 | Tsai | |
| 2004/0226103 | A1 | 11/2004 | Reger et al. | |
| 2004/0238988 | A1 | 12/2004 | Fraser | |
| 2005/0020171 | A1 | 1/2005 | Yoshida et al. | |
| 2005/0050637 | A1 | 3/2005 | Graebe | |
| 2005/0086739 | A1 | 4/2005 | Wu | |
| 2005/0125905 | A1 | 6/2005 | Wilkinson | |
| 2005/0151410 | A1 | 7/2005 | Sprouse, II | |
| 2005/0278852 | A1 | 12/2005 | Wahrmund et al. | |
| 2006/0026767 | A1 | 2/2006 | Chambers et al. | |
| 2006/0112489 | A1 | 6/2006 | Bobey et al. | |
| 2006/0272097 | A1 | 12/2006 | Dionne et al. | |
| 2007/0011813 | A1 | 1/2007 | Rathle | |
| 2007/0032767 | A1 | 2/2007 | Horowitz | |
| 2007/0033738 | A1 | 2/2007 | Tu | |
| 2007/0094806 | A1 | 5/2007 | Beretta | |
| 2007/0163052 | A1 | 7/2007 | Romano et al. | |
| 2007/0212959 | A1 | 9/2007 | Johnson | |
| 2007/0261173 | A1 | 11/2007 | Schlussel | |
| 2007/0266499 | A1 | 11/2007 | O'Keefe et al. | |
| 2007/0271705 | A1 | 11/2007 | Woolfson et al. | |
| 2007/0277320 | A1 | 12/2007 | Massmann | |
| 2008/0047071 | A1 | 2/2008 | Christofferson et al. | |
| 2008/0098532 | A1 | 5/2008 | Gowda | |
| 2008/0115286 | A1 | 5/2008 | Flick et al. | |
| 2008/0127421 | A1 | 6/2008 | Hornbach et al. | |
| 2008/0148481 | A1 | 6/2008 | Brykalski et al. | |
| 2008/0166524 | A1 | 7/2008 | Skaja et al. | |
| 2008/0209638 | A1 | 9/2008 | Unger | |
| 2008/0263776 | A1 | 10/2008 | O'Reagan et al. | |
| 2009/0013470 | A1 | 1/2009 | Richards et al. | |
| 2009/0056030 | A1 | 3/2009 | Bolden | |
| 2009/0106907 | A1 * | 4/2009 | Chambers | A47C 31/006 5/709 |
| 2009/0144906 | A1 | 6/2009 | Satoh et al. | |
| 2009/0217460 | A1 | 9/2009 | Bobey et al. | |
| 2009/0300842 | A1 | 12/2009 | Gendron | |
| 2010/0011502 | A1 | 1/2010 | Brykalski et al. | |
| 2010/0057169 | A1 | 3/2010 | King et al. | |
| 2010/0101026 | A1 | 4/2010 | Papaioannou | |
| 2010/0146709 | A1 | 6/2010 | Lafleche et al. | |
| 2010/0175196 | A1 | 7/2010 | Lafleche et al. | |
| 2010/0205745 | A1 | 8/2010 | Nihei et al. | |
| 2010/0205749 | A1 | 8/2010 | Huang | |
| 2010/0205750 | A1 | 8/2010 | McCausland et al. | |
| 2010/0308846 | A1 | 12/2010 | Camus | |
| 2011/0010855 | A1 | 1/2011 | Flessate | |
| 2011/0010865 | A1 | 1/2011 | Flick et al. | |
| 2011/0094040 | A1 | 4/2011 | deGreef et al. | |
| 2011/0107514 | A1 | 5/2011 | Brykalski et al. | |
| 2011/0289691 | A1 | 12/2011 | Lafleche et al. | |
| 2011/0296624 | A1 | 12/2011 | Lafleche et al. | |
| 2011/0301516 | A1 | 12/2011 | Lafleche et al. | |
| 2011/0302719 | A1 | 12/2011 | Schwirian et al. | |
| 2012/0031800 | A1 | 2/2012 | Nilson et al. | |
| 2012/0060295 | A1 | 3/2012 | Flick et al. | |
| 2012/0090095 | A1 | 4/2012 | Fraser | |
| 2012/0311789 | A1 | 12/2012 | Park et al. | |
| 2013/0061396 | A1 | 3/2013 | Lafleche et al. | |
| 2013/0067662 | A1 | 3/2013 | Jusiak et al. | |
| 2013/0167302 | A1 | 7/2013 | Pearce | |
| 2014/0068869 | A1 | 3/2014 | Lafleche et al. | |
| 2014/0345060 | A1 | 11/2014 | Ribble et al. | |

FOREIGN PATENT DOCUMENTS

| | | | |
|---|---|---|---|
| EP | 0364249 | B1 | 12/1993 |
| JP | 2004097540 | | 4/2004 |
| JP | 2004339652 | | 12/2004 |
| JP | 2005137867 | A | 6/2005 |
| JP | 2006109896 | | 4/2006 |
| KR | 10-0627629 | | 9/2006 |
| KR | 10-2008-0097961 | | 11/2008 |
| WO | 2006132468 | A1 | 12/2006 |
| WO | 2007122664 | A1 | 11/2007 |
| WO | 2008/073326 | A1 | 6/2008 |

(56) References Cited

FOREIGN PATENT DOCUMENTS

| | | | |
|---|---|---|---|
| WO | 2010059849 | A2 | 5/2010 |
| WO | 2010078047 | A2 | 7/2010 |
| WO | 2011097569 | A2 | 8/2011 |
| WO | 2013010086 | A2 | 1/2013 |

OTHER PUBLICATIONS

PCT International Written Opinion for Application No. PCT/US2012/046685 filed Jul. 13, 2012.

* cited by examiner

PATIENT/INVALID HANDLING SUPPORT WITH IMMERSION SENSING

CROSS-REFERENCE TO RELATED APPLICATION

This application is a continuation of U.S. Ser. No. 17/233,865, filed Apr. 19, 2021 (P-376C), entitled PATIENT/INVALID HANDLING SUPPORT, which is a continuation U.S. Ser. No. 15/817,987, filed Nov. 20, 2017 (P-376B), now U.S. Pat. No. 10,987,265, entitled PATIENT/INVALID HANDLING SUPPORT, which is a continuation of U.S. Ser. No. 13/548,591, filed Jul. 13, 2012 (STR03A P376A), now U.S. Pat. No. 9,820,904, entitled PATIENT/INVALID HANDLING SUPPORT, which claims the benefit of U.S. provisional application Ser. No. 61/507,371, filed Jul. 13, 2011 (STR03A P376), entitled PATIENT/INVALID HANDLING SUPPORT. This application is related to U.S. application Ser. No. 13/022,326, filed Feb. 7, 2011 (P257A), now U.S. Pat. No. 8,911,387, entitled PATIENT/INVALID HANDLING SUPPORT; U.S. application Ser. No. 13/022,372, filed Feb. 7, 2011 (P257B), now U.S. Pat. No. 8,397,326, entitled PATIENT/INVALID HANDLING SUPPORT; U.S. application Ser. No. 13/022,382, filed Feb. 7, 2011 (P257C), now U.S. Pat. No. 8,832,885, entitled PATIENT/INVALID HANDLING SUPPORT; U.S. application Ser. No. 13/022,454, filed Feb. 7, 2011 (P257D), now U.S. Pat. No. 8,856,992, entitled PATIENT/INVALID HANDLING SUPPORT, which are incorporated by reference herein in their entireties.

TECHNICAL FIELD AND BACKGROUND OF THE INVENTION

The present invention generally relates to a patient support, and more particularly to a patient mattress for a hospital bed.

SUMMARY OF THE INVENTION

The present invention provides a mattress for supporting a patient with a layer that provides immersion and pressure distribution to a patient supported on the mattress.

In one form of the invention, a patient mattress for supporting a patient includes a plurality of inflatable bladders, which provide patient facing side for supporting the patient on the patient mattress. Each bladder is formed from a gelatinous elastomeric sheet and joined together to form a matrix of bladders, with at least a first group of the bladders in fluid communication with each other through channels formed by the gelatinous elastomeric sheet.

In one aspect, the bladders are formed from a first sheet of gelatinous elastomeric material that includes a plurality of receptacles formed therein and a second sheet, with the first sheet joined with the second sheet.

In a further aspect, each sheet includes a perimeter, with the first sheet joined to the second sheet at their respective perimeters.

In yet a further aspect, the perimeters of the respective sheets are sandwiched together between upper and lower flanges. For example, the upper and lower flanges may be formed from a relatively rigid material, such as a plastic or a metal, or a composite material. In addition, the flanges may then be mechanically coupled together by mechanical inserts or fasteners that extend through the perimeters of the first and second sheets.

In another aspect, the second sheet is also a gelatinous elastomeric sheet. Further the gelatinous elastomeric sheet may have a layer of non-woven material to limit the stretch of the second sheet.

Alternately, the second sheet may be formed from a non-woven sheet. Further, the non-woven sheet may be joined with the gelatinous elastomeric material sheet by a weld or welds formed by the gelatinous elastomeric material.

According to another form of the invention, a patient mattress for supporting a patient includes a plurality of inflatable bladders, which provide patient facing side for supporting the patient on the patient mattress. Each bladder is formed from a gelatinous elastomeric sheet which includes a plurality of sacs formed therein and a second sheet joined with the first sheet to form a matrix of bladders.

In one aspect, at least some of the bladders are in fluid communication with each other through channels formed by spaces between the first and second sheets.

In a further aspect, each sheet includes a perimeter, with the first sheet joined to the second sheet at their respective perimeters. For example, the perimeters of the two sheets may be joined by welds.

In yet a further aspect, the perimeters of the respective sheets are joined together by sandwiching the perimeters of the sheets together between upper and lower flanges. For example, the upper and lower flanges may be formed from a relatively rigid material, such as a plastic or a metal or a composite material. In addition, the flanges may then be mechanically coupled together by a fastener that extends through the perimeters of the first and second sheet.

In a further aspect, the flanges may extend along the full length of each side of each sheet or may be located only at locations where the first and second sheets are not joined together. For example, the first and second sheet may be joined at discrete locations by welds.

In another aspect, the second sheet may also be a gelatinous elastomeric sheet. Further the gelatinous elastomeric sheet may have a layer of non-stretchy material adhered to the gelatinous elastomeric sheet to limit the stretch of the second sheet.

According to yet other aspects, any of the above the mattresses may further includes a control system, which is adapted to control the pressure to at least a group of the bladders.

In another aspect, each of the bladders has an inflated height, a transverse width, and a longitudinal width, with the inflated height being greater than at least one of the transverse width and the longitudinal width.

In yet another aspect, the mattress further includes a fluid movement device, such as pump, which is in selective fluid communication with the bladders and is controlled by the control system. Optionally, the pump is located in the mattress.

Accordingly, the present invention provides a support surface that allows a patient improved immersion and therefore improved pressure distribution.

These and other objects, advantages, purposes, and features of the invention will become more apparent from the study of the following description taken in conjunction with the drawings.

DETAILED DESCRIPTION OF THE PREFERRED EMBODIMENT

Figure 1:
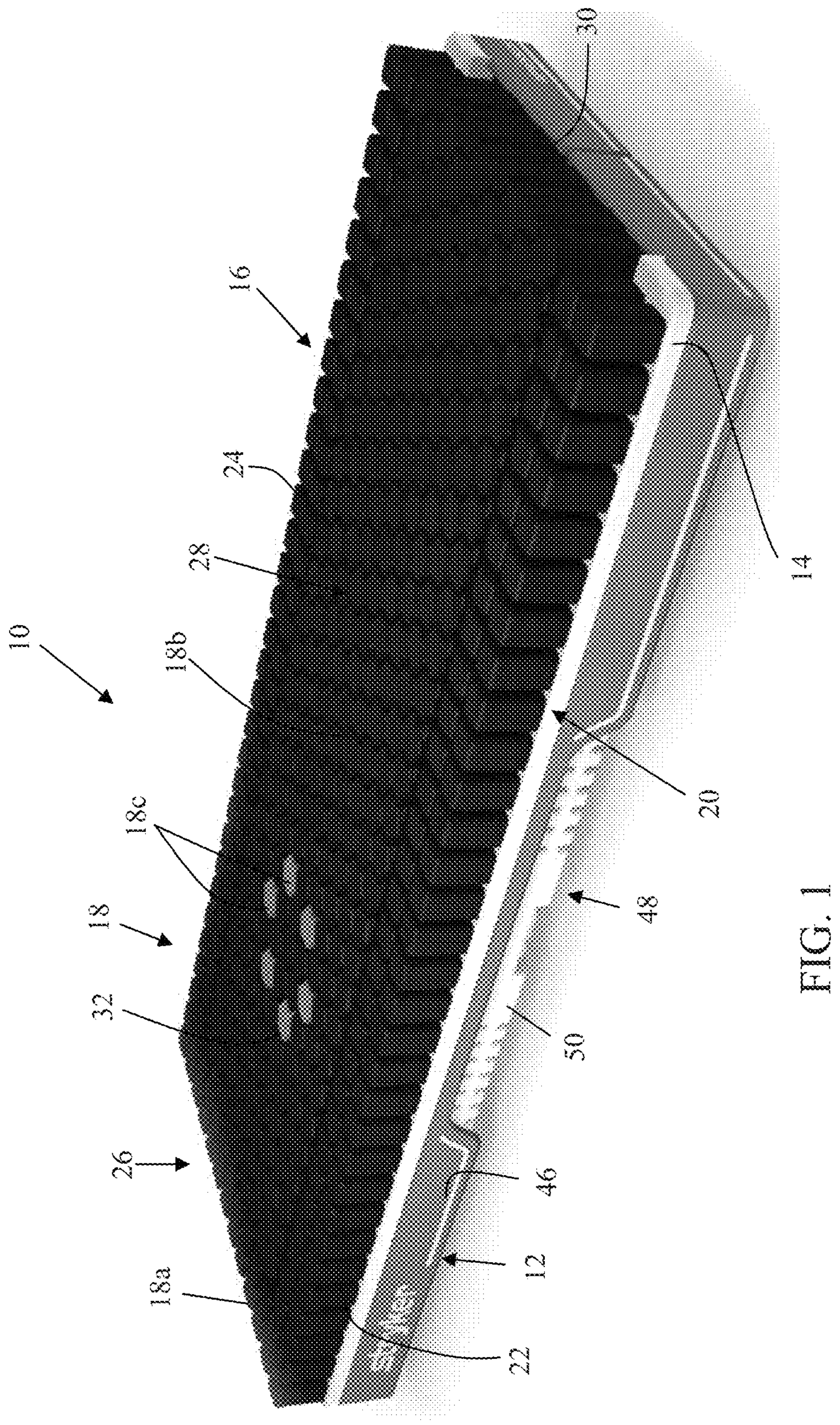
FIG. 1 is a perspective view of one embodiment of a patient support of the present invention.

Referring to FIG. 1, the numeral 10 generally designates a patient support of the present invention. While described as a "patient" support, it should be understood that "patient" is to be construed broadly to include not only people undergoing medical treatment but also invalids and other persons, such as long term care persons, who may or may not be undergoing medical treatment. As will be more fully described below, patient support 10 provides support to a patient's body and, further, may be adapted to provide therapy or treatment to the patient, for example, rotation therapy, percussion therapy, or vibration therapy or the like. Additionally, the support surface of the patient support may be adjusted to vary the immersion of a patient in the support surface, as well as provide a low air loss surface.

Figure 2:
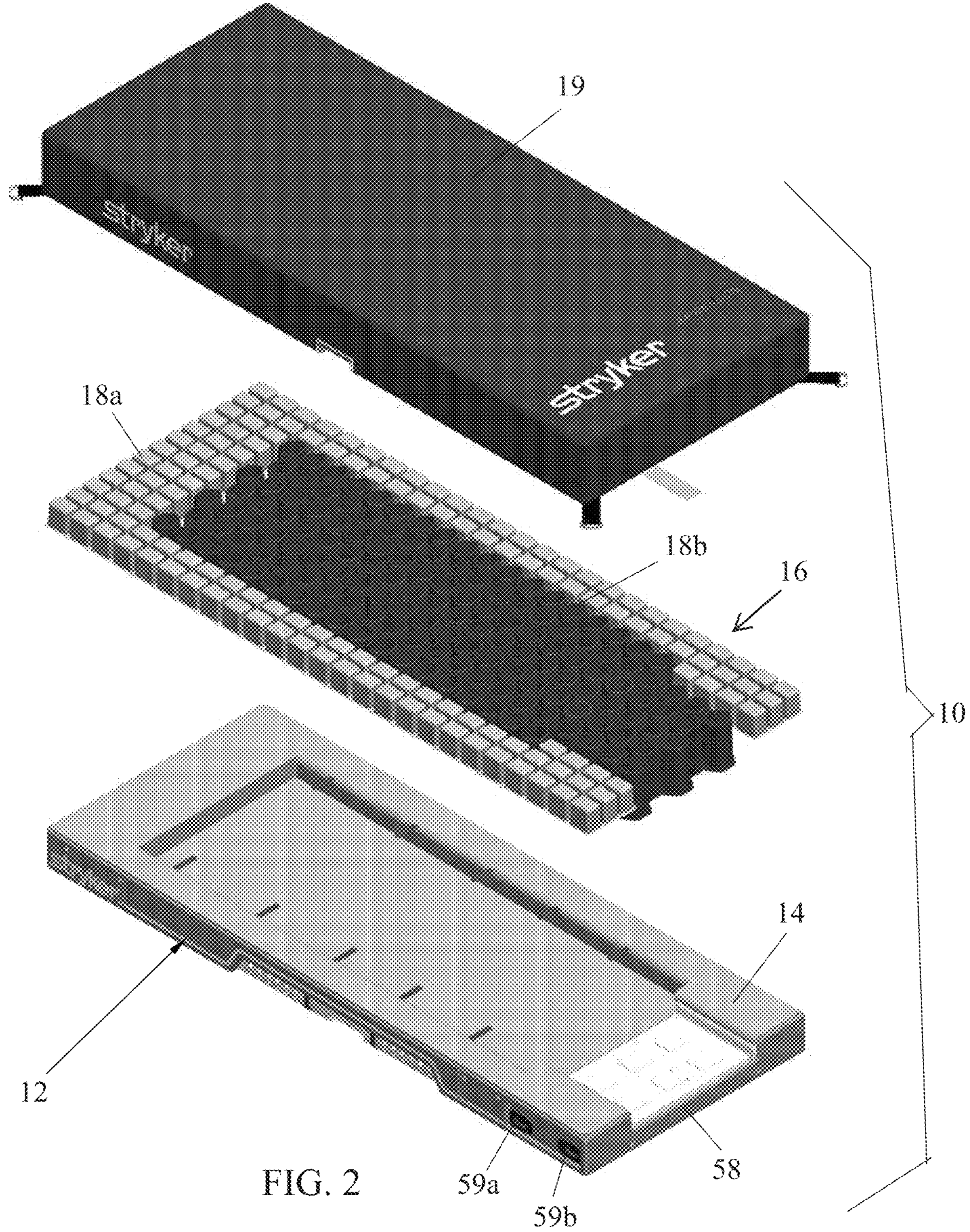
FIG. 2 is an exploded perspective view the patient support of FIG. 1 showing a modified bladder arrangement and base.

As best seen in FIGS. 1 and 2, support surface 10 includes a base 12, a foam cradle or crib 14, and a bladder layer 16 formed from a plurality of bladders 18, all optionally enclosed in a cover 19. A suitable cover may be formed from a moisture vapor permeable, but liquid impermeable material, such as GORE® Medical Fabric, available from W. L.

Gore & Associates, Inc., of Elkton, MD to facilitate moisture management of the patient. Cover 19 may also include indicia to indicate proper positioning for the patient on the mattress. For example, cover 19 may have printed thereon or woven therein a design or image, such as a representation of a patient's lung, which is positioned to align over the treatment bladders (e.g. percussion/vibration bladders described below) so that if mattress 10 is used to apply percussion or vibration treatment to a patient, a caregiver can position the patient on the mattress so that the patient's lungs are properly aligned with the indicia and thereby properly align the patient's lungs with the percussion/vibration bladders described below. Cover 19 may also have other indicia, such as prints on the side, to position other portions of the body, including the neck and/or shoulder position. The cover may also have a side accessible pocket formed under its top sheet, which is formed by stronger material, such as Kevlar, which allows an X-ray cassette to be inserted under patient below the cover.

As will be more fully described below, bladders 18 provide support to a patient's body and also optionally provide one or more of the therapies noted above. In this manner, the same layer 16 may provide both support to a patient and also, optionally, provide therapy to a patient. Further, bladders 18 can apply the treatment just below the patient's tissue with the therapy forces effectively only separated from the patient's skin by the cover and the sheets.

Referring again to FIG. 1, layer 16 includes a plurality of bladders 18 that may be arranged in several groups. In the illustrated embodiment, layer includes three groups of bladders. A first group 20 of bladders is arranged to extend along the opposed sides 22, 24 of surface 10 and across the head end 26 of surface 10 to form a generally inverted U-shaped arrangement, with two or more rows of bladders at each of the sides and at the head end. Though as will be described below in reference to FIGS. 14-19, the bladders on the sides and at the head end may be eliminated and replaced with foam or other bladder arrangements. Further, the number of bladders may be increased or decreased. For example, additional rows may be provided at the head end, such as shown in FIG. 2.

A second group 28 of bladders is located between the sides of the bladders of the first group, which extend from the first group at the head end 26 to the foot end 30 of surface 10 and provide the primary support bladders for the patient. The bladders 18*a* of the first group 20 of bladders have a generally rectangular box-shaped configuration, while bladders 18*b* of second group 28 may be rounded or have more than four sides. For example, bladders 18 may have a hexagonal box-shape, so that the bladders can be nested to reduce the creation of continuous edges that span the width or length of layer 16, which could be felt by a patient, as will be more fully described below. In addition, a third group 32 of bladders within the second group 28 of bladders may be arranged in a central portion of the second group of bladders at the chest area of a patient, which third group 32 of bladders may be used to apply one or more therapies to the patient. Third group 32 may be arranged in two groups, for example, two groups of 3 bladders, which form a top zone, middle zone, and bottom zone for each lung, with one group for apply treatment to patient's left lung and the other group for applying treatment to the patient's right lung. Each of these bladders may be individually controlled.

Bladders 18 are formed from upper and lower polymer sheets or elastomeric sheets, with the upper sheet being molded into the configuration as shown in FIG. 1. For example, a suitable polymer sheet includes sheets formed from thermal polyurethane (TPU). The upper sheet is optionally molded into the box-shaped bodies using injection molding, though vacuum molding may also be used. Bladders 18 may be formed in groups or each of the bladders may be individually molded and welded together (heat sealing or RF) to form the upper sheet. As best seen in FIG. 1, bladders 18 are molded into their respective box-shapes in the upper sheet, which is heat welded to the lower base sheet in a manner more fully described below. Optionally, bladders 18*b*, 18*c* each have a height to width ratio of greater than 1:1 so that they are taller than they are wide. Further, the height to width ratio may be in a range of 1:1.5 to 1:4 or in a range of 1:2 to 1:3, which height will allow bladders 18 to provide a great range of immersion when supporting a patient. Bladders 18*a* may be shorter and have a 1:1 height to width ratio.

Figure 1A:
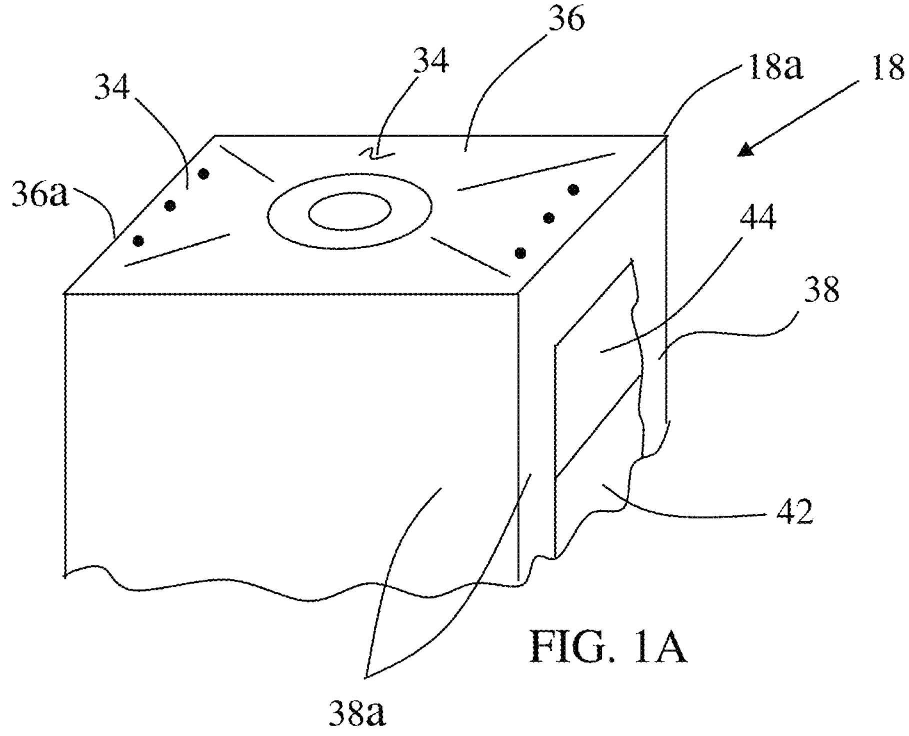
FIG. 1A is an enlarged partial fragmentary perspective view of one of the bladders on the side of the patient support of FIG. 1.
Figure 1B:
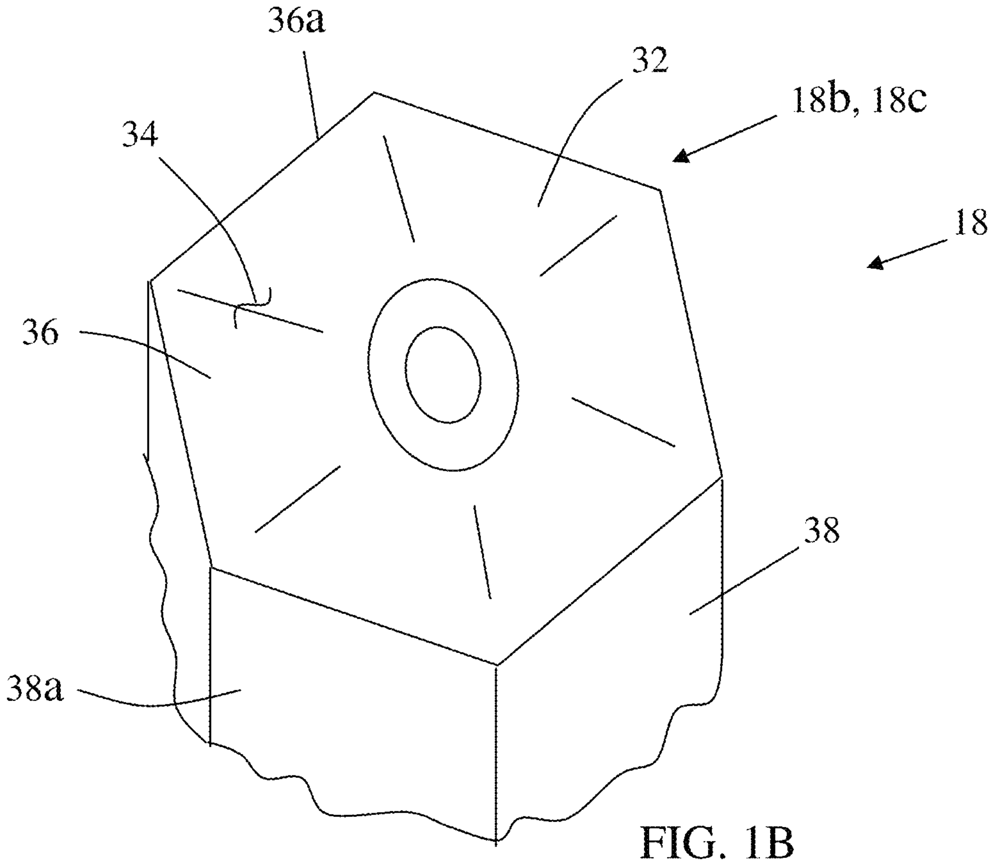
FIG. 1B is an enlarged partial fragmentary perspective view of another bladder located in the central region of the patient support of FIG. 1.
Figure 6:
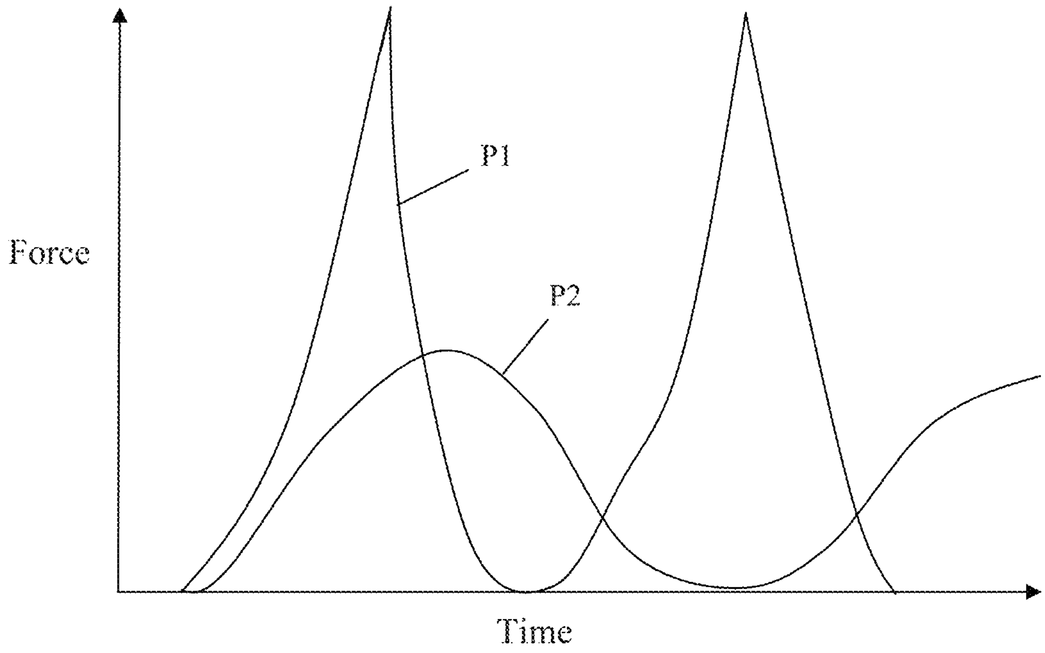
FIG. 6 is a graph of the transient force that may be applied by one or more of the bladders of the patient support.

As best seen in FIGS. 1A and 1B, each of the bladders 18 (18*a*, 18*b*, and 18*c*) has an upper wall 34, which forms a patient facing surface or side 36 and a perimeter wall 38, which may be formed from one or more sidewalls 38*a*. In the illustrated embodiment, as noted, side bladders 18*a* have a rectangular box shape with four sidewalls 38*a*, and four edges 36*a* at patient facing surface 36 while bladders 18*b*, 18*c* have a hexagonal box shape with six sidewalls 38*a* and six edges 36*a* at the patient facing surface 36. By providing more than four sides, such as the illustrated hexagonal-shaped cross-sections, bladders 18*b* and 18*c* may be nested in a manner so that the edges of the respective bladders do not align to form a continuous straight edge and instead are offset from each other, which reduces the patient's detection of the edges of the bladders and, therefore provides increased comfort to a patient. In addition, a patient may not feel a gap between the bladders because the gaps span only short distance under the patient's body.

Figure 1C:
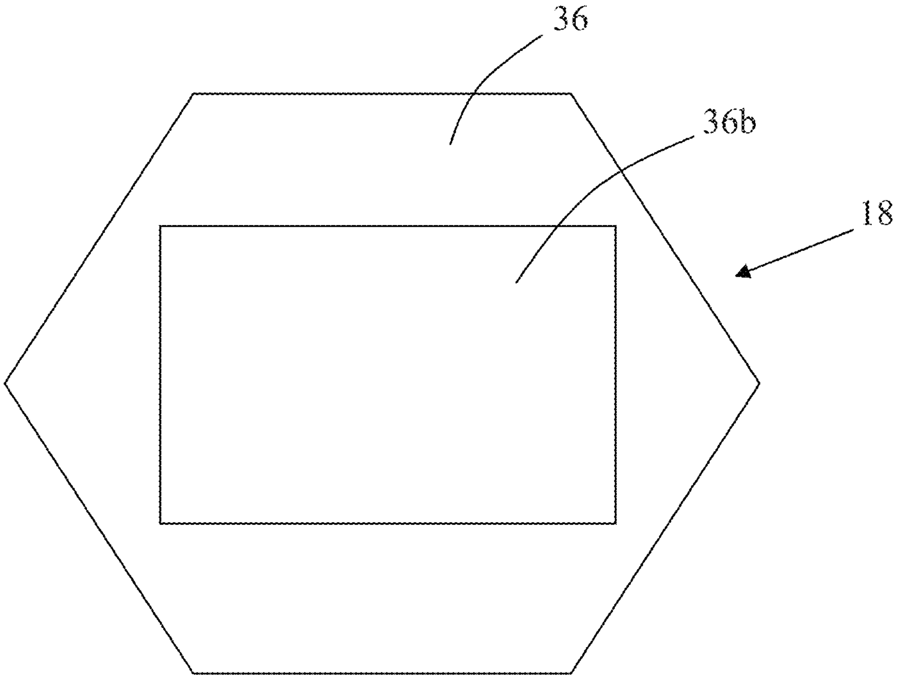
FIG. 1C is a plan view of one of the bladders of the central region with a patch of breathable material.
Figure 1D:
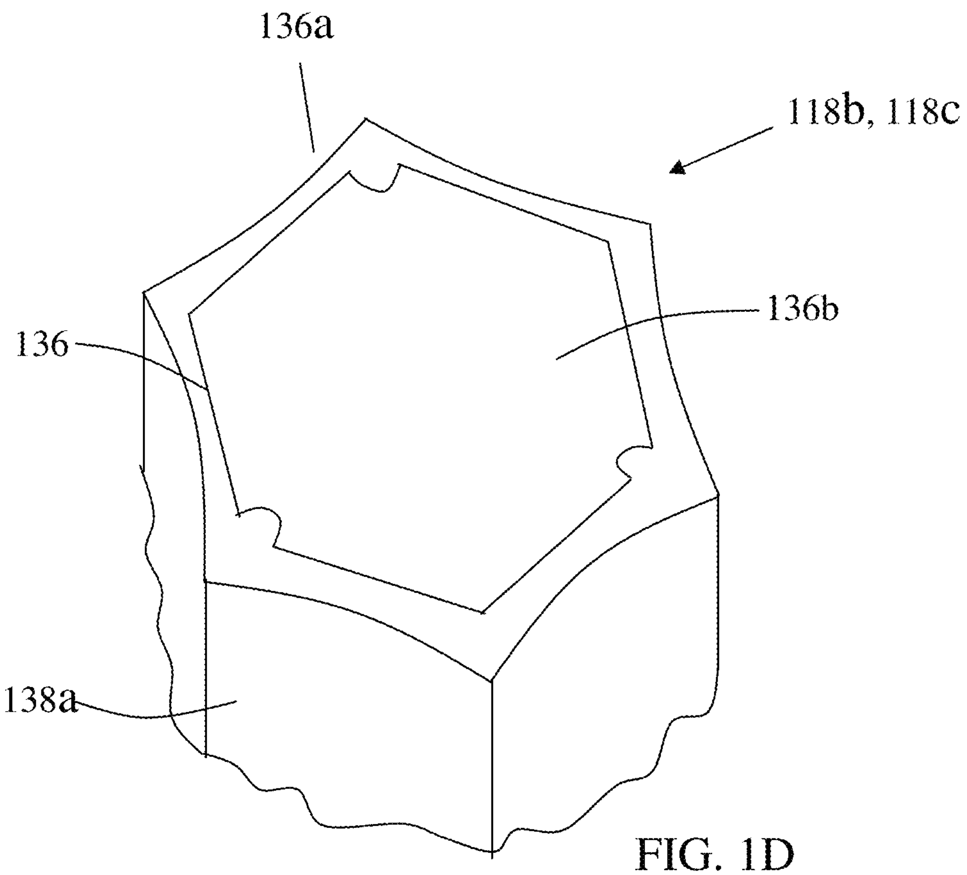
FIG. 1D is a perspective view of another embodiment of the bladders of a patient support of the present invention.

In another embodiment shown in FIG. 1D, 118*b*, 118*c* bladders have a hexagonal box shape, but with six concave sidewalls 138*a* and six curved edges 136*a* at the patient facing surface 136. The degree of curve may be varied and further may be infinite so that the side edges 136*a* are generally straight. Further, in this embodiment, the top side of the bladder is formed by a patch or panel 136*b* of breathable material, such as moisture permeable but gas impermeable or moisture permeable gas impermeable and liquid impermeable material, such as GORE-TEX® or GORE® Medical Fabric. In this manner, the top side of the bladders retains the gas in the bladder but allows moisture to flow into and out of the pods, but does not allow liquid, such as bodily fluids to flow into the bladders. In this manner, moisture may be drawn into some of the bladders, while the other bladders help carry the moisture away and further under the influence of the air flow through the surface pushes moisture out from other bladders away from where the patient is lying.

The patches may be adhered to the sides of the bladder during the molding process and may be flush with the top of the sides or may even extend over the sides. In the illustrated embodiment, the patches are recessed below the tops of the bladder's side walls to minimize the detection of the patch. For further details about the forming of the bladders reference is made to the following descriptions. Further, while illustrated in reference to a bladder with hexagon shaped top side, the fabric panels may be incorporated into other shaped bladders, including rounded bladders.

The mold apparatus forming the bladders may include two or more mold plates, which include a plurality of gates for each mold cavity (for each bladder) and, further, include a plurality of channels that extend radially outward from the central region of each cavity to facilitate the flow of the material forming the bladders across the width of the mold cavity for each bladder, which therefore facilitates the control over the wall thickness of the respective bladders. Additionally, to facilitate the release of the sheet from the mold cavities after molding, the mold plates may be sandblasted before use so that the respective mold faces of the mold plates have a “roughened” surface or may be coated with a release material, such as TEFLON, which allows better inflow of air between the sheet and the mold faces when the sheet is being removed from the mold cavity.

The bladders may be formed by: dipping; forming one or more bladders, by any of these methods and then RF welding or heat sealing, for example, them together or to a substrate; thermal forming them from thermo elastic sheets or membranes; RF welding or heat sealing multiple panels together; or blow molding.

In another method, the bladders are individually injection molded and formed with a flange. The flanges are then joined together to form a layer of the bladder layer and then mounted to a base sheet, for example, by RF welding or heat sealing. The welds or heat seals may be spaced to form intermittent gaps which form passageways between each of the bladders to allow air flow between selected bladders. Tubing may also be inserted between the flanges and the base sheet to form the passageways. In this manner, the tubing management can be inside the bladders. Further, each bladder may have a thin top side, a thicker side wall or side walls, and an even thicker flange.

The bladders may be made from a variety of materials, for example, plastic resins, thermo elastic or rubberized materials, and also may be formed from two or more materials. For example, one material may form the top side and the other may form the sides and the base. In this manner, the top may have different properties than the sides. Similarly, the base may have different properties than the sides.

While reference hereafter is made to bladders 18*b* and 18*c* of the first embodiment, it should be understood that many of the details described herein may apply to any of the bladders. The height of each support bladder 18*b*, 18*c* may be in a range of approximately 4-10 inches, 5-9 inches, or 6-8 inches, and may be about 6 inches, while the maximum width of each bladder may be in the range of 3 to 4 inches. Thought it should be understood that some of the side bladders may be shorter and further may not have the same ratio as the central bladders that form the bulk of the patient support surface. For example, the height of the bladders under the body may be 6 inches, and 3 inches under the arms and head. But generally, the height (H) of at least the central group of the bladders is greater than their respective widths (W) and further as noted optionally such that H>2 W.

Further, the thickness of the perimeter walls and regions surrounding the central portion of each bladder may be in a range of 0.01" to 1.175", while the thickness of the central region may be in a range of 0.01" to 0.035". Thus when air flows into the bladders 18*c* under high pressure, for example, in a range of 3 to 9 psig, over a short period of time transient forces can be generated at the patient facing surface of bladders 18*c* that are of sufficient magnitude to generate either vibration or percussion treatment. For example, referring to FIG. 1C, when airflow into bladders 18*c* is provided in this range, a transient force profile P1 can be generated at a patient facing surface 36 of bladder 18*c*, which achieves a greater level of force over a shorter period of time than a conventional percussion or vibration bladder, which typically generate a force profile P2. With an increased force over a shorter period of time, a more effective vibration or percussion therapy may be achieved than heretofore known using bladders 18. Additionally, with the support layer of the present invention also providing the therapy layer, these transient forces are generated at the surface of the support layer unlike the prior art mattresses. Further, as noted, these forces then are only effectively separated from the patient’s skin by the cover.

As noted above, bladders 18 may be formed between two sheets—by an upper sheet that is molded into the desired shape and the lower sheet, which forms a base into which the upper sheet is then heat welded or RF welded to thereby form the chambers of each bladder between the upper sheet and the lower sheet. The welds are extended between each of the box-shaped bodies but are terminated over discrete regions adjacent each of the bladder sides such as described in U.S. provisional application Ser. No. 61/138,354, filed Dec. 17, 2008, entitled PATIENT SUPPORT SURFACE, which is commonly owned by Stryker Corporation, and which is incorporated in its entirety by reference herein. In this manner, passageways between the adjacent bladders are formed so that air can be delivered through a network of passageways formed in the bladder layer 16, which are in fluid communication with one or more inlets provided at the perimeter of the bladder layer 16. Furthermore, with this construction, some bladders may be isolated from other bladders so that they remain inflated even when other bladders have their pressure adjusted, for example to accommodate pressure redistribution. For example, the side bladders may remain inflated at generally constant pressure while the interior bladders may have their pressure adjusted independently of the side bladders.

To that end, each group of bladders, such as groups 18*a* and 18*b*, may have its own network of passageways with its own respective inlet or inlets so that each group may be independently inflated and controlled. Further, bladders 18*c* in the third group 32 of bladders may each have their own inlet, such as provided at the underside of bladder layer 16 so that each of the bladders (18*c*) may be individually controlled and, as noted be filled with air with a high pressure line so that they have a different pressure of air delivered to the respective bladder so that bladders 18*c* can be independently controlled and more over generate a transient force its facing surface. Thus, each bladder 18*c* may generate a transient force at its patient facing surface, which transient force may be used, as noted, to apply vibration or percussion therapy to a patient supported on surface 10. In addition, since each of the bladders 18*c* may be individually controlled, the pressure in the respective bladders may be applied sequentially to bladders 18*c* to create a rolling effect up (from foot to head) one side or both sides of the group of bladders or only a selected region or regions of the lungs may have a treatment applied. For percussion therapy, the frequency of the transient force may be in a range of 4 to 8 Hertz. In addition, the pressure in bladders 18*a* and 18*b* (and 18*c*) may be controlled so that bladders 18*a* are more pressurized for example than bladders 18*b* (and 18*c*) to provide firmer support of the perimeter of the mattress.

Crib 14 has side walls 14*a* that extend along sides 22 and 24 of mattress 10 and across head end 26, and which extends upwardly from base wall 14*b* to thereby form an upwardly facing recess 14*d*. Extending from side walls 14*a* are perimeter walls 14*c*, which extend across the head end 26 and extend from the head end 26 to the foot end 30. The perimeter wall is therefore raised above the bottom wall. Additionally, the perimeter wall may have regions 14*e* of increased thickness to provide increased firmness at the egress/ingress locations at the sides of the mattress. The foot end of base wall 14*b*, however, may terminate before the side walls 14*a* so as to form a recess for a foot end enclosure described more fully below.

As best understood from FIG. 1, bladders 18*b* and 18*c* extend into recess 14*d*, and bladders 18*a* are positioned over the perimeter walls 14*c* so that the bladders 18*a* have reduced overall height than bladders 18*b*, 18*c* but, as noted, are more pressurized so that the sides of the mattress have increased firmness at the opposed edges of the mattress. This increased firmness may be advantageous and provide greater stability when a patient is entering or leaving the bed, and also may minimize the detection of the base. With the patient on the bed, the pressure in bladders 18*a* is less that the pressure in bladders 18*b* and 18*c* and, therefore, bladders 18*b*, 18*c* will tend to be compressed below bladders 18*a*. Therefore, as will be more fully described below, the bladders may have the same height and still achieve the cradling effect of the taller side bladders due to the immersion of the patient into bladders 18*b*, 18*c*.

Additionally, bladders 18*b* may be segregated into a plurality of sub-groups or zones, such as a head end zone, a chest zone, an abdominal zone, a leg zone, and a foot zone, with each zone having its own network of passageways so that pressure in each zone may be adjusted to suit a particular patient's need. Because each bladder in each sub-group of bladders is in fluid communication with each of its adjacent bladders, and each of the adjacent bladders are in fluid communication with their adjacent bladders, the pressure induced by a person lying on the bladders does not significant raise the pressure in the adjacent bladders surrounding the compressed bladders. Instead, the pressure is redistributed so that the pressure applied to the patient is not only applied by the bladders under the patient but also by the surrounding bladders. This reduces, if not eliminates, high pressure points on the patient's body and moreover allows better immersion of the patient into the surface. With the redistribution of pressure to the bladders beyond the bladders immediately surrounding the patient's footprint (body print), the bladders immediately surrounding the patient's footprint effectively cradle the patients' body thus increasing the contact surface area between the patient's body and the mattress. Thus, reduced pressure points and better immersion are both achieved. In addition, as will be more fully described in reference to the control system, the pressure in a selected sub-group or sub-groups of bladders 18*b* may be adjusted to adjust the degree of immersion of the patient into the surface, which is more fully described below in reference to the control system. For example, for a patient who is more active, it may be preferable to provide less immersion than for a patient who is less active or inactive.

To facilitate moisture management and/or improve breathability of mattress 10, patient facing surfaces 36 of at least some of the bladders 18 may include a patch of gas permeable material or liquid impermeable and gas permeable material, such as GORE-TEX® or GORE® Medical Fabric on the top side of the bladder. For example, referring to FIG. 1C, one or more bladders 18 (and optionally each bladder) may include a patch 36*b* of gas permeable or gas permeable and liquid impermeable material, as noted such as GORE-TEX® or GORE® Medical Fabric adhered to its patient facing side surface 36, for example by an adhesive. Alternately, the patches may be adhered during the molding process. Patches 36*b* may be mounted onto the patient facing side or alternately recessed into a recess formed in the patient facing side of the bladders to minimize the detection of the edge of the patch. With use of the patches, the protective layer formed by the patches is flexible and, moreover, will not restrict the bladder's movement—in other words, the patches leave the bladders unrestrained and do not interfere with the immersion of the patient into the mattress.

Figure 9:
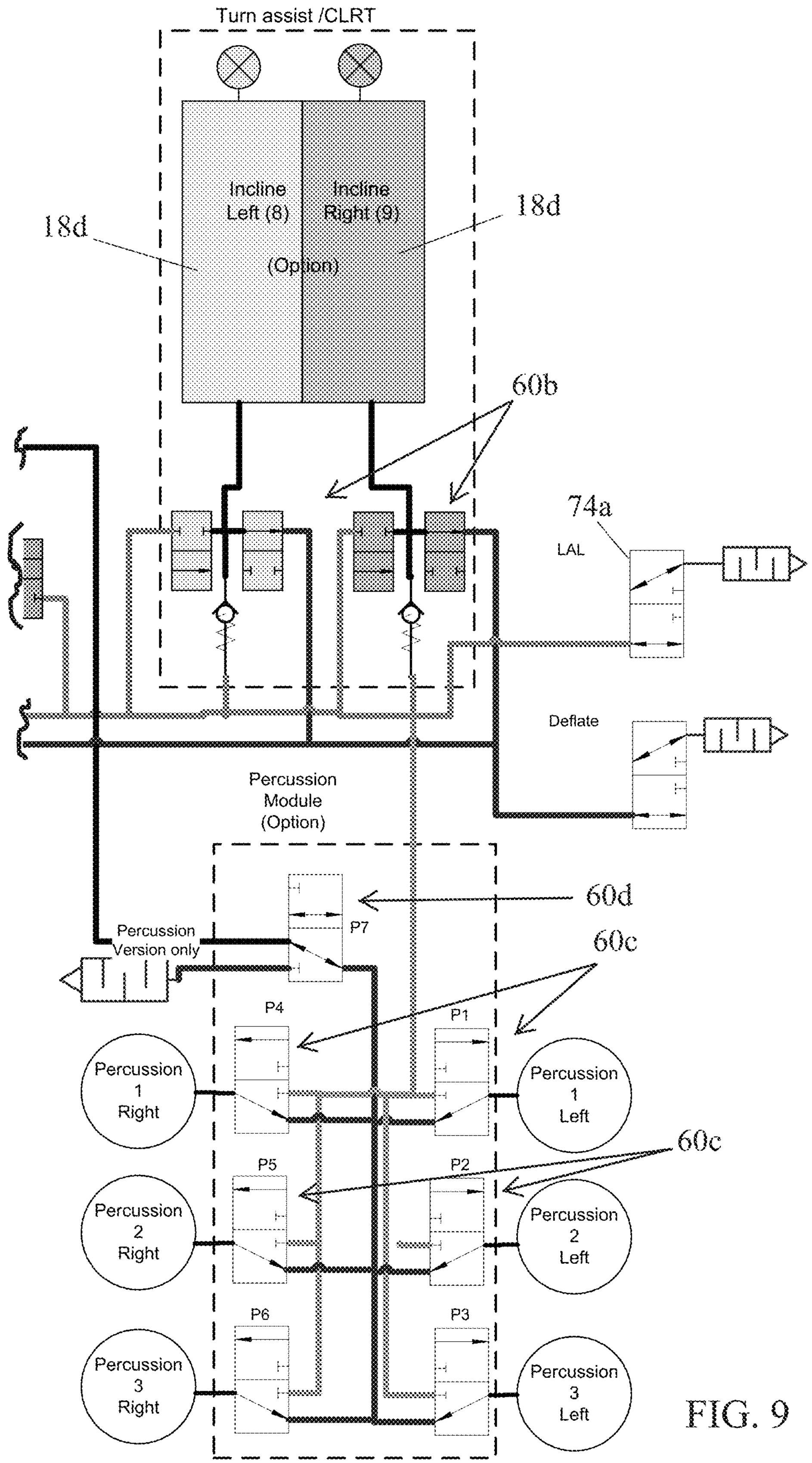
FIG. 9 is an enlarged view of the percussion/vibration and turning portions of the pneumatic control system of FIG. 7.

Additionally, referring again to FIG. 1A, any of the bladders 18 may incorporate therein a foam insert 42, which may only partially fill chambers 44 of the bladders to provide additional support and padding in the event that pressure in the bladders is lost or just low or the patient weight is above average so that the patient will not detect the presence of the mattress frame, more fully described below. Further, turn bladders 18*d* (FIG. 9) may be provided either beneath bladders 18*b* or in between bladders 18*b* and are located along the sides of the mattress, which may be independently inflated to provide turn therapy to the patient. For example, when the pressure in the turning bladders is increased, the pressure in the surrounding or overlaying bladders may be reduced to lower the rotational axis of the patient and thereby provide greater stability to the patient when being turned. Additionally, because the bladders that provide treatment may be individually controlled, vibration and/or percussion may be applied at the same time as rotation treatment. Further, the treatment protocol may be varied to suite particular needs of a patient.

To direct the air to the various bladders, mattress 10 includes a pneumatic control system 45 (FIGS. 7-9), which delivers air to and optional releases air from the respective bladders as more fully described below. Optionally, to reduce the tubing associated with prior art bladder-based mattresses, mattress 10 incorporates fluid passageways into its support structure, which, therefore, allow the mattress support structure to provide dual functions— namely, to support a patient and to direct air to the various bladders and optionally to a low air loss system.

Figure 3:
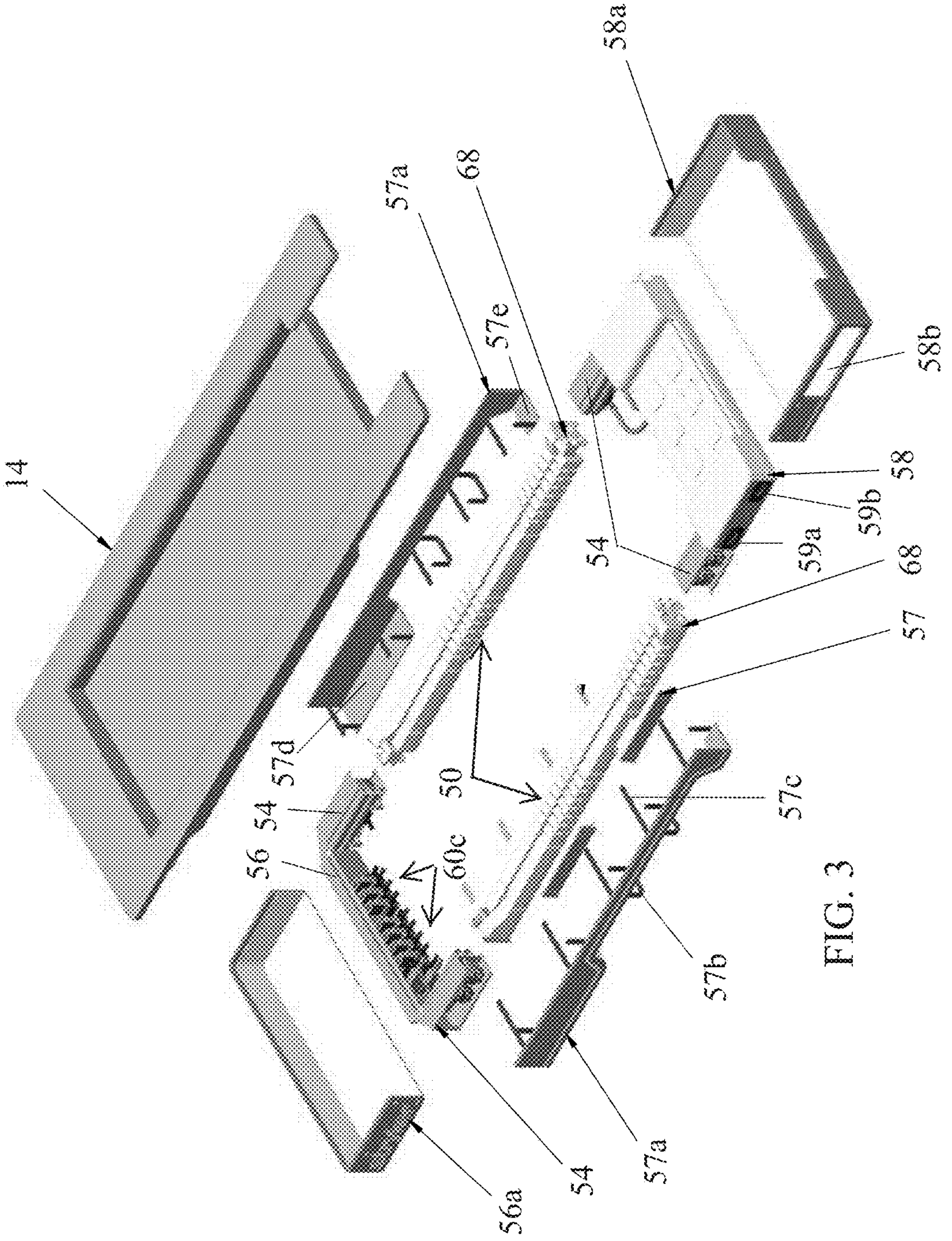
FIG. 3 is an exploded perspective view of the base and foam cradle of the surface of FIG. 2.
Figure 3A:
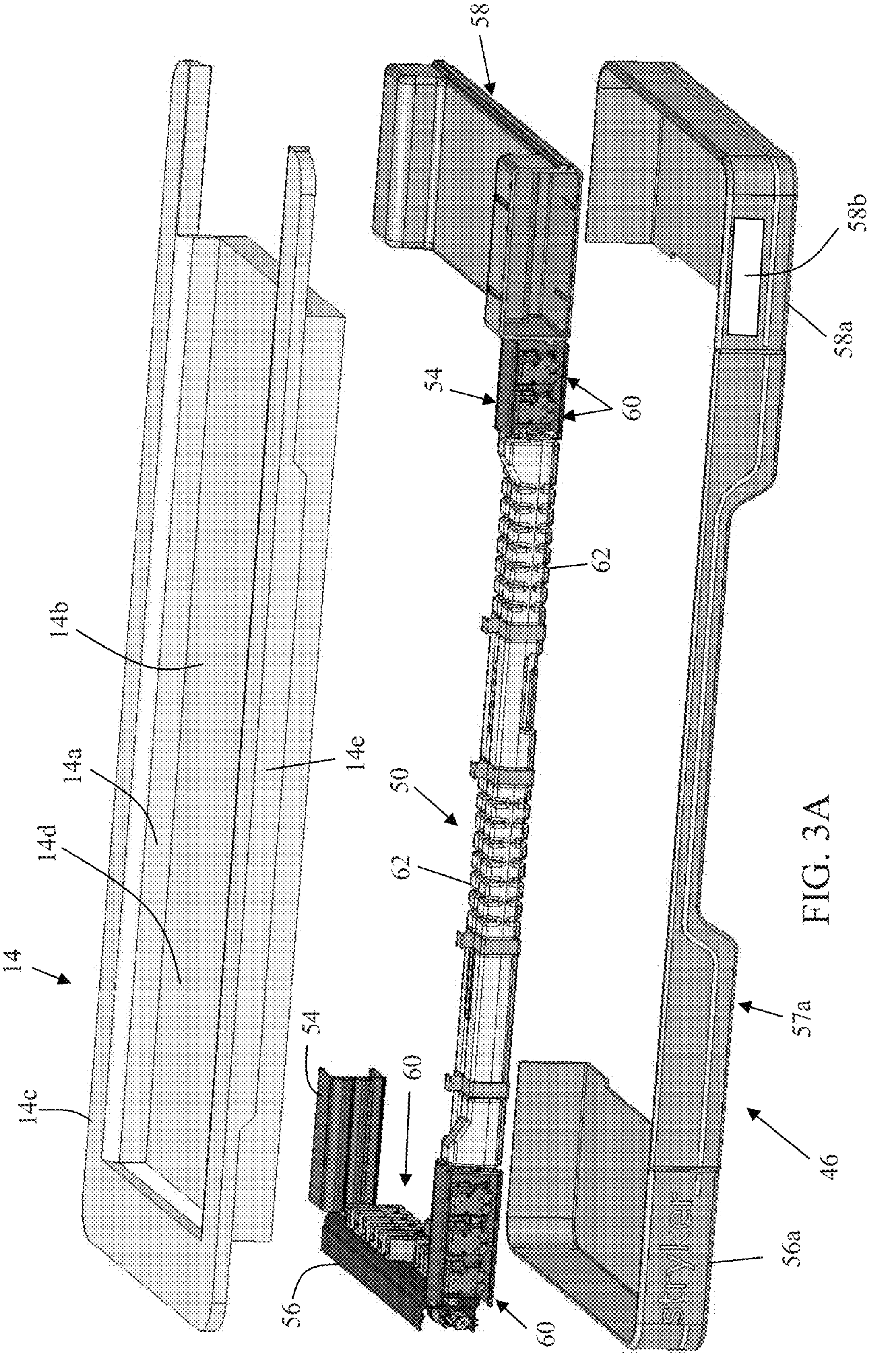
FIG. 3A is an enlarged exploded perspective view of the base and foam cradle with some details removed for clarity.
Figure 3B:
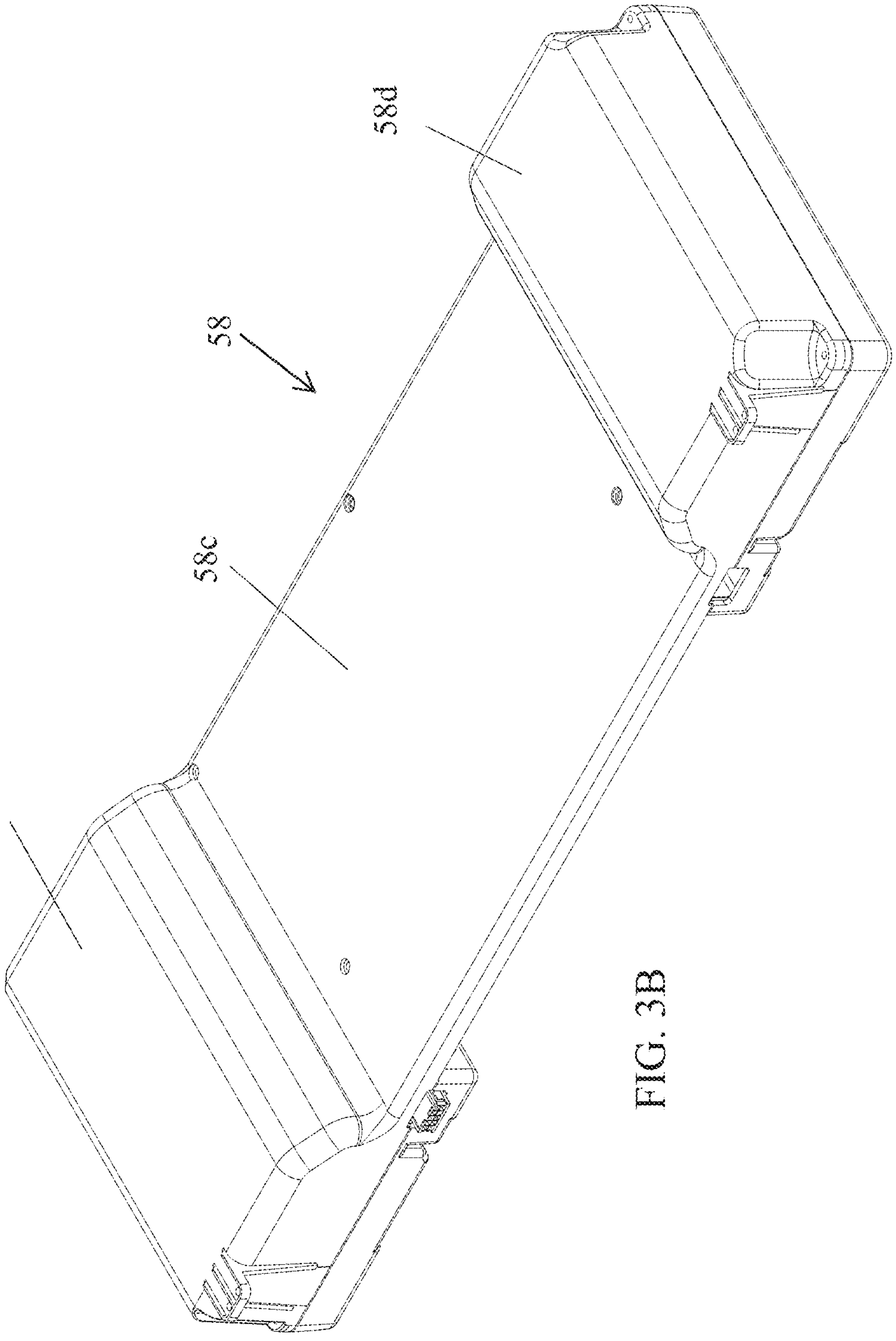
FIG. 3B is a perspective view of the control housing of the patient support of the present invention.
Figure 3C:
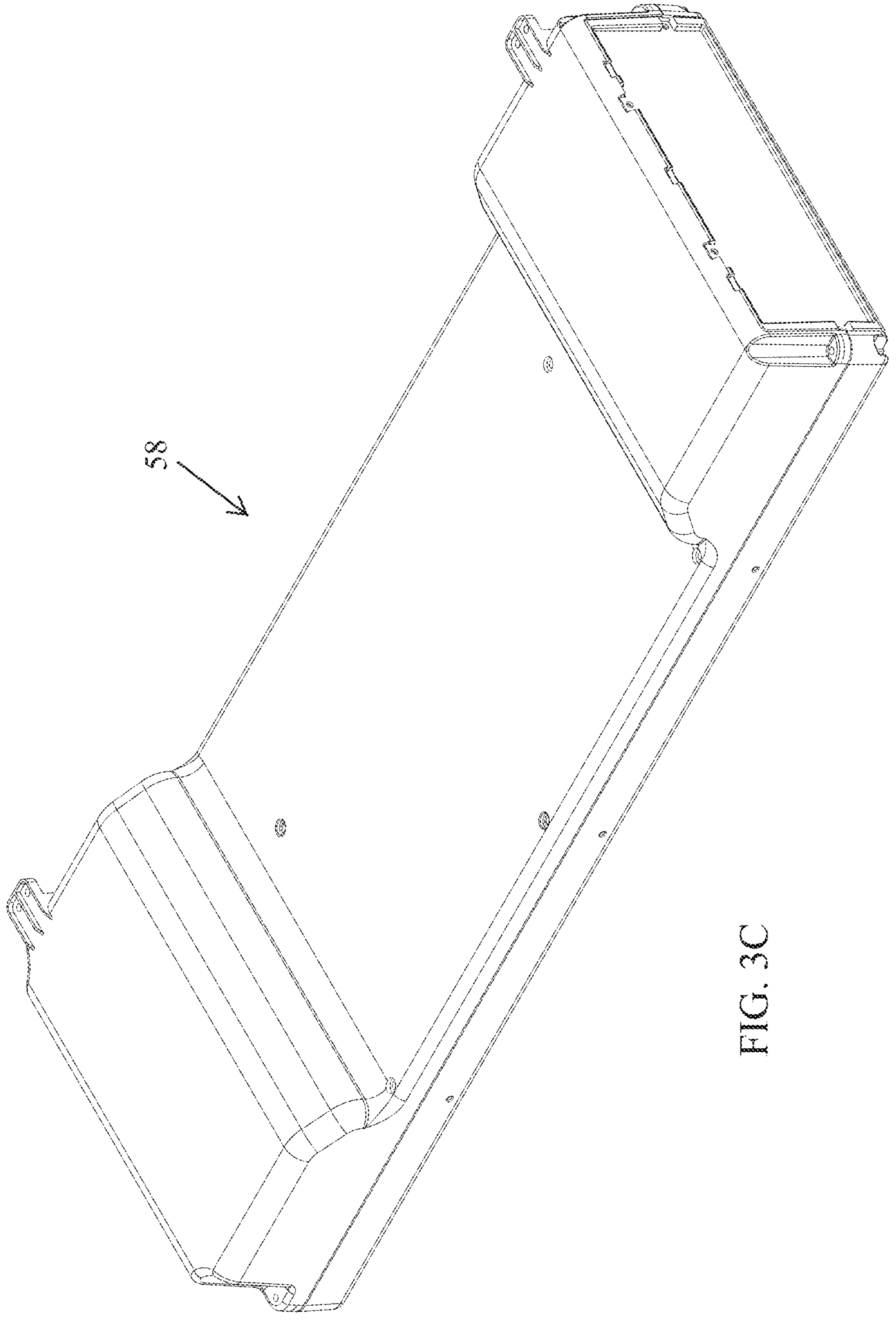
FIG. 3C is another perspective view of the control housing.
Figure 3D:
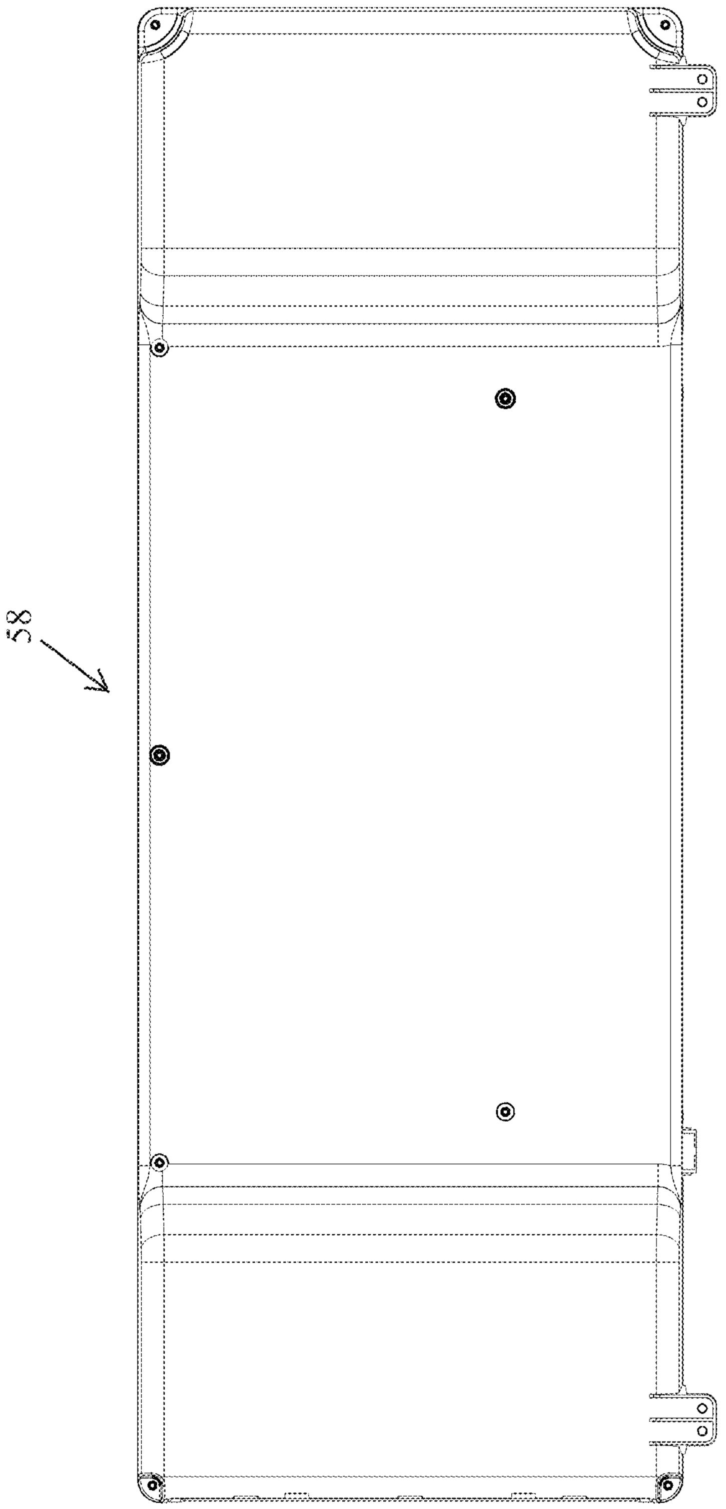
FIG. 3D is a top plan view of the control housing of FIG. 3B.
Figure 3E:
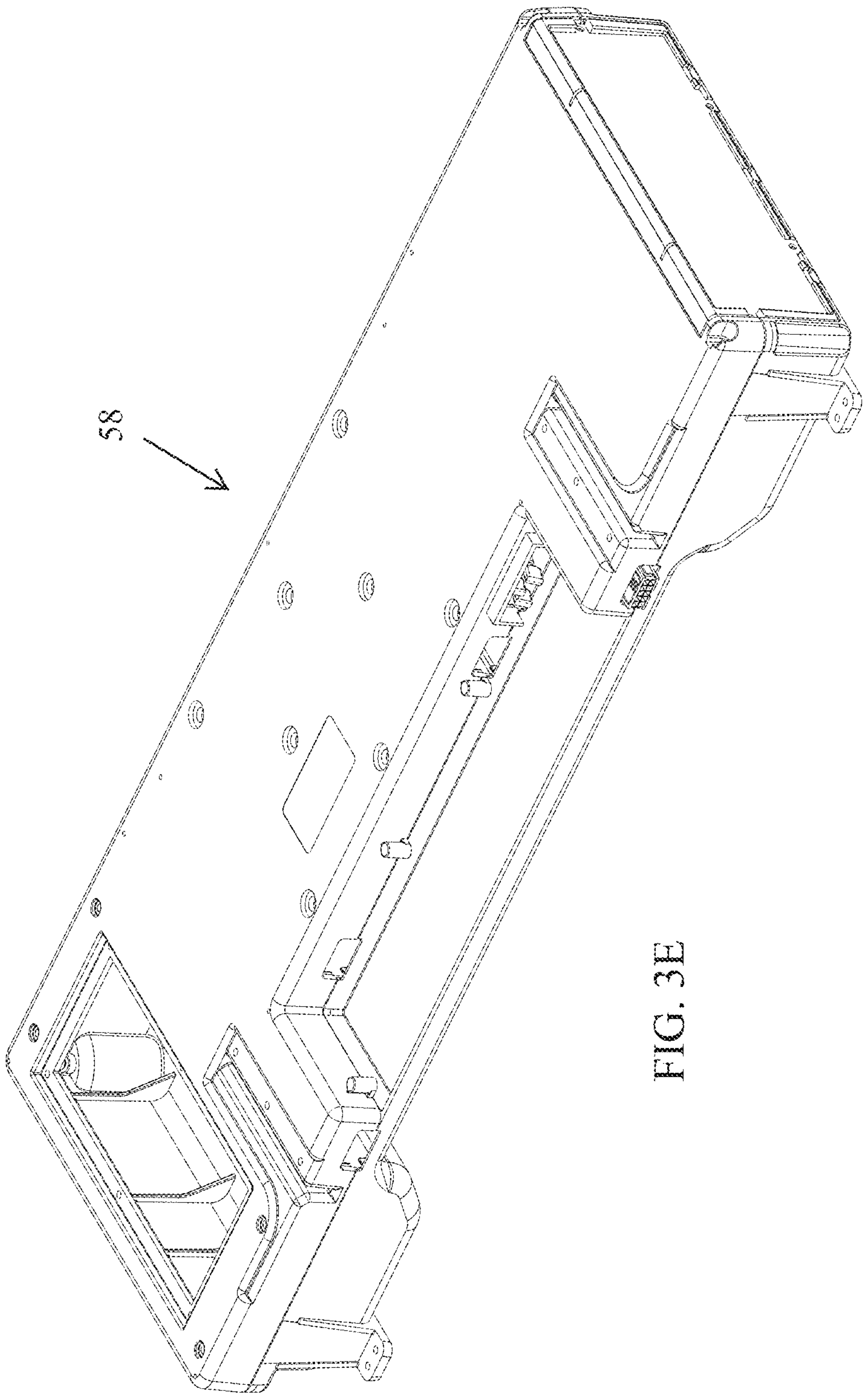
FIG. 3E is bottom perspective view of the control housing.
Figure 3F:
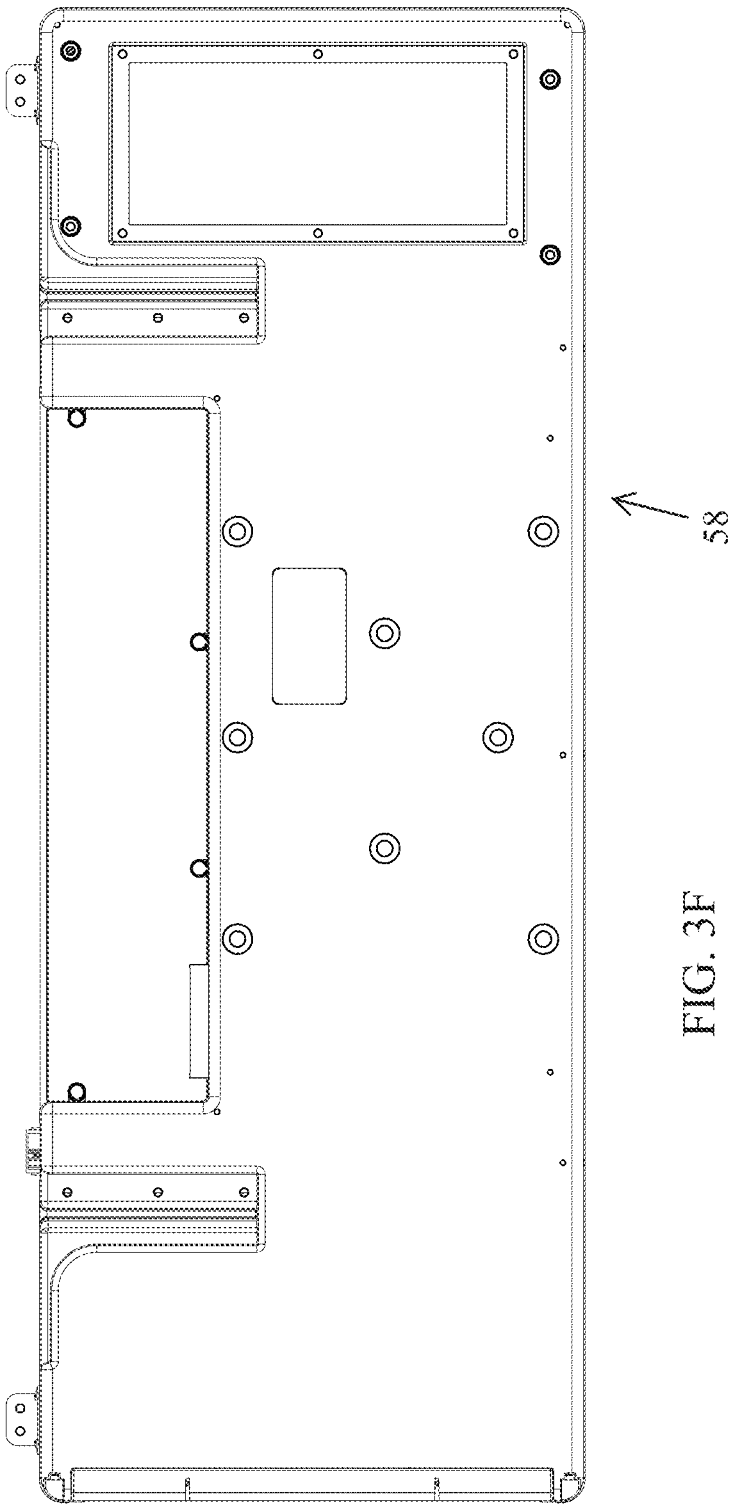
FIG. 3F is a bottom plan view of the control housing.
Figure 3G:
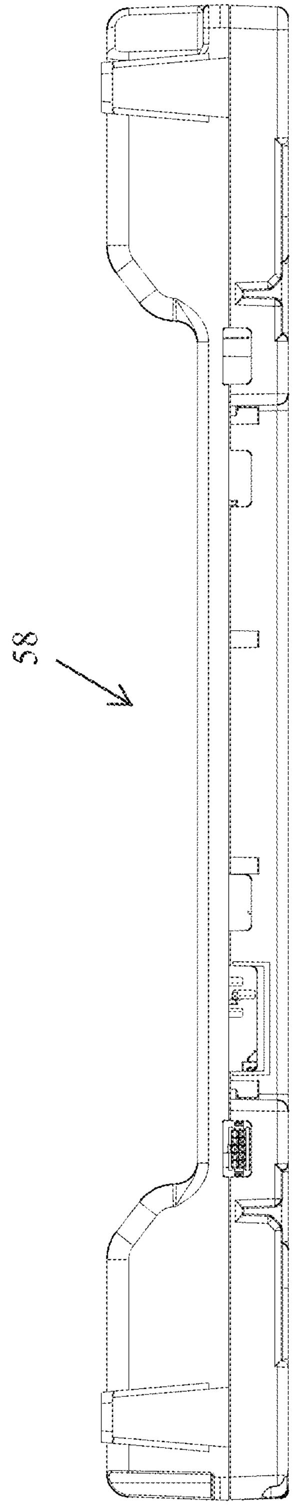
FIG. 3G is an elevation view of the control housing of FIG. 3B.
Figure 3I:
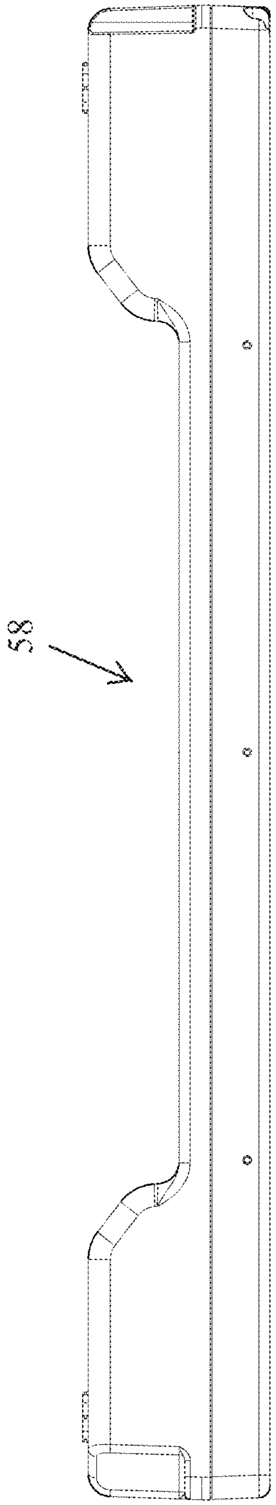
FIG. 3I is another elevation view of the control housing of FIG. 3B.
Figure 3H:
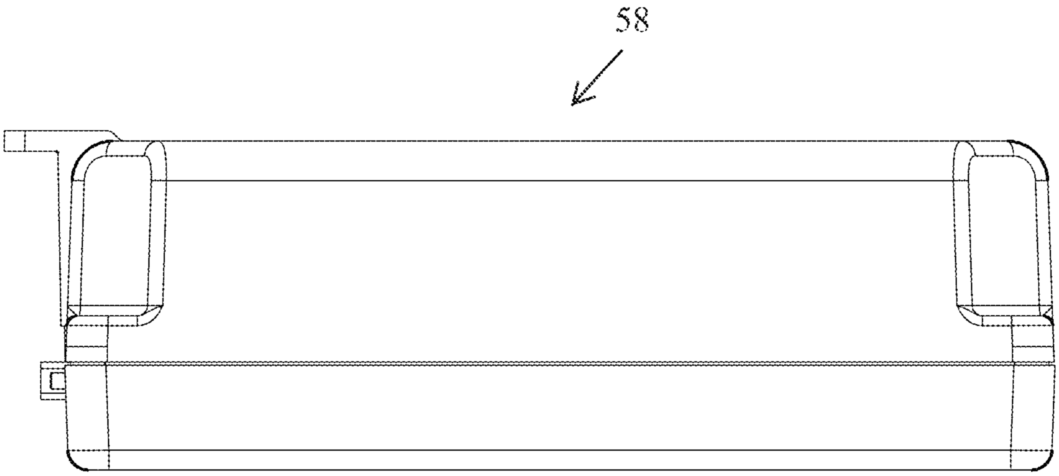
FIG. 3H is a right side elevation view of the control housing of FIG. 3B.
Figure 3J:
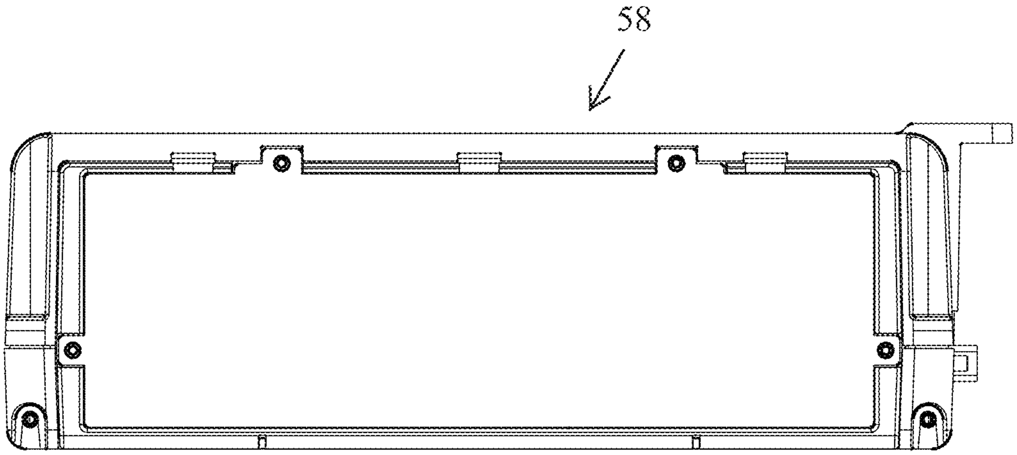
FIG. 3J is a left side elevation view of the control housing of FIG. 3B.

Referring to FIGS. 3 and 3A, base 12 includes a base frame 46 and a perimeter frame 48, which has incorporated therein conduits for directing the flow of air through the base from various valve assemblies and pumps described more fully below. Frame 48 is formed from a pair of side frame members 50, and transverse members in the form of side enclosures 54 and a head end enclosure or housing 56 and a foot end enclosure assembly or housing 58. Enclosures 54, 56, side frame members 50, and enclosure assembly 58 are connected so that they form frame 48, with side frame members 50 incorporating one or more flexible joints or hinges 62 so that frame 48 can be articulated about one or more axes. For example, one of the joints may be located between the head end and the medial, torso portion of the frame and another joint may be provided between the foot end and the medial torso portion. It should be understood that the number and location of flexible joints may be varied.

Referring again to FIGS. 3 and 4, frame 48 is supported on frame 46, which is formed from foam and is reinforced by metal or plastic plates. Frame 46 includes a head end cover 56*a* and a foot end cover 58*a* for receiving head end enclosure 54 and foot end enclosure assembly 58, respectively. Covers 56*a* and 58*a* are interconnected by transverse side covers 57*a*, which extend over side frame member 50. Covers 56*a*, 58*a*, and 57*a* provide a cushioning layer over frame 48 and further provide a protective barrier to the various valves and electronics housed in enclosure 54, 56, and in enclosure assembly 58. Cable managers 57 are supported by part 57*a*, which allow the cables/wires to be grouped and directed through the mattress.

As will be more fully described below, enclosure assembly 58 includes one or more compartments for housing components (e.g. the pumps/compressors/blowers/controls/ modules, valves, etc). For example, in the illustrated embodiment, enclosure assembly 58 includes one or more compartments for housing components of pneumatic system 45 and further optionally has one or more bays with connectors, both communication and power connectors, which are in communication with the mattress controller 70 and its power supply, to allow additional components (e.g. modules or accessories) to be mounted in enclosure assembly 58 and pneumatically and electrically coupled to and in communication with controller 70. Enclosure assembly 58 is optionally made from a rigid material, such as metal, including aluminum, or made be made from a polymeric material, such as plastic.

For example, as best seen in FIG. 3, enclosure assembly 58 may include two ore more bay modules 59*a* and 59*b* for receiving additional components. For example, additional components may include a control board for controlling and supplying air to a DVT cuff or to a hyperbaric device or supplying a suction line to a negative pressure wound treatment device, or to a low air loss system. To allow easy access to bay modules, cover 58*a* may include one or more openings 58*b* so that the component can be simply plugged into the mattress so that these devices can be controlled and operated by the mattress controller and also the bed based main control board noted below. In this manner, an attendant may remove or add accessories through the side of the mattress by simply plugging in or unplugging an accessory, such as an accessory module.

Referring to FIGS. 3B-3J, foot end enclosure assembly or housing 58 has a central section 58*c* and two opposed side sections 58*d*, 58*e*, which house the pump and the bay modules 59*a* and 59*b*. The central section has a lower profile than the two side sections and further has its upper side recessed below the upper sides of the two side sections so that the central foot end of the mattress can provide increased thickness of compressible support and hence greater cushioning than at the sides of the foot end of the mattress while still being able to accommodate a pump in the housing. For example, the thickness of the housing at its central section may be in a range of 1½ to 3 inches, 2 to 2¾ inches, and may be about 2¼ to 2½ inches. The central section supports, for example, the PCB for the control system of the mattress, while the side sections as described above house the pump and bay modules. In this manner, when the enclosure assembly 58 is located at the foot end of the mattress and in the recess formed by the foam crib, the cushioning layer formed by bladders 18*b* may maintain its full height or depth through to the foot end of the mattress.

Side frame members 50 and side enclosures 54 include one or more conduits for directing the flow of air through the base from the respective valve assemblies 60, which are located at enclosures 54 and 56 around the perimeter of base 12, and for exhausting air from the bladders through a CPR pressure regulator valve 78. Each side frame member 50 may have a plurality of conduits 50*a* and 50*b* formed therein, for example, forming a pressurizing line for inflating bladders 18*a* and 18*b* through valves 60, for delivering pressurized air to bladders 18*c* and for exhausting air from bladders 18*b* and 18*c* to administer CPR, more fully described below. Further, the flow of air to and conduits 50*a* and 50*b* may be controlled by valves, such as check inlet valves and electrically operated outlet valves so that one or both conduits 50*a* and 50*b* may form a reservoir, optionally, a pressurized reservoir, that can be used to store pressurized air in the surface for selective use, for example, to apply percussion or vibration treatment, as well as to inflate the bladders as needed to maintain the proper pressure in the bladders. For example, the pressure in the reservoir may be in a range of 0 psig to 15 psig, 2 psig to 15 psig, 2 psig to 12 psig, or 4 psig to 9 psig, including around 4.5 psig. To control the release of the pressurized air, the electrically controlled outlet valves are in communication with the mattress controller (70, described below), which controls actuation of the valves. Optionally, the outlet valve is a fast response valve to let bursts of air into the mattress. As a result, the mattress can be filled quickly and further selectively inflated with a pressure to deliver percussion or vibration with the same air supply. To reduce the turbulence in the pneumatic system, inserts may be provided, for example, in the outlet valve or the reservoir's inlet. For example, the insert may be formed from a porous material, such as filter material, which can be used anywhere in pneumatic system to reduce turbulence and hence noise.

For example, side frame members 50 may be formed, such as by molding, for example from a plastic material, such as a polymer, with the conduits optimally formed therein during molding. In the illustrated embodiment, members 50 are hollow members with internal webs that form closed passageways 64 (see FIG. 4) that form the conduits (50*a* and 50*b*) for directing air through members 50. Alternatively, the conduits may be formed from tubular members, including metal, such as aluminum tubular members, that are molded, such as by insert molding, into members 50. These too can be configured to form reservoirs.

Enclosures 54 and 56 are, for example, formed from a rigid material, such as plastic or a metal, including aluminum. Both may include extrusions and further also include conduits 54*a*, 54*b*, and 56*a*, 56*b*, 56*c* (FIG. 4), such as rigid conduits, either formed therein in the extrusions or mounted thereto so that the conduits may also form part of the frame, with conduits 54*a* and 56*a* forming pressurizing lines for inflation, and conduits 54*b*, 56*b* forming exhaust conduits.

Figure 4:
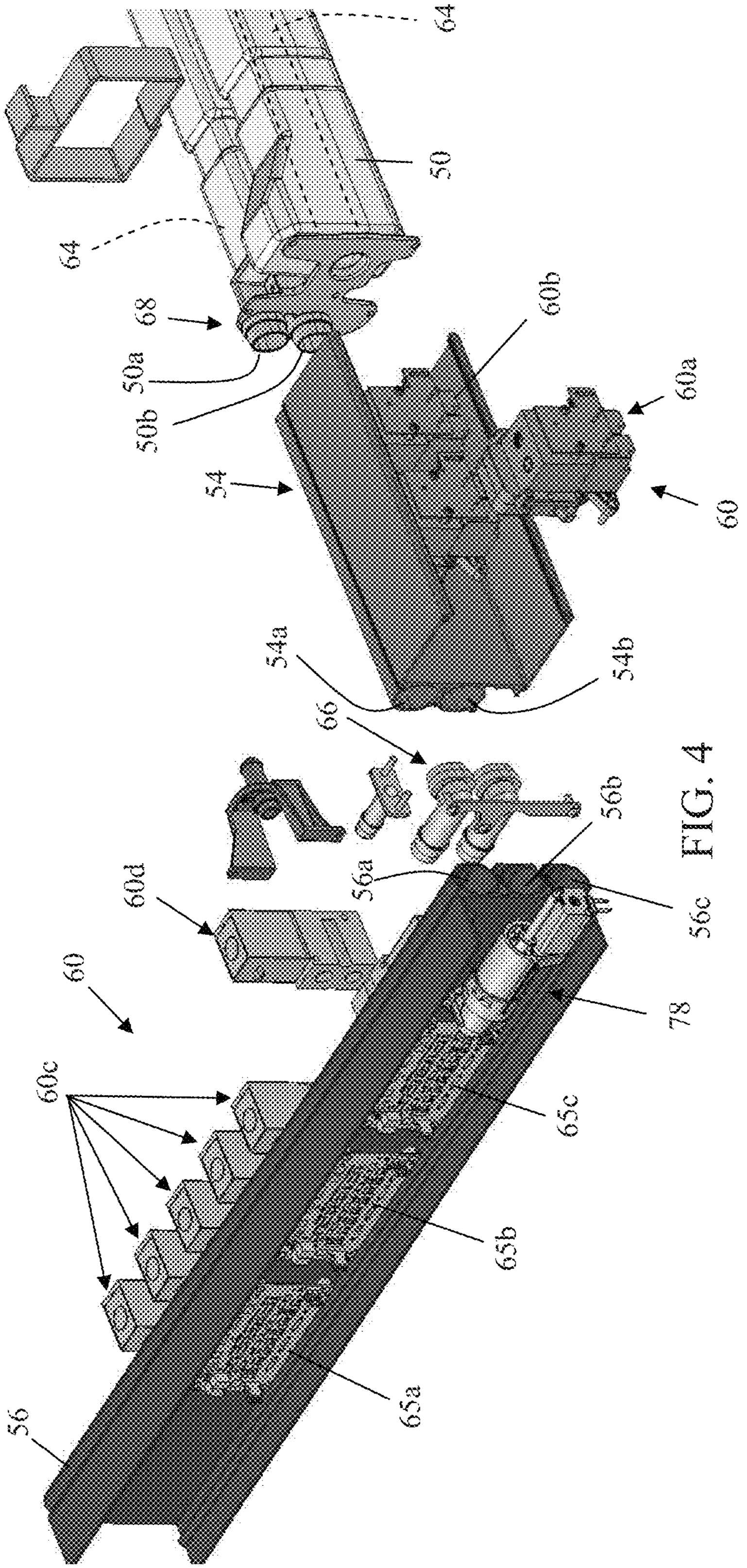
FIG. 4 is an enlarged partial fragmentary view of the base frame.

As best seen in FIG. 4, the respective conduits 50*a*, 50*b*, 54*a*, 54*b*, 56*a*, and 56*b* are in fluid communication with each other through couplers 66 and 68 that provide sealed connections between the respective conduits. Coupler 68 may be inset molded with member 50 when forming member 50 or may be post attached. The flow of air through conduits 50*b*, 54*b*, and 56*b* (pressurizing lines) to the respective percussion/vibration bladders (18*c*) is controlled by electrically operated valves 60, such as solenoid valves, and further two position check valves, and may comprise large orifice valves, which as noted above are located at and mounted to enclosures 54 and 56.

Figure 11:
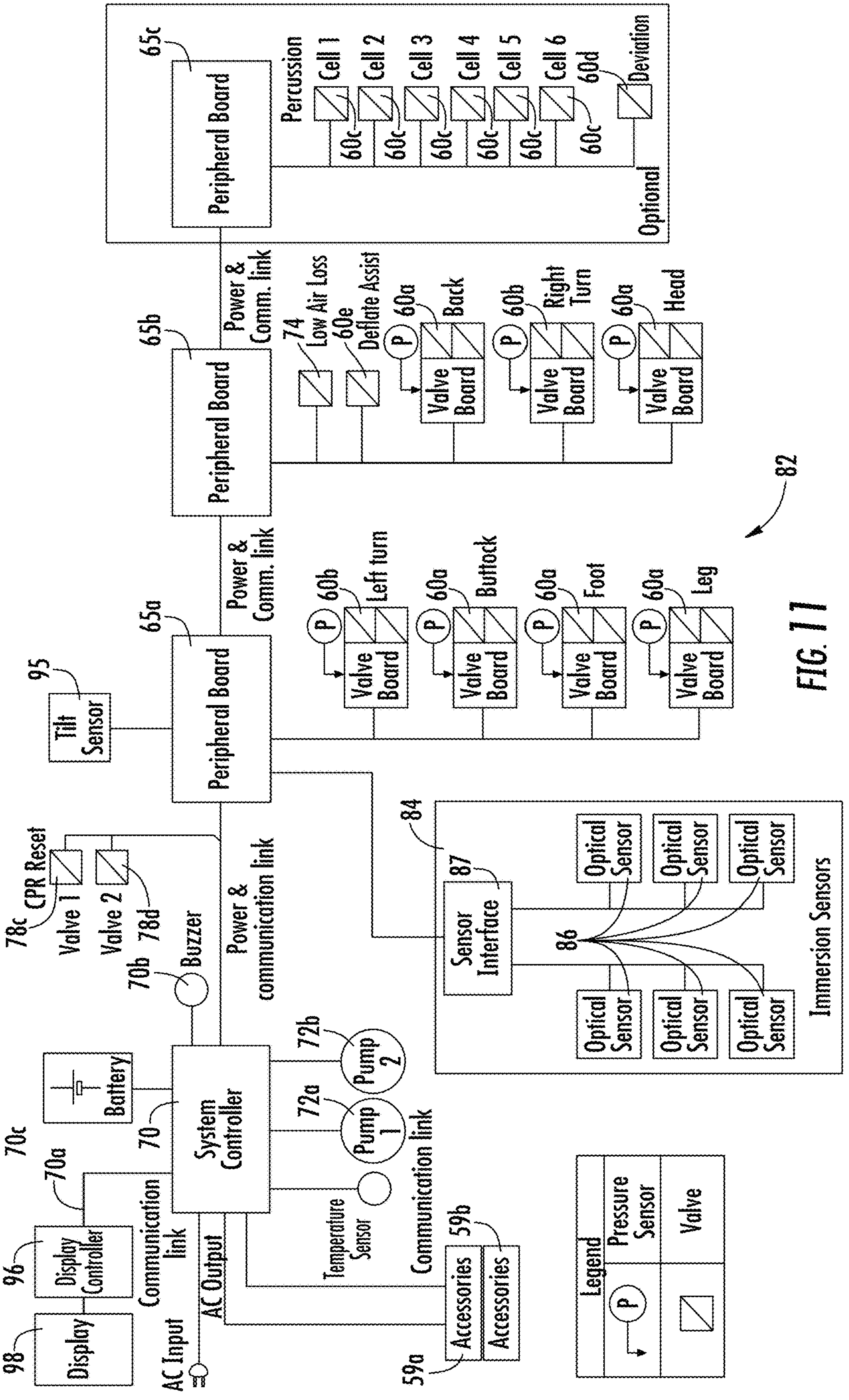
FIG. 11 is a block diagram of the control system of the present invention.

Referring to FIG. 3A, each enclosure 54 houses one or more valves 60 for controlling the inflation and deflation of various sub-groups or zones of bladders, e.g. the head zone, the torso zone, the leg zone, and the foot zone, through conduits 50*b*, 54*b*, or 56*b* with one valve for each zone or sub-group. Further, as noted, conduits 50*a*, 54*a* and 56*a* are used to exhaust air from the respective bladders. Air is typically delivered to bladders 18*a* and 18*b* in a pressure range of about 0.05 to 2 psig, with the exception of a maximum inflate condition, which occurs typically after a CPR event and at a higher pressure to quickly return the bladders to their normal inflated state. Referring again to FIG. 4, enclosure 54 at the head end (which is at the head end of the frame) houses a bladder inflation valve 60*a*, which controls the inflation of bladders 18*a* and 18*b* and, more specifically, the head end group of bladders 18*a* and 18*b*. In the illustrated embodiment, enclosure 54 at the head end left side of the frame may also include a valve 60*b* for controlling the inflation and deflation left side turn bladder 18*d* (FIG. 9), with an enclosure 54 on the right side of the mattress housing a valve 60*b* for controlling the inflation and deflation right side turn bladder 18*d*. Similarly, the foot end enclosures 54 enclose the valves 60*a* for controlling the foot end bladders. In addition to housing valves 60*a*, 60*b*, the enclosures 54 may also enclose and provide mounting locations for local control boards 65*d*, 65*e*, 65*f*, 65*g*, and 65*h* (FIG. 5) (I/O cards), which are in communication with and powered by a main controller 70 and the main controller power supply (FIG. 11). Controller 70 is a microprocessor based controller, with one or more processors, a power supply, and one or more memory devices.

Mattress 10 may also include back-up battery power for when mattress 10 is unplugged from a bed based control and power supply (described below), which allows controller 70 to monitor pressure in bladders 18 to see if there is a leak and generates warning when pressure is too low, which provides a means to assure that control system is plugged in or to detect when surface is leaking. Controller 70 along with the pumps/compressors of the pneumatic system are also optionally located in enclosure assembly 58 located at the foot end of the mattress 10.

Figure 11A:
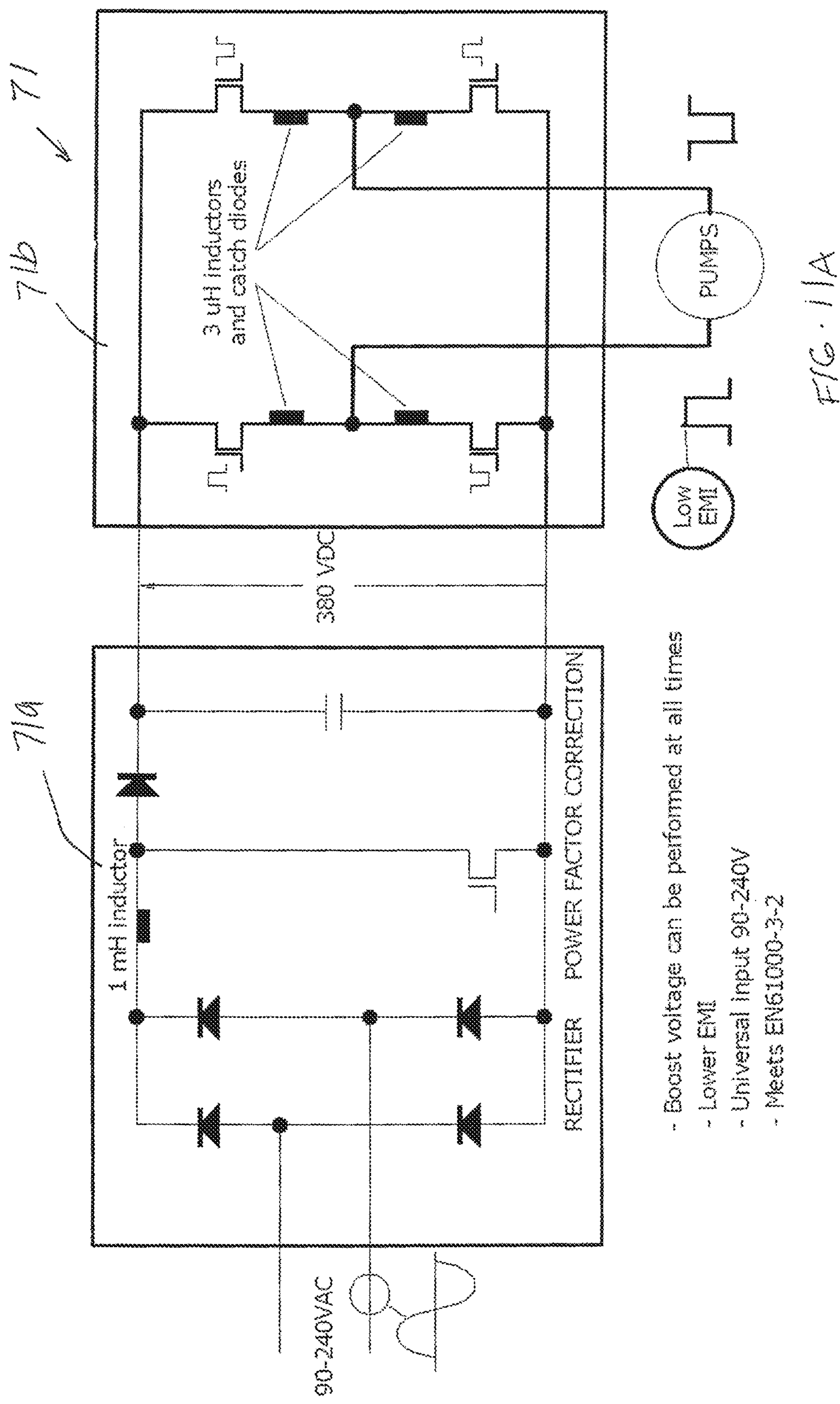
FIG. 11A is a schematic drawing of the power regulator electronics for the pump.

Referring to FIG. 11A, controller 70 uses a closed-loop regulator and an integrated pump inverter 71, which includes a rectifier 71*a* and an inverter 71*b* to automatically adjust to provide constant performance whatever the AC configuration of the main power supply (off the bed). The result is a universal power supply, which can accommodate 90-240v, and 50-60 Hz, which eliminate the need for a heavy transformer, and which can be used anywhere in world.

To deliver air to the various bladders, the valves may be coupled to the respective inlets of layer 16 via conventional tubing. As it would be understood, the valves to control the bladders may therefore be advantageously located so that the distance between the respective valves and bladders they control is minimized. In this manner, the amount of tubing to inflate the various bladders may be significantly reduced over prior art inflatable mattress surfaces and, moreover, may all be contained and enclosed in the surface.

Referring again to FIG. 4, enclosure 56 optionally supports a plurality of valves 60*c* for controlling the flow of air to bladders 18*c* used for vibration or percussion therapy, which deliver air at a higher pressure, for example, at 3 to 9 psig though it could be as high as 15 psig. For example, the pressure in the reservoir may be in a range of 0 psig to 15 psig, 2 psig to 15 psig, 2 psig to 12 psig, or 4 psig to 9 psig, including around 4.5 psig.

Similar to valves 60*a*, valves 60*c* comprise electrically operated valves, such as solenoid valves, and also may comprise large orifice valves. Optionally, valves 60*c* are fast response valve to let bursts of air into the mattress. Valves 60*c* are in fluid communication with conduits 56*b* and 56*c* and are controlled by control boards 65*a*, 65*b*, and 65*c* mounted in enclosure 56, which are in two-way communication with controller 70 and are powered by the controller power supply.

Figure 5:
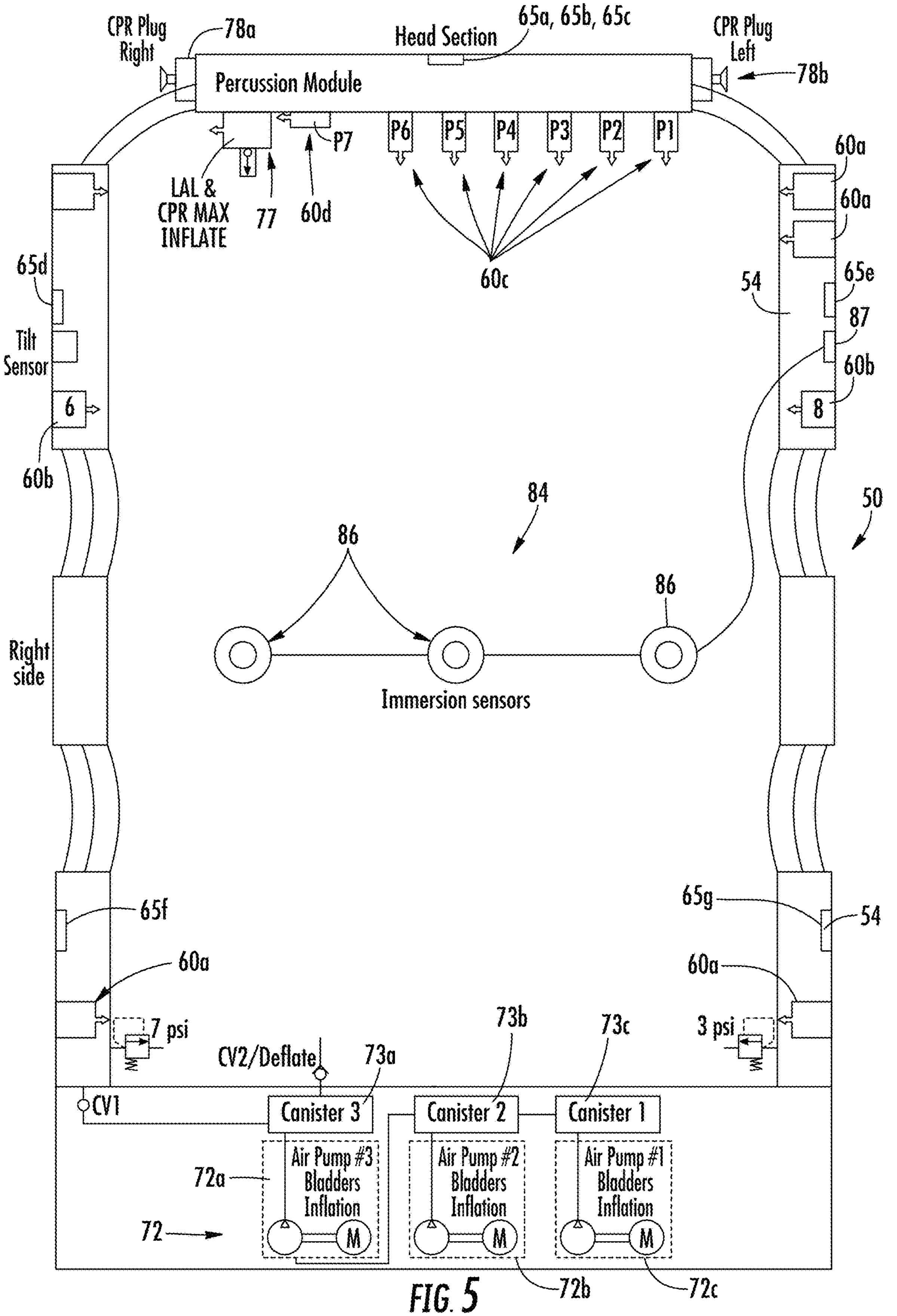
FIG. 5 is a schematic plan view of the layout of the control system in the patient support.
Figure 7:
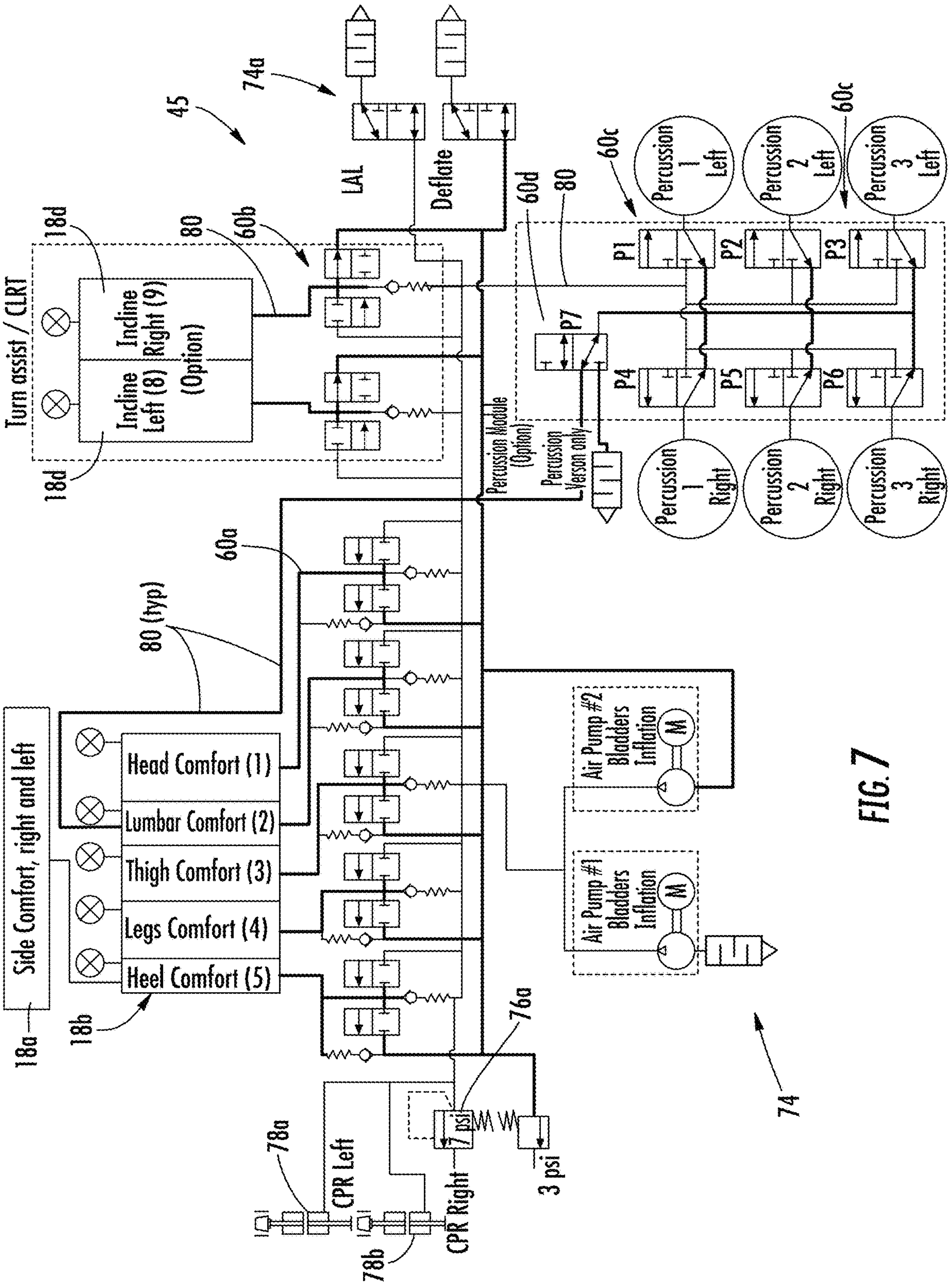
FIG. 7 is a schematic drawing of the pneumatic control system of the control system of the patient support.
Figure 8:
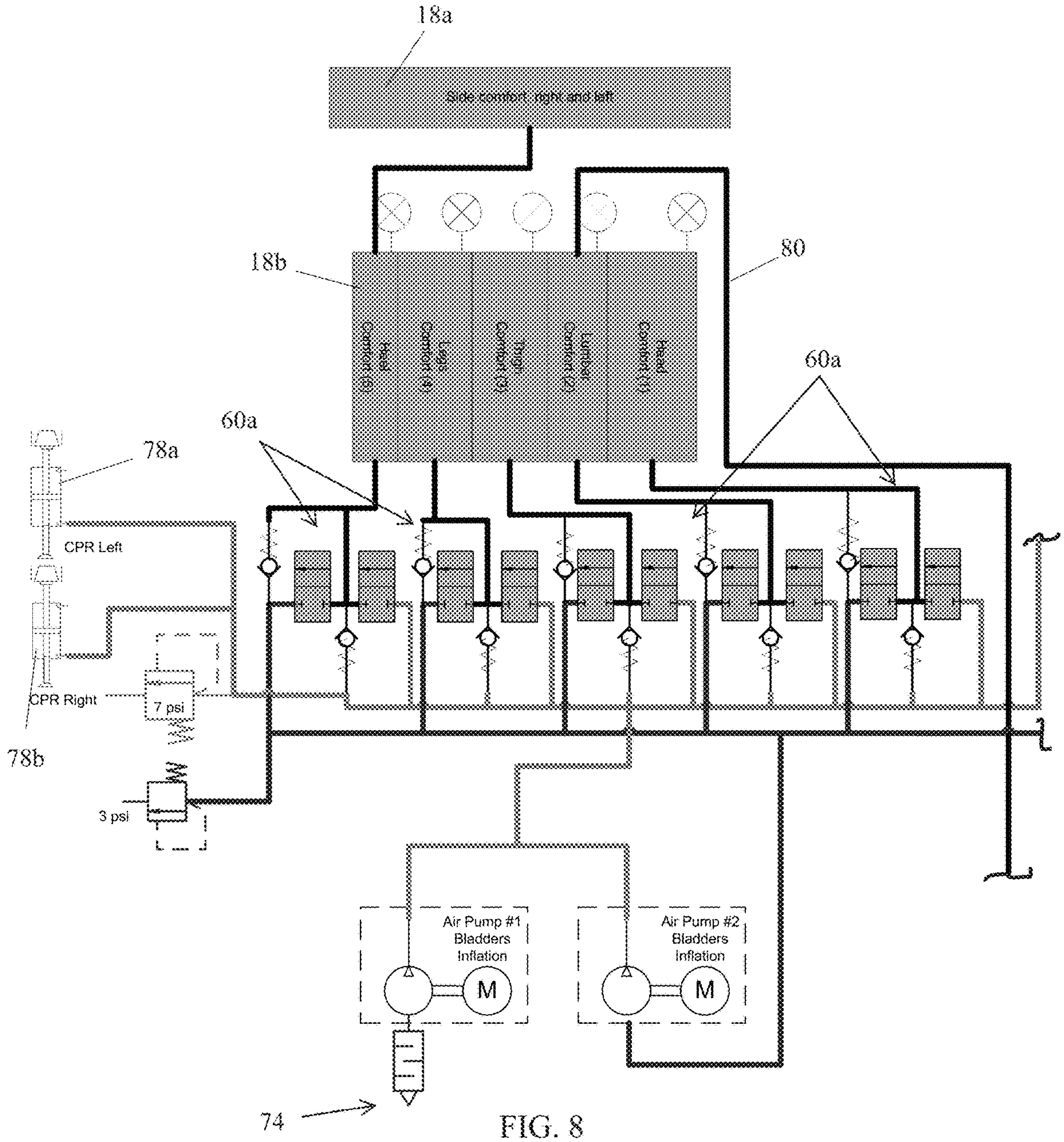
FIG. 8 is an enlarged view of the inflation portion of the pneumatic control system of FIG. 7.

To supply air to conduits 50*b*, 54*b*, and 56*b*, as noted pneumatic system 45 includes one or more air delivery devices, namely compressors or pumps 72 (FIG. 3A), such as 120 volt pumps. Optionally, two (such as shown in FIGS. 7 and 8) or three (such as shown in FIGS. 5 and 11) or more pumps 72*a*, 72*b*, and 72*c* may be provided, with pump 72*a* providing airflow to conduit 50*b* for bladder inflation or turn therapy, and pumps 72*b* and 72*c*, which are connected in series with each but in parallel with pump 72*a*, providing airflow to conduits 50*b*, 54*b*, and 56*b* for percussion/vibration, which require a greater flow of air than bladder inflation and adjustment. In this manner, one, two, or three of the pumps may be used, which allows for smaller pumps to be employed and thereby reduce the noise and vibration and also heat generated by the respective pumps. Additionally, the output of each pump may be directed into the air delivery system through canisters 73*a*, 73*b*, and 73*c* to further reduce noise, such as described in U.S. patent application Ser. No. 11/939,829, filed Nov. 14, 2007, now U.S. Pat. No. 8,201,292, and commonly owned by Stryker, which is incorporated in its entirety by reference herein.

Figure 15:
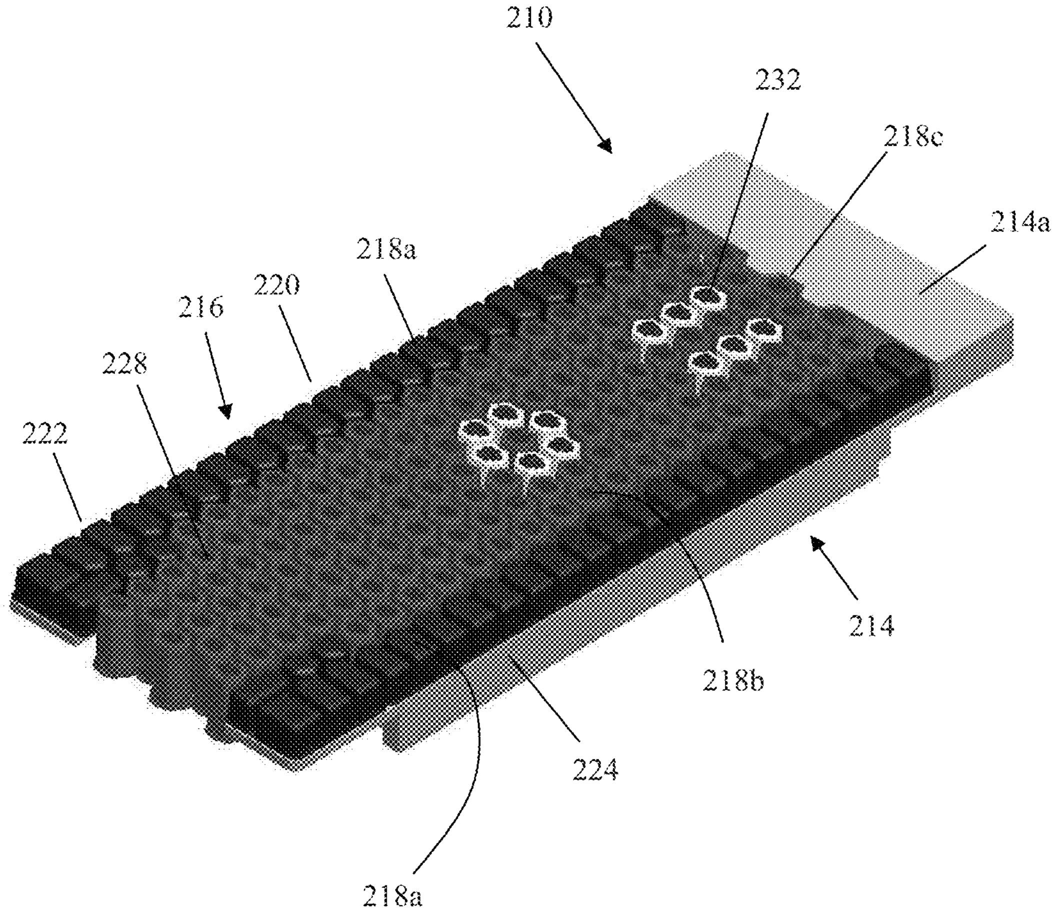
FIG. 15 is a perspective view of another embodiment of the bladder layer incorporating a foam cushion at the head end of the layer.
Figure 15A:
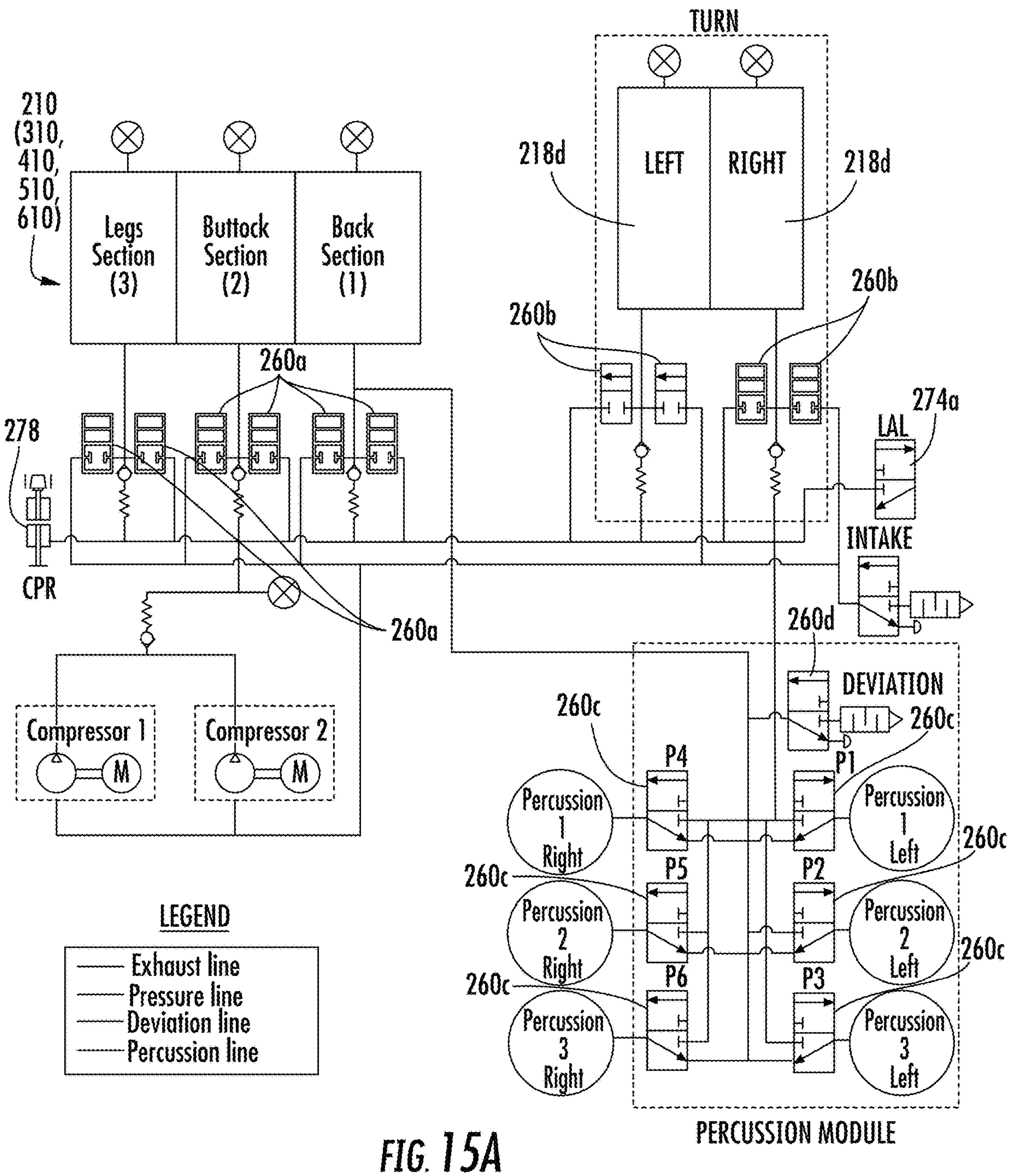
FIG. 15A is a schematic drawing of another embodiment of the pneumatic control system of the patient support.

Further, as illustrated in FIG. 15A in reference to the embodiments described below, where noise reduction is desired, an even number (2N, where N is an integer) of pumps may be used in 180° phase to cancel vibration. For example, one of the pumps may have its electrical connection reversed from the other pump. Alternately, N number of pumps may be used in combination with N number of actuators having the same or substantially the same inertia, stroke, etc as the pump or pumps to counter balance vibration of pump or pumps.

In addition to inflating bladders 18*a*, 18*b*, 18*c*, and 18*d*, one or more of the pumps may be used to direct air to a low air loss system 75 (FIG. 11). For example, the low air loss system may include perforated tubing positioned between some of the bladders so as to direct air flow across or between the bladders, which air flow would facilitate the removal of moisture from the patient's skin. Further, tubing or tube extensions or perforated bladders may be provided to extend up between the support bladders to direct air close to the support surface. Alternately, air loss conduits may be formed in the bladder layer, for example, the base sheet between the support bladders.

To control the flow of airflow from pumps 72*a*, 72*b*, and 72*c* to the low air loss system (LAL), pneumatic system 45 includes valves 74*a*, such as solenoid valves, which are controlled by main controller 70. Additionally, the control system includes valves 74*b*, which direct air to check valves 76*a*, 76*b*, which in turn direct the flow of air to quickly inflate bladders 18*a*, 18*b*, 18*c* to do a max inflate CPR. Alternatively, CPR plugs 78*a* and 78*b*, which allow manual opening of the pressure line so that all the bladders can be quickly deflated so at least the chest area of the patient, can rest on the flat hard surface of the deck of the bed and allow a caretaker to administer CPR to the patient. In addition, as noted above, air from the CPR supply line may be exhausted through a CPR pressure regulator valve 78 (FIG. 11), which is powered and in communication with controller 70 so that the reset of the valve after a manual activation may also be controller by controller 70. After CPR is administered the bladders 18 can then be inflated quickly through valves 74*b* or a CPR max inflate valve 77, which provides a maximum inflate function after the bladders have been deflated to restore quickly the support surface to its inflated state. As will be more fully described below, a single CPR valve may be used instead, also with an optional auto reset feature.

As noted above, valves 60*c* deliver airflow to bladders 18*c* at a pressure sufficient to generate transient forces at the respective patient facing surfaces. For example the pressure, as noted typically would fall in a range of 3 to 9 psi, but be as high as 15 psi. Each valve 60*c* may be independently controlled so that the vibration or percussion therapy may be applied using one or more of the bladders alone or in combination with the other bladders and, further, in any desired sequence. In addition, pneumatic system 45 may include a diverter valve 60*d*, which can divert the exhaust air from the bladders 18*c* to bladders 18*b* and 18*a* (FIG. 7) to avoid over pressurization of bladders 18*c*.

Optionally, when inflated, bladders 18*b* and 18*c* are inflated to a volume that is less than their full volume so that the bladders are in an un-stretched state when inflated. Further, when the bladders are operated and the pressure in the bladders falls below a preselected threshold value, the pressure in the bladders is increased but the volume is still maintained below the full volume of the bladders. When air is directed to bladders 18*c* to apply percussion or vibration, the volume of the bladders may still maintained below their full volume to thereby reduce fatigue in the material forming the bladders.

As previously described, one or more bladders on each side of the surface 10 may be inflated to provide turn therapy. Turn bladders 18*d*, as noted, may be located under bladders 18*b* and 18*c* and are inflated by valve assemblies 60*b*, which as noted may be located in enclosures 54 and controlled by local control boards 65*a* and 65*b* (FIG. 5). Valves 60*b* may also be located at head end enclosure 56. In use, the turning bladders are used for turning one side of the mattress while the other remains generally stationary. Though it should be understood that the bladders on the stationary side may have their pressure reduced to reduce their inflation to allow the person to immerse deeper into the surface while being turned to reduce the chances of a patient fall during turning. The turning bladders may be full length bladders that may extend substantially the full length of the mattress or may be segmented. Further, the segment turning bladders may be independently inflated or deflated to allow access to a portion of a patient's body while being turned or to effect a rolling turning effect or just to turn a portion of the patient's body. For examples of optional controls for and examples of suitable turning bladders, reference is made to U.S. application Ser. No. 12/234,818, filed Sep. 22, 2008, now U.S. Pat. No. 8,296,887, entitled RESILIENT MATERIAL/AIR BLADDER SYSTEM; and U.S. application Ser. No. 11/891,451, filed Aug. 10, 2007, entitled TURN-ASSIST WITH ACCESS AREAS, which are incorporated herein by reference in their entireties.

Each of the valves noted herein are in fluid communication with the respective bladders via flexible tubing sections 80 (FIG. 7). As described previously, the bladders 18 are formed between two sheets of material with a network of passageways formed between the two sheets so that the inlets to bladders 18*a* and 18*b* may be located around the periphery of the bladder layer 16. As noted previously, the inlets to bladders 18*c* may be located at the underside of layer 16 so that the tubing to inflate the percussion vibration therapy bladders (bladders 18*c*) extends under layer 16 to connect to bladders 18*c*. Turning bladders 18*d* may also similarly include inlets at their underside or at their periphery so that the tubing for inflating bladders 18*d* also extends under layer 16. In this manner, at least valve assemblies 60*a* can be located in close proximity to the inlets of their respective bladders, which as noted can minimize the amount of tubing needed in the surface.

In addition to controlling the pressure in the bladders, controller 70 is also adapted to regulate the pressure in the respective bladders 18 via valve assemblies 60*a*, 60*b*, and valves 60*c*, and 60*d*, which are in fluid communication with the air supply side of the pneumatic system but exhaust air when the pressure in the respective bladders exceeds a predetermined maximum pressure value. As noted above, it may be desirable to control the inflation of the bladders so that they are not stretched and instead are inflated between two volumes that are less that the maximum volume of each bladder (unstretched maximum). As a result, the mattress can be filled quickly and managed (pressure and immersion (see below)) and also able to deliver percussion or vibration with the same air supply.

Additionally, controller 70 may also include an immersion control system 84 (FIG. 5). Immersion control system 84 includes one or more sensors 86, which sense the immersion of a patient into the bladders 18 and generates a signal to the main controller 70. Based on the signals from sensor(s) 86, the main controller will adjust the pressure in the respective bladders 18 so that the immersion is adjusted to a pre-determined magnitude or to a selected magnitude, as will be more fully described below in reference to the operation of the controller and display.

Figures 10A, 10B:
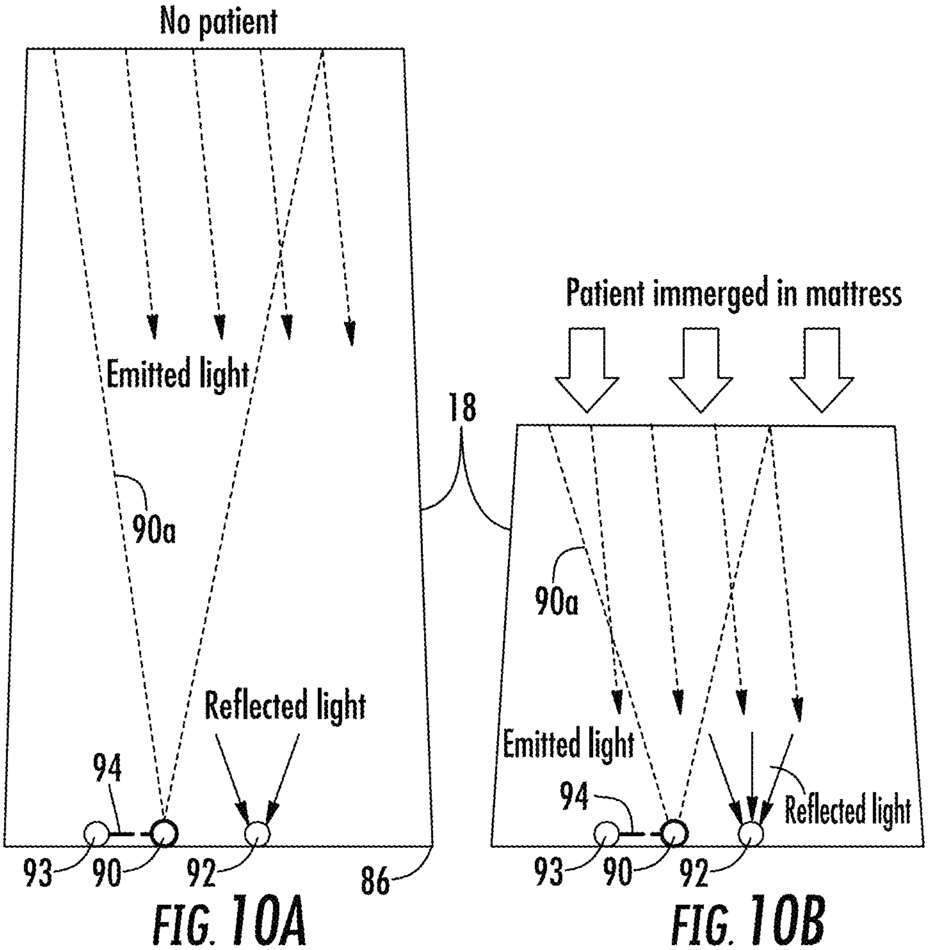
FIG. 10A is a schematic drawing of a sensor that may be incorporated into the patient support for detecting patient immersion with the bladder shown without a patient on the surface.
FIG. 10B is similar schematic drawing to FIG. 10A but with the bladder supporting a patient who is immersed in the mattress.

Referring to FIG. 10, each sensor 86 may comprise an optical sensor assembly 88. In the illustrated embodiment, each optical sensor assembly 88 may be located in or below a bladder 18. For example, when the sensor assembly is located below the bladders, the base sheet may have a transparent portion to allow light to pass through. Assembly 88 includes a light transmitter or transmitting device 90, such as an LED, and a light receiver or receiving device 92, such as a light sensor, which are powered by and in communication to main controller 70 via circuit board 87, which may be located in enclosure 54. To determine the immersion of a patient, main controller 70 powers light transmitter 90 and receives signals from device 92 from the reflection back, which signals are converted and then compared to stored values in the memory device of the controller. When light is transmitted from light transmitter 90, the light is projected upwardly (90*a*) toward the underside of the patient facing surface of the bladder. Receiver 92 then detects the reflection of the light and generates a signal, which is a function of the intensity of the reflected light. The light intensity of the reflected light increases as the bladder is compressed, which increase in intensity is detected by receiver 92. Using the signals from receiver 92, main controller 70 is then able to determine the degree of immersion of a patient into the surface. As noted, controller 70 determines the degree of immersion from the signals it receives from device 92 and then compares it to a stored value, such as a stored maximum and/or minimum immersion value, which is stored in the memory device of the main controller (for that region or group of bladders) to determine whether the pressure in the respective bladder or bladders needs to be adjusted. The memory device of the controller may have different values for different regions of the mattress, and further these values may be adjusted, as noted below. If the pressure is too low, controller 70 adjusts the respective valve to direct air flow to the respective bladder or bladders in the region where the immersion is found to exceed the maximum immersion for that region. Similarly, if the immersion is less than the minimum immersion for that region, controller 70 will actuate the respective valves to vent air in the respective bladders. In this manner, the degree of immersion may be used to manage pressure on the patient's skin. Further, an immersion map may be generated and displayed (for example at display 98 discussed below) using software stored in controller 70 in mattress 10 or in a main control (for example control 96 discussed below) in a bed on which mattress 10 is supported, which could be used as a pressure map. Additionally, as noted below, the degree of immersion can be adjusted. For example, the pressure behind the legs of a patient may be increased while decreasing the pressure on the heels of a patient, to reduce the likelihood of sores.

Optionally, optical sensor assembly 88 may include a channel 94 to allow light to be transmitted directly to a second receiver 93 so that the intensity of the light emitted by light emitter 80 remains constant whatever the operating conditions, which allows the system 88 to adjust itself to compensate for any decay in light emitted from light transmitter 90.

As noted above, optical sensor assembly 88 may be located inside the bladder or outside the bladder, when the bladder is formed from a translucent or transparent material. In this manner, for example, the optical sensor assemblies may be arranged in an array on a common substrate beneath the bladder layer 16. As noted, light is emitted into the inside of the bladder, and optionally directed to the top side of the bladder. The reflection back is received by the receiver, which reflection may then used to determine the change in the volume of the bladder, though the sensor could alternately be used to measure distance or special difference. The light may be infrared (such as by way of an infrared LED) and also may be supplied by another light source, such as a fiber optic cable or another light pipe. Other sensors that may be used measure inductance. For example, an inductive sensor may include an inductive coil, which collapse under pressure and whose inductance changes as it collapses. Other sensors may measure electromagnetic coupling between one or more emitters and a receiver antenna.

To provide greater accuracy, the inside or the whole bladder (with the sensor assembly) is formed from a light material, such as white or another light color, to minimize light absorption into the bladder itself. Optionally, the inside of the bladder may have a reflective coating or layer. For example, the bladder may be formed from two layers, an inside layer with a light color (or reflective) and an outer layer that is formed from a darker color material. The two layers may be co-molded or co-formed when forming the bladder, or the outer layer may be applied post forming, such as by coating, including by spraying, dipping or the like. In this manner, the receiver will less likely to be impacted by the ambient light outside the bladder.

Where the bladder is formed from a light material (not just with a light interior) or is not totally opaque, the processor or electronics on the PCB may be configured to compensate for the ambient light outside the bladder. Therefore, the filter may be a physical layer or an electronic or signal processing filter.

Each of the seat and back section zones of the mattress may have at least one sensor, which are linked together. Further, as noted, the control system may use the sensors to drive the pressure to the bladders to adjust or control the pressure distribution, which can allow the pressure in the bladders to be tailored to each patient.

Alternately, as noted, a pressure sensitive sensor may be used to detect the immersion of a patient into mattress 10. For example, a suitable pressure sensor may include a thin membrane that changes capacitance or resistance in response to pressure, which again is in communication with the controller 70, which then determines the immersion based on the capacitance or resistance and compares the immersion to stored maximums and/or minimum values for the desired immersion. In addition, one or more the bladders may have other sensors at their top side. For example, the sensor or sensors may be overmolded on or in top side. For example, the sensors may include temperature sensors, humidity sensors, and also the pressure sensors noted above.

Furthermore, controller 70 is adapted to provide two-way communication between controller 70 and bed based control board 96 via a communication data bus 70*a* to transmit information or receive control signals or information relative to the surface. In addition, bed base main controller 96 may be configured to display information relative to mattress at a display 98, such as a display mounted at, in or to the footboard of the bed. Further, display 98 may be configured, such as by the processor or processors on the bed base main control board, to provide user interface devices to control the functions or therapies at mattress 10.

Referring to FIG. 11, controller 70 may also be in communication with a tilt sensor 95 mounted in, for example enclosure 54, which generates signals to controller 70 to indicate the angular position of the head section of mattress 10. Controller 70 may also control CPR reset valves 78C and 78D, which allows reinflation of the mattress 10 after a CPR has been initiated.

Further, to notify an attendant of an undesirable condition in mattress 10, for example when there is a loss of air or if there is an over pressurization condition, control system 82 includes an alarm such as a buzzer 70*b*, which the controller actuates when detecting an undesirable condition at mattress 10, such as a low pressure condition, as noted above. Additionally, control system 82 may include a speed control to limit the rate of inflation of the bladders and also a deflate assist valve 60*e*, which is in communication with controller 70 to provide a faster deflation of the bladders by making use of the fluid pumps 72*a* and 72*b* to suck the fluid from the bladders.

Referring again to FIG. 11, as noted control system 82 is in two way communication with bed based main control board 96 and display 96, which may comprise a touch screen display, such as described in U.S. applications entitled HOSPITAL BED, Ser. No. 11/612,428, filed Dec. 18, 2006, now U.S. Pat. No. 7,690,059; Ser. No. 11/612,405, filed Dec. 18, 2006, now U.S. Pat. No. 7,805,784; Ser. No. 11/642,047, filed Dec. 19, 2006, now U.S. Pat. No. 7,962,981; and Ser. No. 11/612,361, filed Dec. 18, 2006, now U.S. Pat. No. 7,861,334 and U.S. application entitled PATIENT SUPPORT WITH IMPROVED CONTROL, Ser. No. 11/941,338, filed Nov. 16, 2007, now U.S. Pat. No. 9,038,217 which are herein incorporated by reference in their entireties, and further may be configured to control the various function/therapies at mattress 10 and, as described in more detail below, display information relative to mattress 10 at display 98.

Referring to FIGS. 13A-13H, display 98 includes a display screen 100, which in the illustrated embodiment comprises a touch screen that is configured to display the different functions/therapies that can be administered at mattress and their various parameters associated with each function/therapy. Display screen 100 is configured by bed base main controller 96 to generate a plurality of touch screen areas 100*a* (with their respective icons, touch screen areas, and other images) that allow a user to select between various functions of the bed and at the bed, including the functions/therapies provided by mattress 10. For further details of the other bed base functions other than the mattress base functions, reference is made to the above referenced copending applications.

Figure 12:
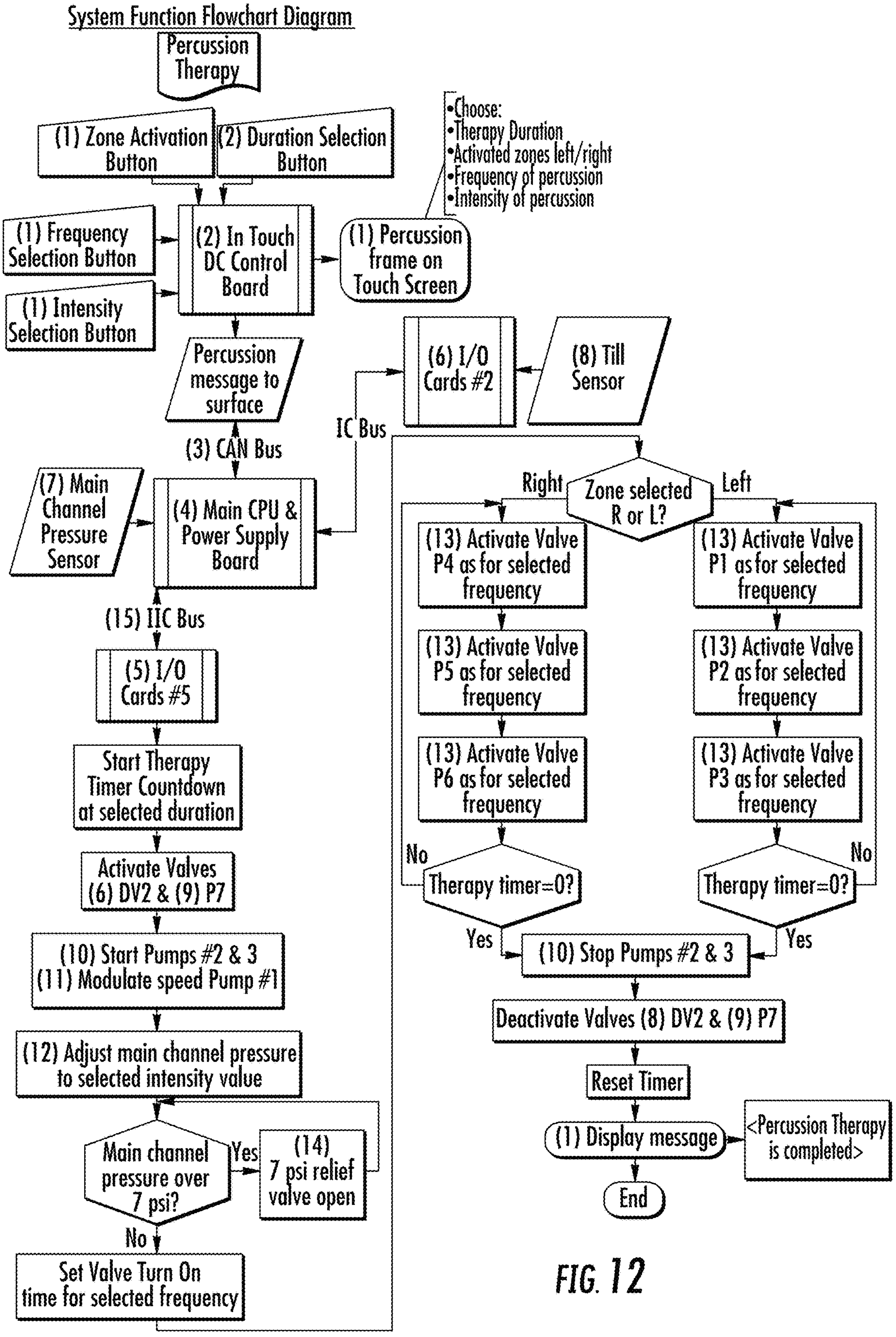
FIG. 12 is a flowchart of the percussion therapy functions optionally provided by the control system of the present invention.

When a user selects a touch screen area associated with the mattress (which is labeled "support surfaces" in the illustrated embodiment), the bed base controller 96 will generate additional touch screen areas 100*b*, with each touch screen area forming a user actuatable device so that a user can select between the various functions/therapies provided at mattress 10. In addition, when selected, control board 96 generates two display areas or regions 102 and 104. Display area 102 includes an icon 102*a* representative of the mattress and, further, a second icon 102*b*, which illustrates the turning bladders and includes regions adjacent the icons that indicate the degree of inflation of the turning bladders. Display area 102 further includes two touch screen areas 102*c* that also form user actuatable devices that allow a user to initiate a maximum inflate condition and a stop function, for example, to stop all therapies. For a detailed description of the inputs and operational steps of the percussion therapy, reference is made to the flow chart in FIG. 12.

Display area 104 may include a window 106, which lists the activated therapies and touch screen areas 108, which allow a user to scroll between the activated therapies. An additional window 110 provides details relative to the selected activated treatment and, further, may include another touch screen area 112 to allow a user to go to a menu to select the specific parameters for display in window 110.

Figure 13A:
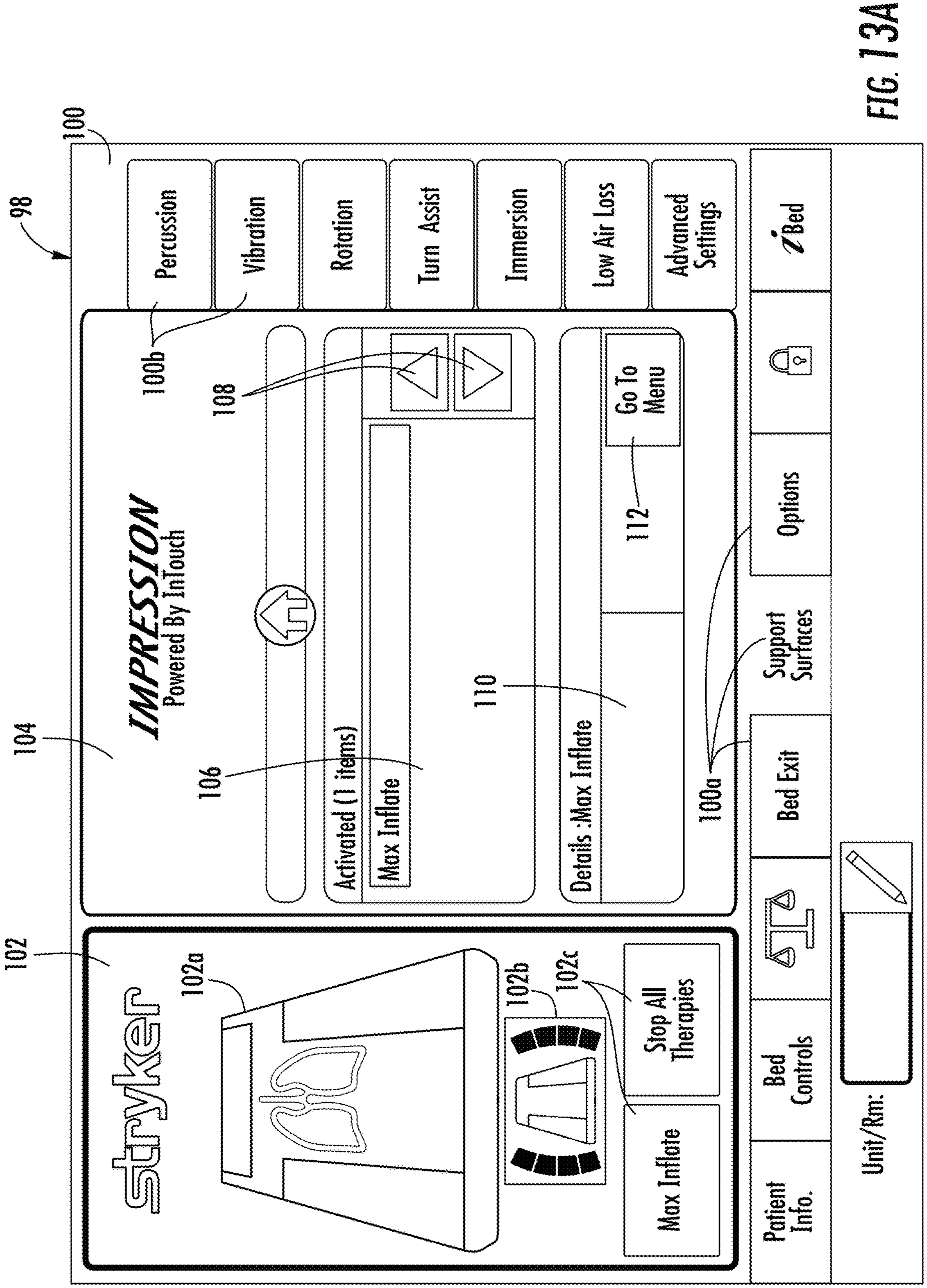
FIG. 13A-13H are screen shots of a display showing the various optional treatment protocols and may be provided by the control system of the present invention.
Figure 13B:
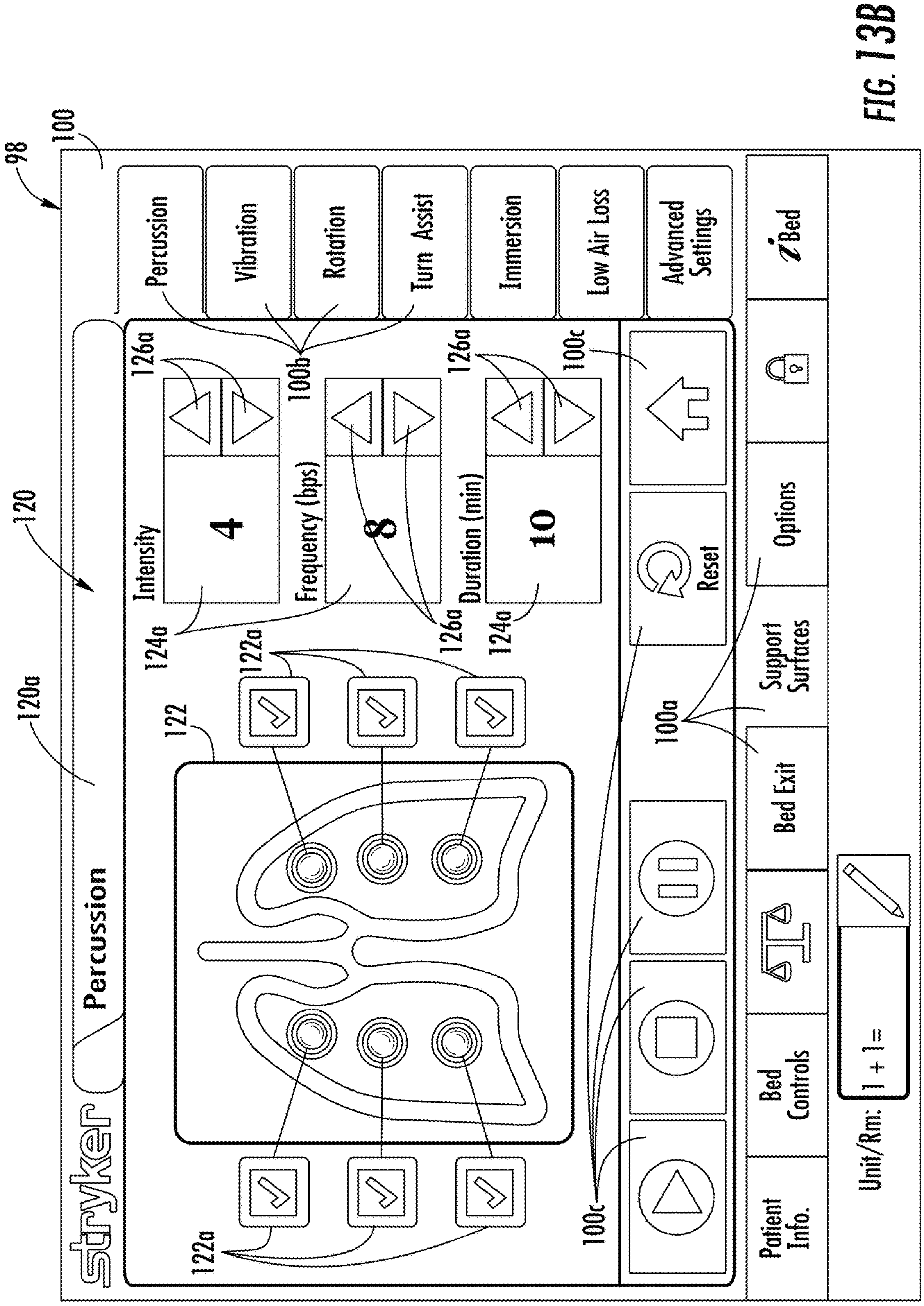

Referring to FIG. 13B, when a user selects the touch screen area 100*b* associated with the percussion treatment, main control board 96 generate displays 120 at screen 100 with a tabbed region 120*a*, which indicates the treatment selected. Display area 120 includes a pictorial display area 122 with a graphical representation of a patient's lungs and, further, with a plurality of touch screen areas 122*a*, which are visually linked to regions of the representative lungs via lines and allow a user to designate the region or regions of the patient's lung for treatment. Additionally, display area 120 includes a plurality of display windows 124*a*, 124*b*, and 124*c*, which each indicate a parameter relative to the selected treatment protocol. In addition, display area 120 further included a plurality of touch screen areas 126*a* associated with each of the windows to allow a user to increase or decrease the parameter, which is displayed in the window.

In addition, main control board 96 generates a third plurality of touch screen areas 100*c*, which appear with each of the treatment therapy windows described herein, and which allow a user to start, stop, or pause the treatment and, further, reset the treatment or return to the home screen or page for the mattress functions shown in FIG. 13A.

Figure 13C:
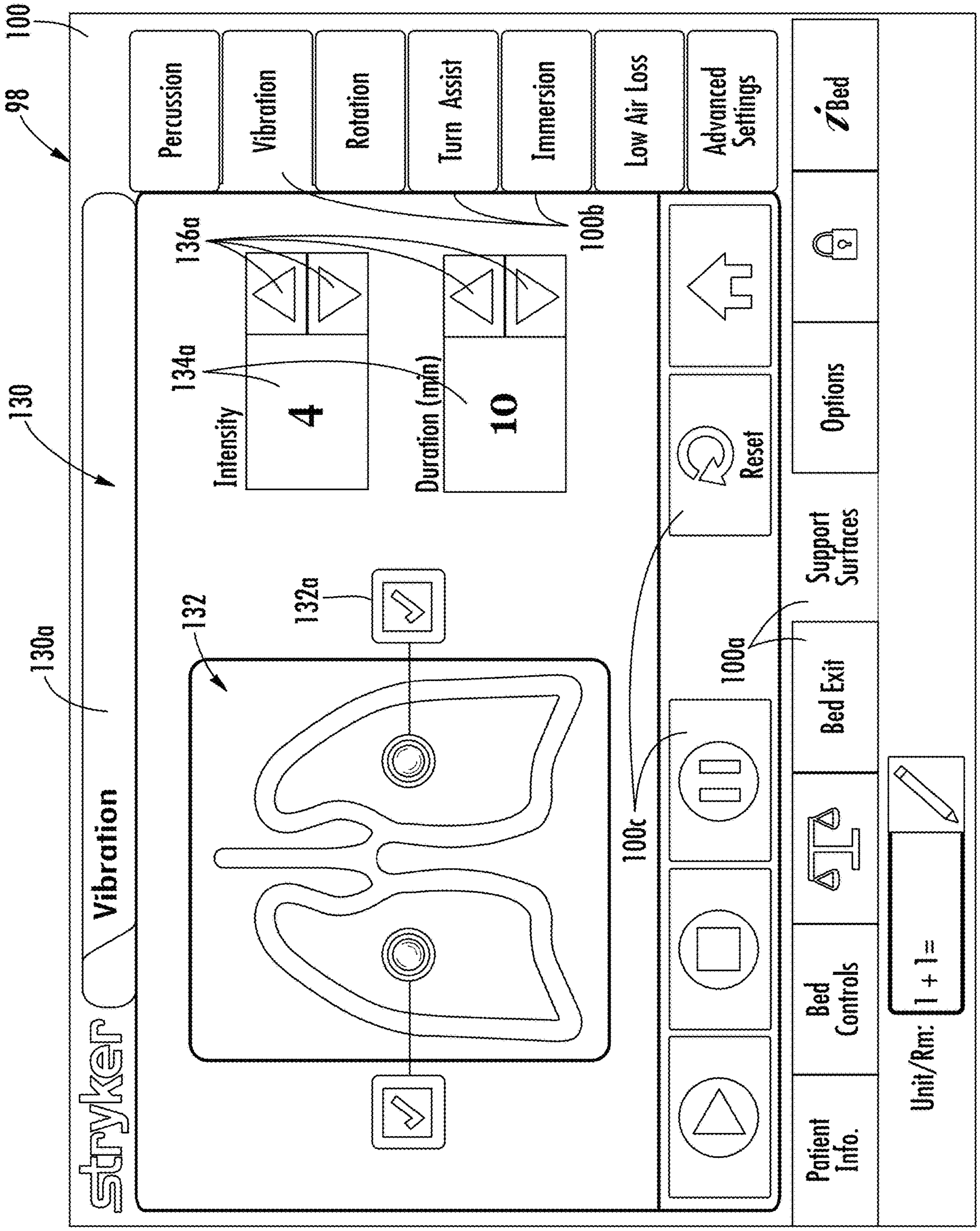

Referring to FIG. 13C, if a user actuates the touch screen area 100*b* associated with the vibration treatment, the main control board will generate a display area 130 at display screen 100, which similarly includes a tab portion 130*a* and, further, a display area 132 with a graphical representation of a patient's lung. In addition, display 130 includes a pair of touch screen areas 132*a* for a user to select where the treatment is to be applied, i.e. to the left or right lung. In addition, display area 130 includes two windows 134*a* and associated touch screen areas 136*a* which allow a user to increase or decrease the parameter associated with the windows, similar to the previous display area.

Figure 13D:
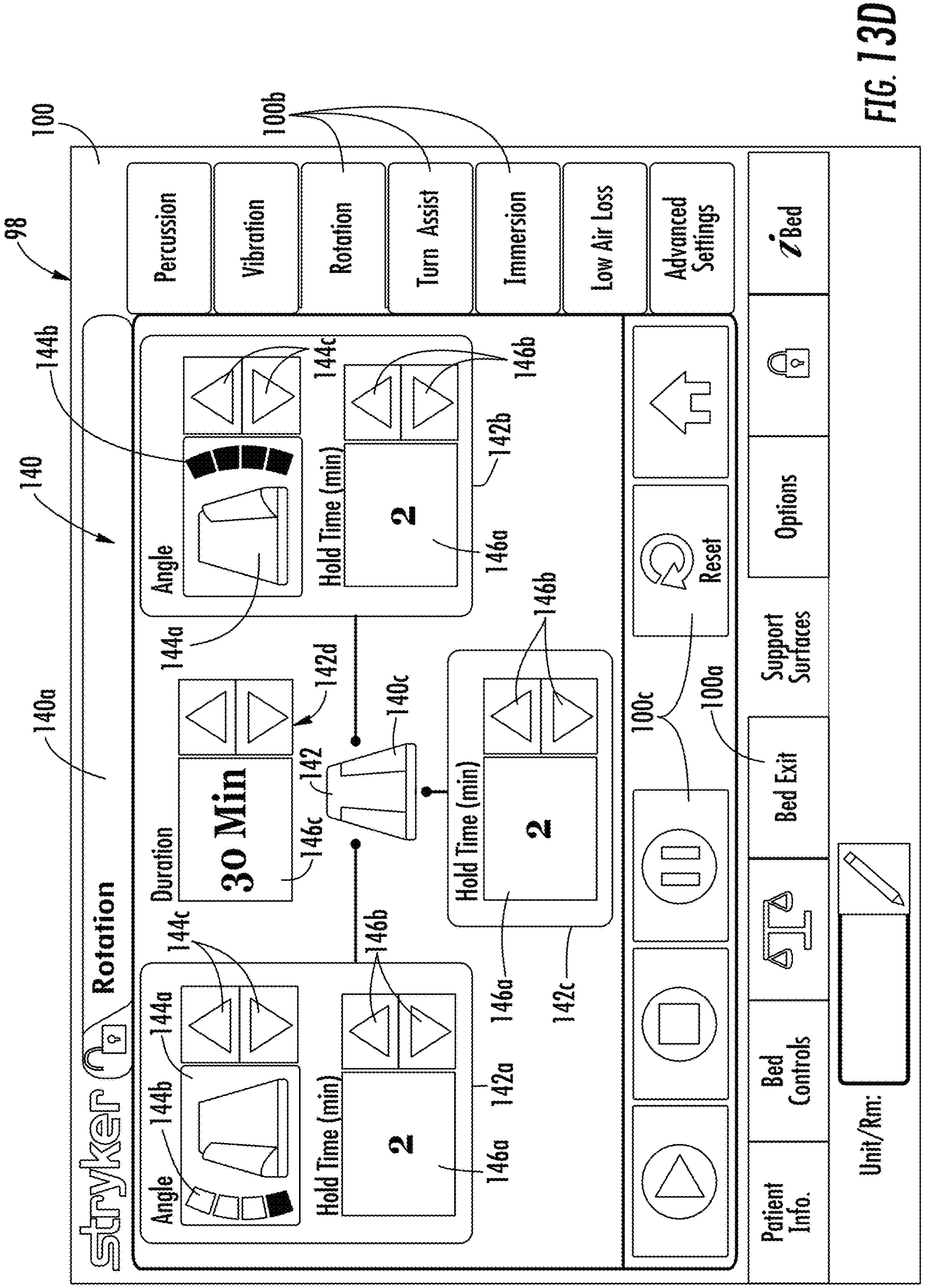

Referring to FIG. 13D, if a user selects the touch screen area associated with the rotation treatment, the main control board will generate a display 140 at display screen 100, which includes a tabbed portion 140, which similarly designates the selected treatment and a plurality of display areas 142*a*, 142*b*, 142*c*, and 142*d*. Further, display area 140 includes an icon 142, which is a graphical representation of the bed illustrating the turning bladders. The respective display areas 142*a*, 142*b*, 142*c*, and 142*d* are positioned around the icon 142 with the left most display area 142*a* including a graphical representation of the mattress illustrating the left turning bladder inflated and, further, a visual indicator 144*b*, which indicates the degree of inflation of the left turning bladder to provide a visual representation of the angle provided by the inflated bladder. Furthermore, display area 142*a* include a plurality of touch screen areas 144*c* that allow a user to increase or decrease the degree of inflation of the left bladder. In addition, display area 142*a* includes a window 146*a* and associated touch screen areas 146*b*, which display a parameter associated with the turning bladder, for example, the hold time, which can be adjusted by the touch screen areas 146*b*. Display area 142*b* is similar to touch screen area 142*a* but has an icon 144*a* illustrating the mattress with the right side turning bladder inflated and similarly includes touch screen areas 144*c* to allow a user to increase or decrease the inflation of the right side turning bladder.

Display area 142*c* includes a window 146*a* and touch screen areas 146*b* with window 146*a* also displaying a parameter relative to the rotational treatment, for example the hold time for the overall treatment, which can be adjusted using touch screen areas 146*b*. Display area 142*d* also includes a window 146*a*, which displays a parameter relative to the treatment, namely the duration of the treatment, which again can be increased or decreased using touch screen areas 146*b*.

Figure 13E:
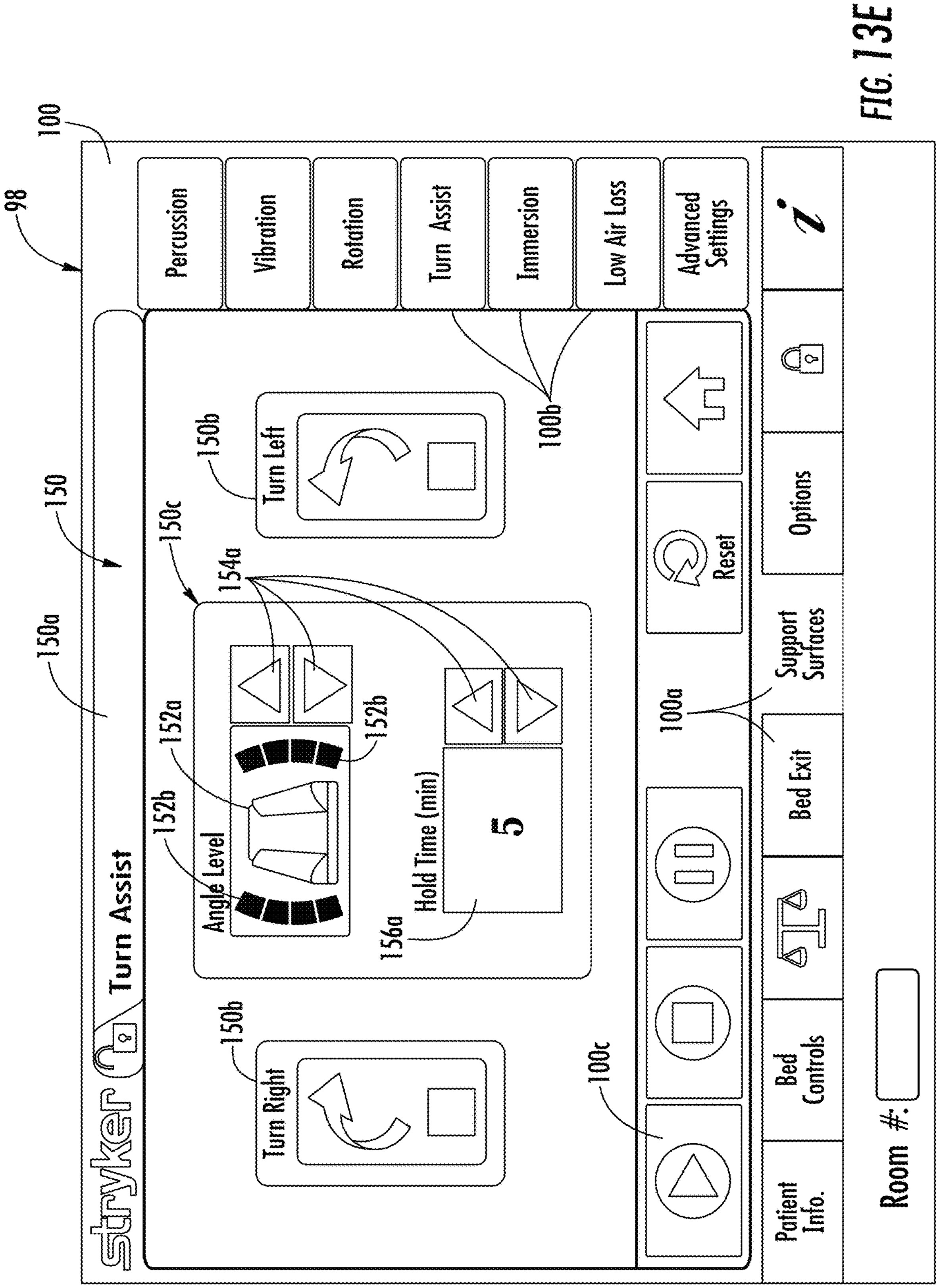

As best seen in FIG. 13E, when a touch screen area 100*b* associated with the turning function of mattress 10 is selected, the main control board will generate a display 150 at display screen 100, which also includes a tabbed portion 150*a* that identifies the selected treatment or function and a plurality of touch screen areas 150*b* and a display area 150*c*. Touch screen areas 150*b* allow a user to select between the right or left turning bladder. Once selected, the user can control the flow of air to and from the bladders 18*d* via control board 96 and controller 70 to thereby control the degree of inflation and the time of the inflation for the selected bladder using display area 150*c*. Display area 150*c* similarly includes a graphical representation of the mattress illustrating both turning bladders and touch screen areas 154*a* to control the inflation of the selected turning bladder. In addition, display area 150*c* includes indicators 152*b* to indicate the level of inflation and, therefore, provide a visual indication of the angle of the inflated turning bladders. Display area 150*c* also includes a window 156*a*, which displays a parameter relative to the turning function, for example the hold time, which can be similarly adjusted by the touch screen areas 154*a*.

Figure 13F:
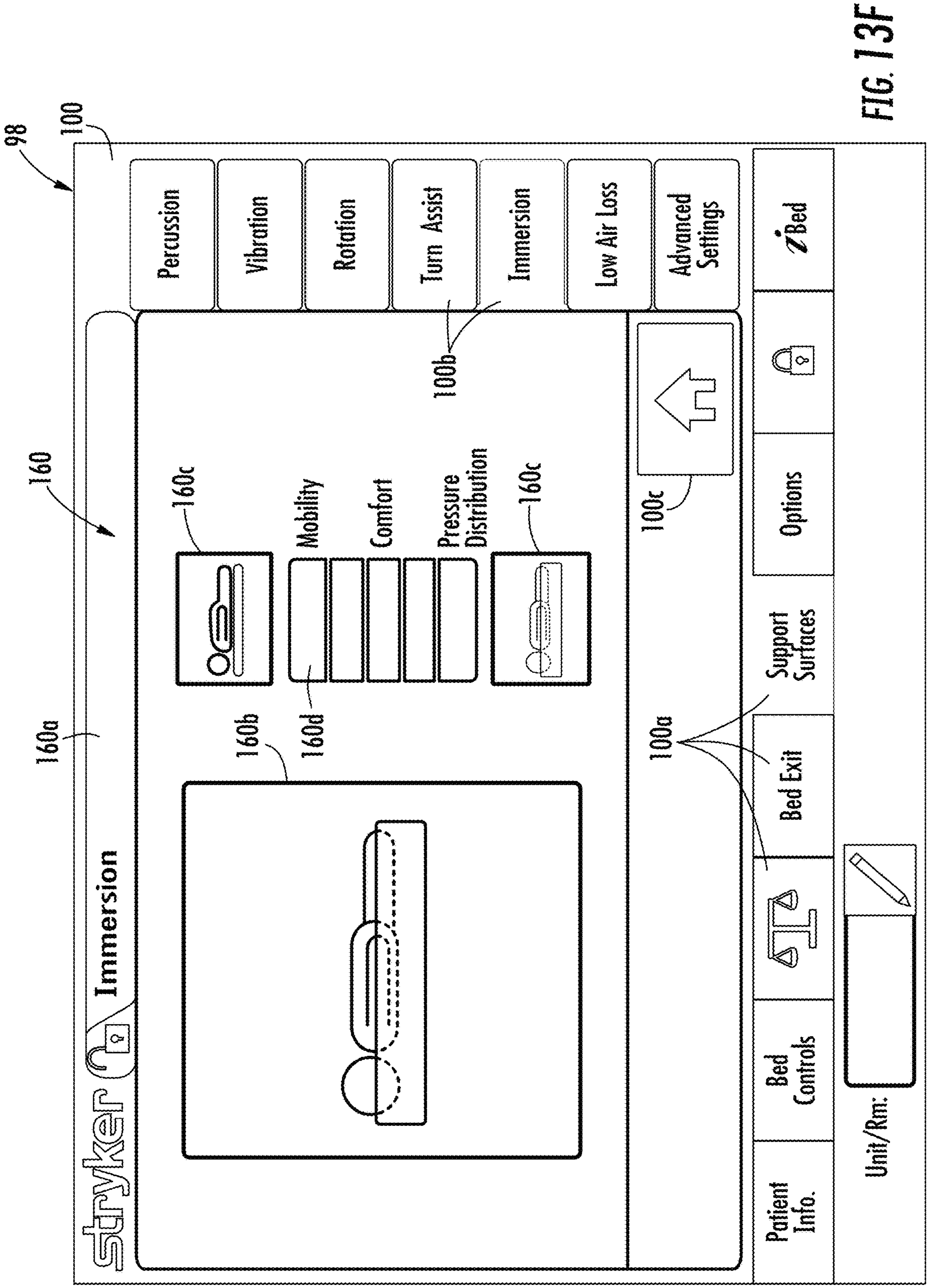

Referring to FIG. 13F, when a user selects the touch screen area associated with the immersion control function of mattress 10, the main control board 96 will generate display area 160 at display screen 100, which similarly includes a tabbed portion 160*a* and, further, an icon 160*b*, which is graphic representative of the immersion control function. Display area 160 additionally includes icons 160*c*, which indicate a no immersion condition and a full immersion condition, with a touch screen area in between icons 160*c*, which allow a user to increase or decrease the pressure in the bladders 18*b* via control board 96 and controller 70 to change level of immersion of the patient into mattress 10 between the no immersion condition and full immersion condition and anywhere in between. With immersion as the selected function, the main control board need not display the start, stop, and pause or reset touch screen areas associated with the treatment protocols.

Figure 13G:
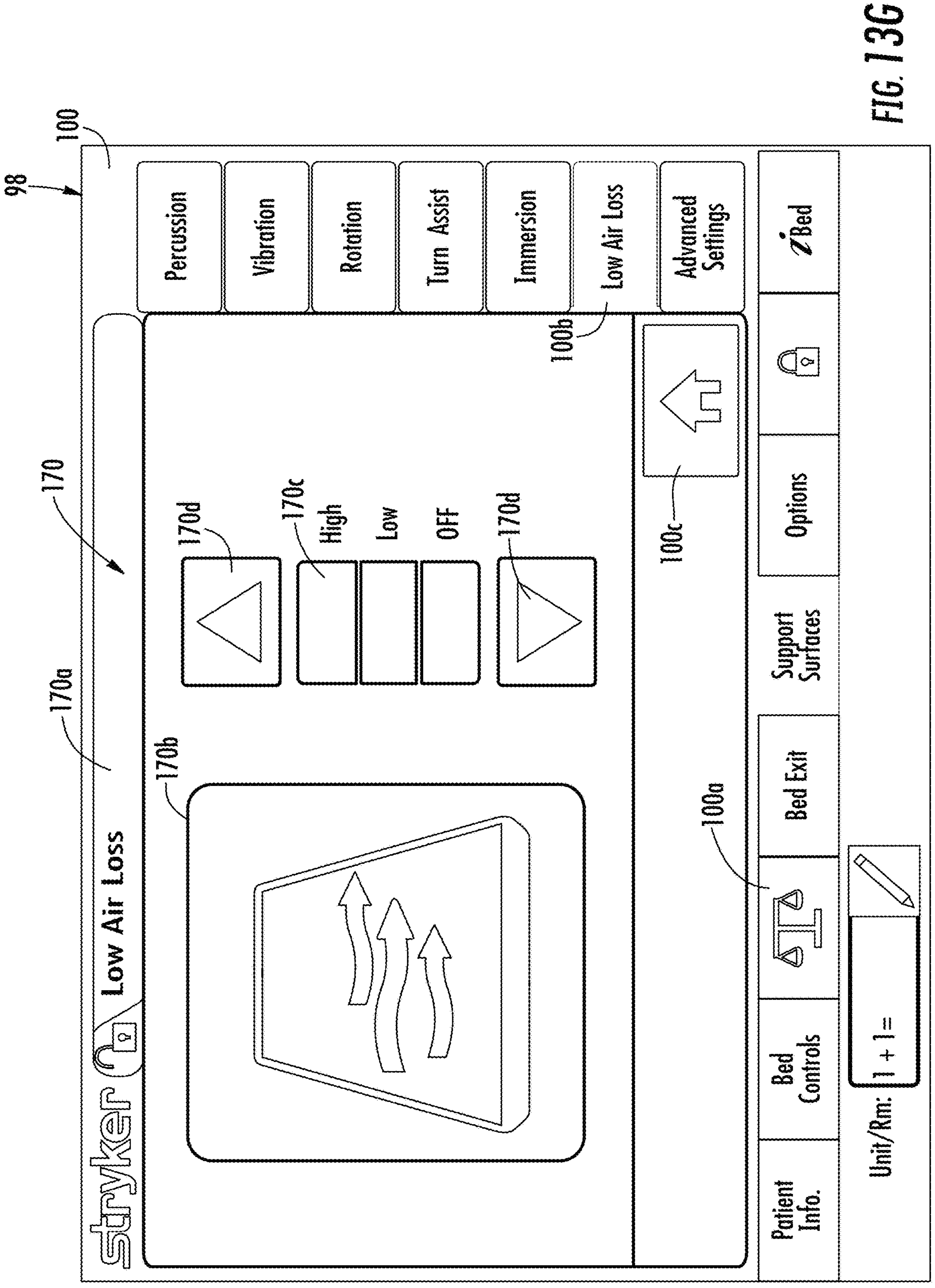

Referring to FIG. 13G, if a user selects the touch screen area 100*b* associated with the low air loss system of mattress 10, the main control board generates a display area 170 at display screen 100. Display area 170 similarly includes a tabbed portion 170*a*, which indicates that the low air loss system function has been selected and, further, includes an icon 170*b*, which is a graphical representation of the mattress and the low air loss system. In addition, display area 170 includes touch screen portions 170*d*, which allow a user to increase or decrease the flow of air in the low air loss system, which increase or decrease is illustrated in the window 170_c_ positioned between touch screen areas 170_d_ and further, which include indicia to indicate whether the low air loss system is operating at a high level, low level, or whether it is off.

Figure 13H:
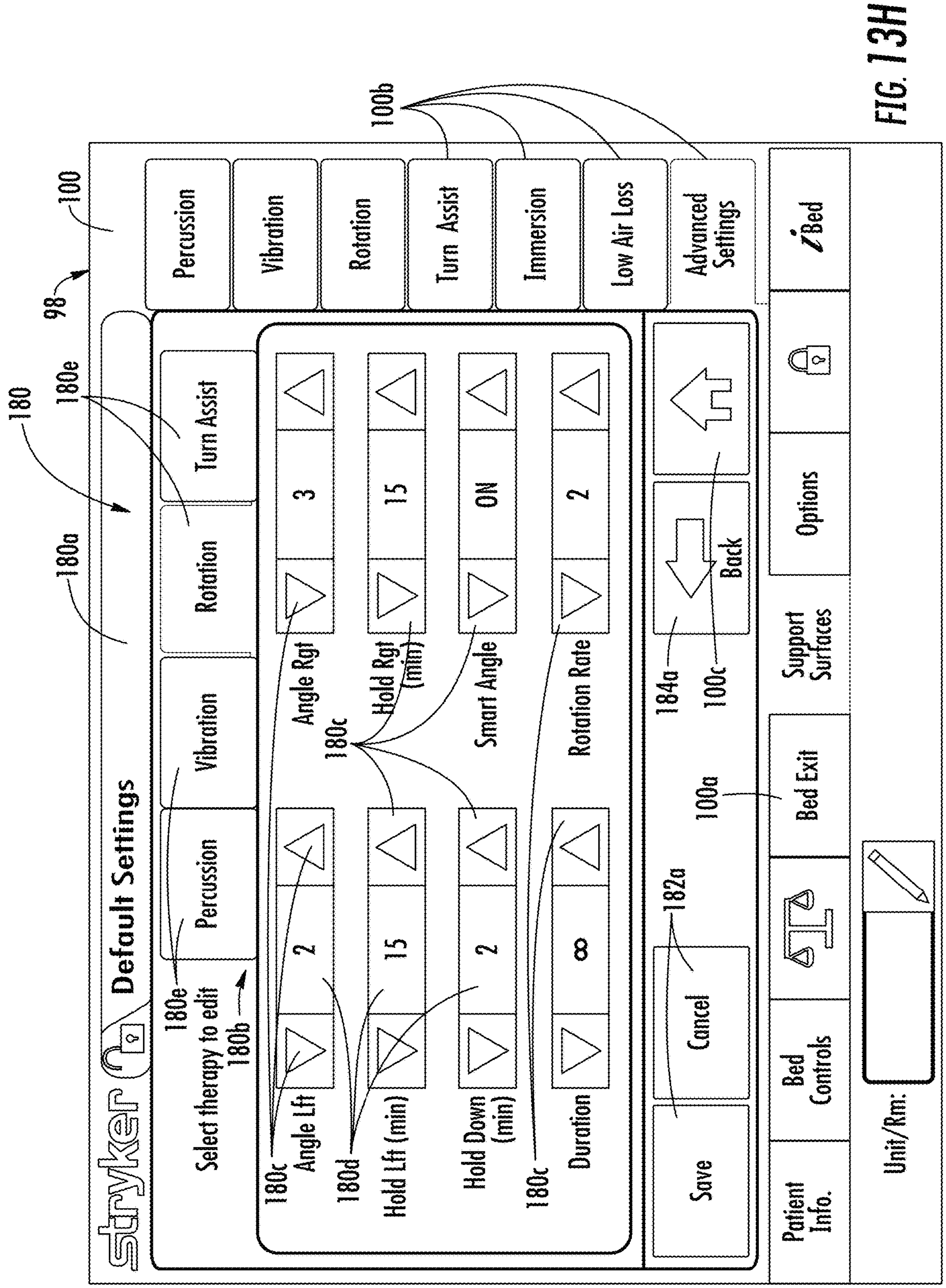

Referring to FIG. 13H, when a user selects the touch screen area 100_b_ associated with the settings for the mattress, the main control board generates a display area 180 similarly with a tabbed portion 180_a_ indicating that the setting selection has been made and, further, a plurality of overlapping tabbed windows 180_b_, which provide the user a menu of parameters associated with the selected treatment functions. Further, each window includes touch screen areas 180_c_ associated with each parameter, which allow a user to adjust (e.g. increase or decrease) the parameter via control board 96 and controller 70, are positioned on either side of a window 180_d_ that displays the status (e.g. the value) of the parameter selected. As will be understood from FIG. 13H, when a user selects one of the tabs 180_e_, the menu will change accordingly and list in a similar fashion as shown the various parameters associated with the selected treatment that can be adjusted along with the touch screen areas and windows to allow a user to change the various parameters and display the changed parameters.

Figure 14:
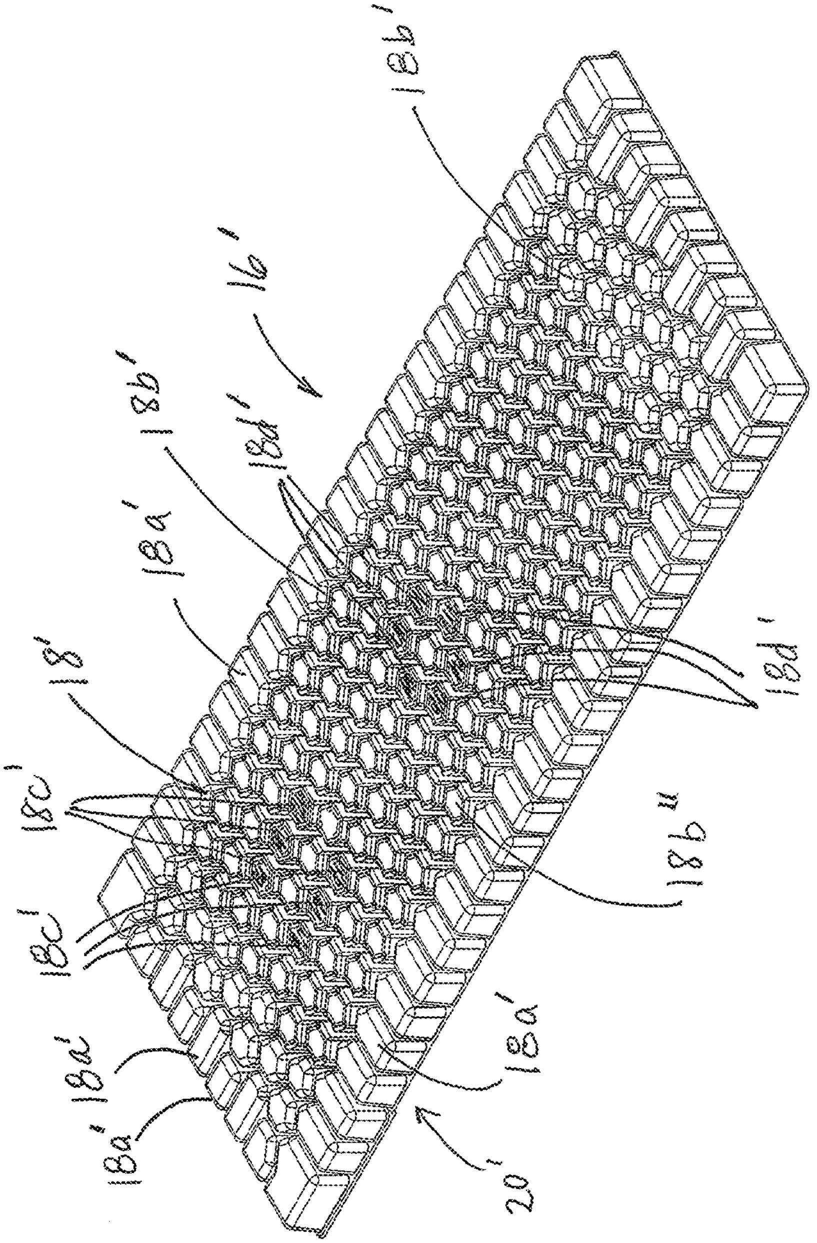
FIG. 14 is a perspective view of another embodiment of the bladder layer of the present invention.

Referring to FIGS. 14-18, various configurations of the surface or bladder layers are illustrated. Referring to FIG. 14, the numeral 16' designates another embodiment of the bladder layer of the present invention. Bladder layer 16' similar to layer 16 and includes a plurality of bladders 18' that are arranged in a plurality of groups. A first group 20' extends along the two sides, the head end and foot end of the layer and consist of generally box-shaped bladders, some with varying lengths or widths to accommodate the second or central group 28' of bladders 18_b_', 18_c_' and 18_d_', which each have a hexagon-shape. Some of the central bladders 18_b_" may have the fabric top sides described above, which assist in the moisture management of the surface. Further, like bladders 18_c_, bladders 18_c_' may be configured to apply percussion or vibration therapy, while bladders 18_d_' incorporate the immersion sensors described above.

Referring to FIG. 15, the numeral 210 designates another embodiment of the support surface of the present invention. Support surface 210 includes a base (not shown), a foam cradle 214, and a layer 216 of bladders 218, all optionally enclosed in a cover (not shown, see the previous description for suitable covers). In a similar manner to the surfaces described above, bladders may provide support to a patient's body and also provide one or more therapies. For example, one or more of the bladders may be adapted to provide vibration or percussion treatment to a patient and, further, to apply the treatment just below the patient's tissue with the therapy force is effectively only separated from the patient's skin by the cover and any possible sheet positioned between the patient and the surface. In the illustrated embodiment, layer 216 includes a plurality of bladders 218 that are arranged in several groups and several zones similar to bladders 18. For details of the bladders and how the can be made reference is made to the descriptions provided above in reference to bladders 18.

In the illustrated embodiment, the head end of the surface is formed by the foam crib 214, which includes a transfer section of foam 214_a_ that extends across the width of the surface at the head end and may provide support to the head end of a patient. Similar to layer 16, layer 216 includes a first group 220 of bladders 218_a_ that are arranged to extend along the sides 222 and 224. In the illustrated embodiment, first group 220 of bladders consist of a single row of bladders at the back seat and leg section of the surface 210 but may include a second row of bladders at the sides of the foot end of the surface.

Also similar to the previous embodiment, bladders 218 include a second group 228 of bladders 218_b_, which extend between the first group of bladders from the foot end of the surface to adjacent the foam head section 214_a_ of foam crib 214. In this manner, the number of zones may be reduced and as shown in FIG. 15A may be arranged into three zones, a back section, seat section, and leg section (with the foot and leg sections combined). In the illustrated embodiment, the top surface of foam head section 214_a_ is flush with the top surface of bladders 218_b_ before they support a patient.

Bladders 218_b_ of the second group of bladders are similarly configured so that their edges do not form a continuous linear edge across the surface to reduce the creation of continuous edges that span the width or length of the layer. In the illustrated embodiment, bladders 218_b_ are multi-sided, such as hexagonal box-shaped bladders, but may comprise rounded bladders, including circular bladders, in other word can-shaped bladders, or double rounded such as a peanut-shaped bladder.

In addition, a third group 232 of bladders 218_c_ may be arranged in a central portion of the chest area of a patient, which may be used to apply one or more therapies to the patient and, further, arranged in two groups of three zones (top, middle, bottom of each lung) similar to the previous embodiment, with one group for applying treatment to the patient's left lung with the other group applying treatment to the patient's right lung. Each bladder in the third group of bladders may be individually actuated, further may be actuated in a manner to create a rolling effect of the percussion or vibration treatment.

A fourth group 234 of bladders 218_b_ may incorporate sensors, such as the immersion sensors described above, which are located for example in the seat section of the surface where the greatest immersion typically can occur. For further details of the immersion sensors, reference is made to FIGS. 10A and 10B.

Figure 16:
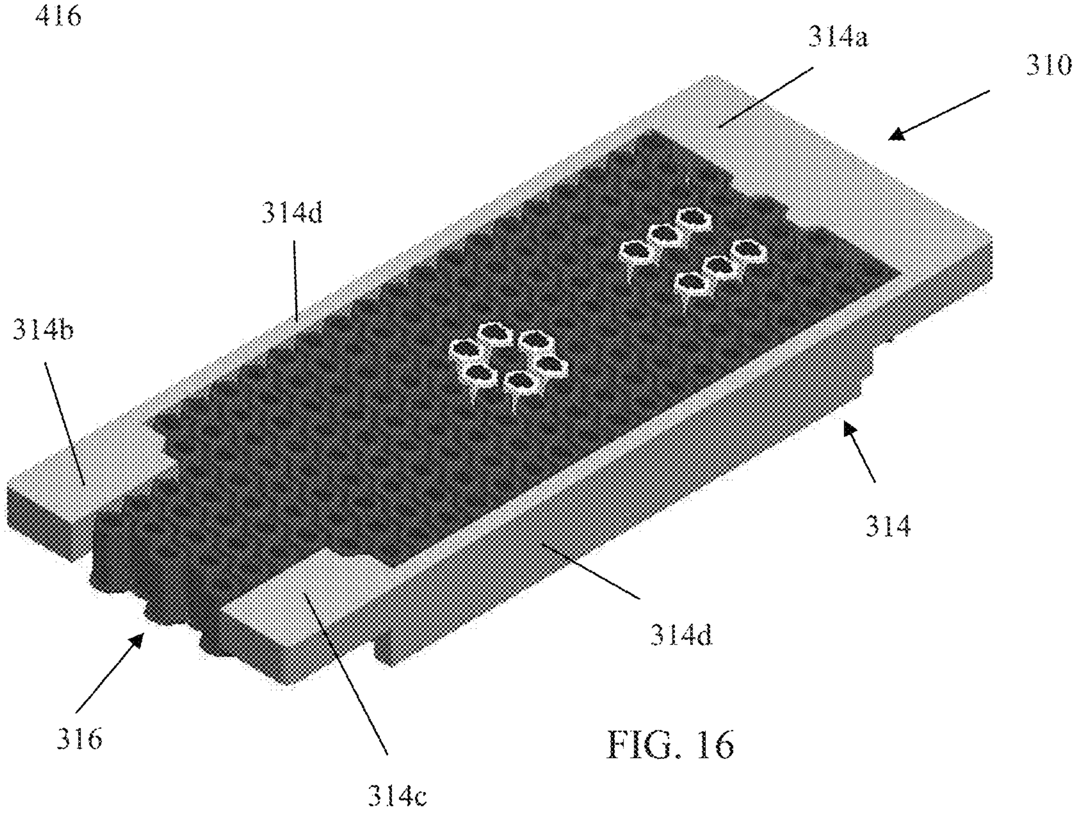
FIG. 16 is another embodiment of the bladder layer and foam crib layer of the patient support of the present invention incorporating foam along the sides of the bladder layer as well as at the head end and foot end sides.

In FIG. 16, surface 310 includes a foam crib 314 with both head end sections 314_a_ and foot end side sections 314_b_ and 314_c_ and with side sections 314_d_, which may generally replace the first group of bladders 220 described in reference to the previous embodiment. For additional details of the bladders of bladder layer 316 and the various groups of bladders that may be provided in central portion of the surface, reference is made to the previous embodiment. For details of the bladders and how the can be made reference is made to the descriptions provided above in reference to bladders 18.

Figure 17:
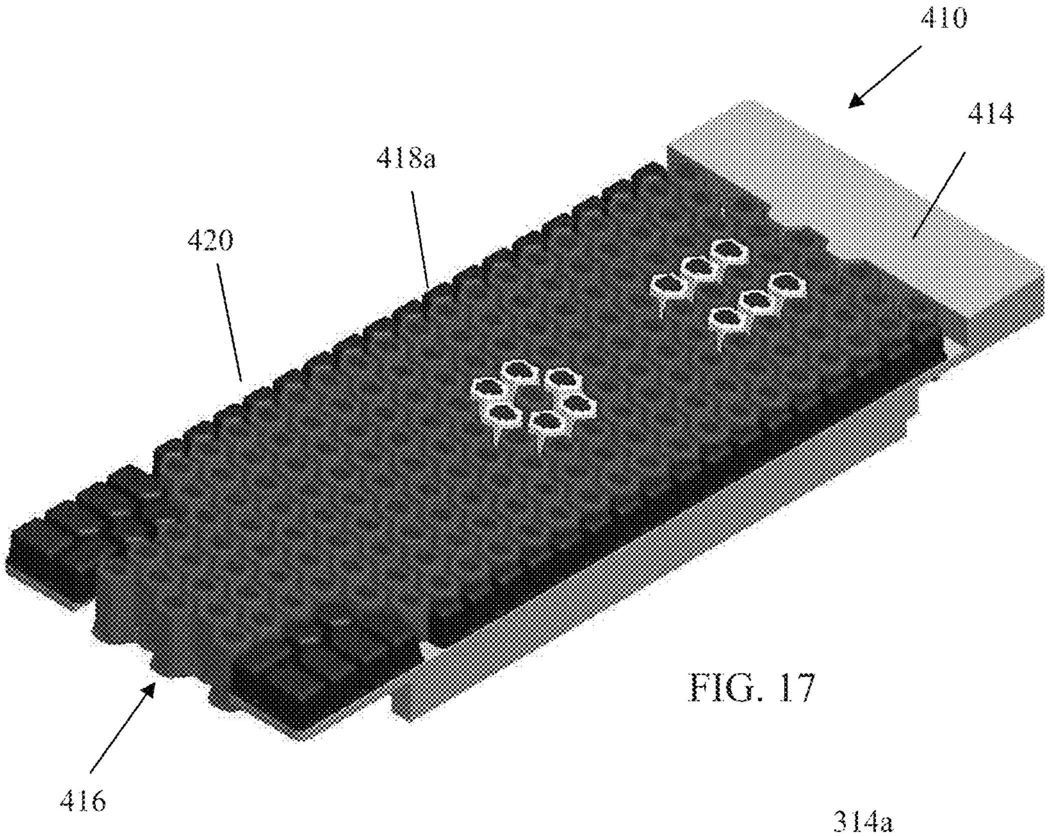
FIG. 17 is another embodiment of the bladder and foam crib layer of the patient support of the present invention incorporating a foam cushion at the head end of the layer and modified side and foot end side bladders.

Referring to FIG. 17, surface 410 also includes a foam crib 414, similar to foam crib 214, and a bladder layer 416. Bladder layer 416 includes a first group 420 of bladders 418_a_, which extends along opposed sides of the surface and which each have a smaller lateral extent than the bladders 218_a_ of group 220 of surface 210 but retain the wider set of bladders at the sides of the foot end of the surface. The central bladders of layer 416 are similar to the bladders in surface 310 and have two additional columns of bladders than bladders 218_b_ at the central cross-section to extend further across the surface.

Figure 18:
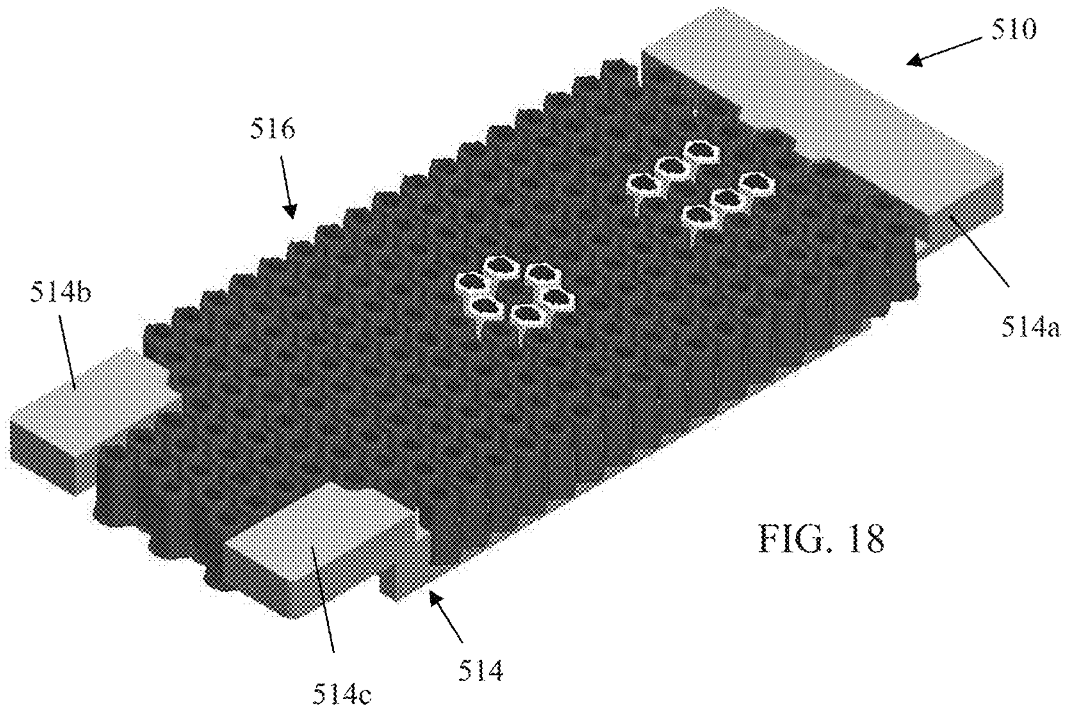
FIG. 18 is another embodiment of the bladder and foam crib layer of the patient support of the present invention incorporating a foam cushion at the head end of the layer and foam cushions at the foot end sides.

Referring to FIG. 18, surface 510 includes a foam crib 514 and bladder layer 416. Foam crib 514 includes a head foam section 514_a_ and foot sections 514_b_ and 514_c_. Bladder layer 516 is similar to the bladder layers previously described in reference to FIG. 15 but instead extend across the full width of the surface.

Figure 19:
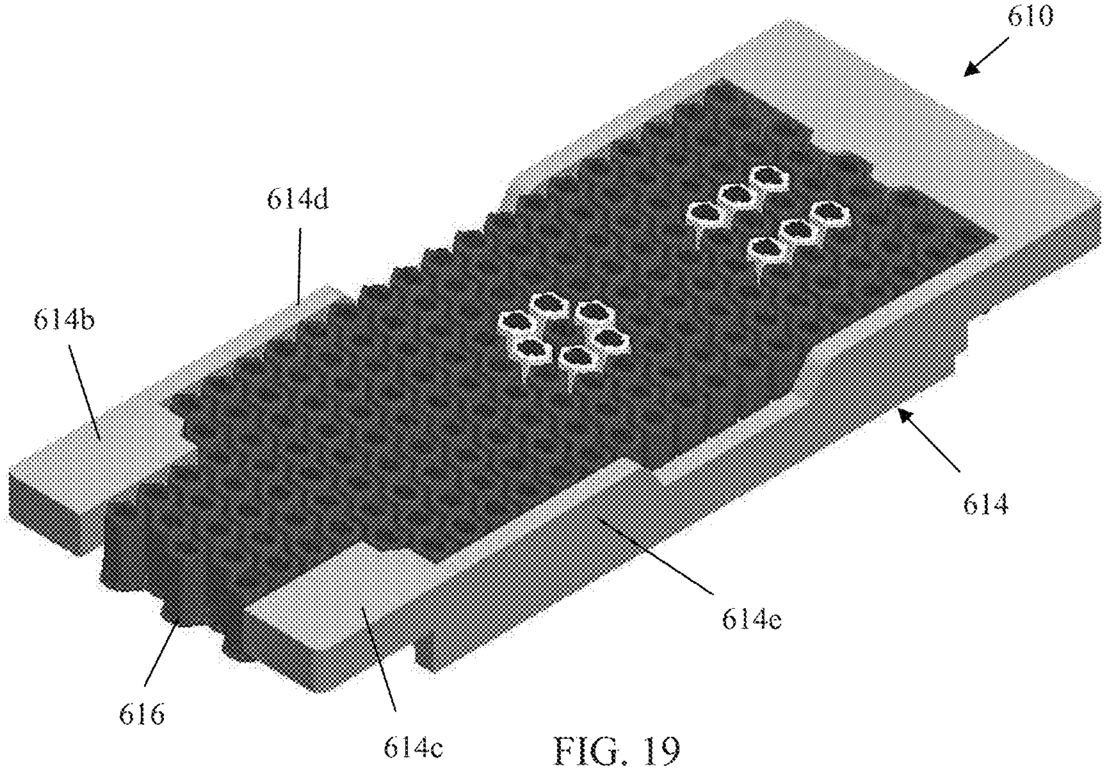
FIG. 19 is another embodiment of the bladder and foam crib layer similar to FIG. 16 but with the side foam section having cut outs.

Referring to FIG. 19, the numeral 610 designates yet another embodiment of the surface of the present invention, which incorporates a foam crib 614 and a bladder layer 616, which is similar to bladder layer 316. In the illustrated embodiment, foam crib 614 also includes a head section 614*a* and foot sections 614*b* and 614*c* and, further, forms side bolsters 614*d* and 614*e*, which extend along the opposed sides of bladder layer 616.

It should be understood that various combinations of the bladders and foam crib sections may be used to accommodate the specific needs of patients. While several variations have been shown and described it should be understood that features from one surface can be combined the features of another surface described here.

Figure 20:
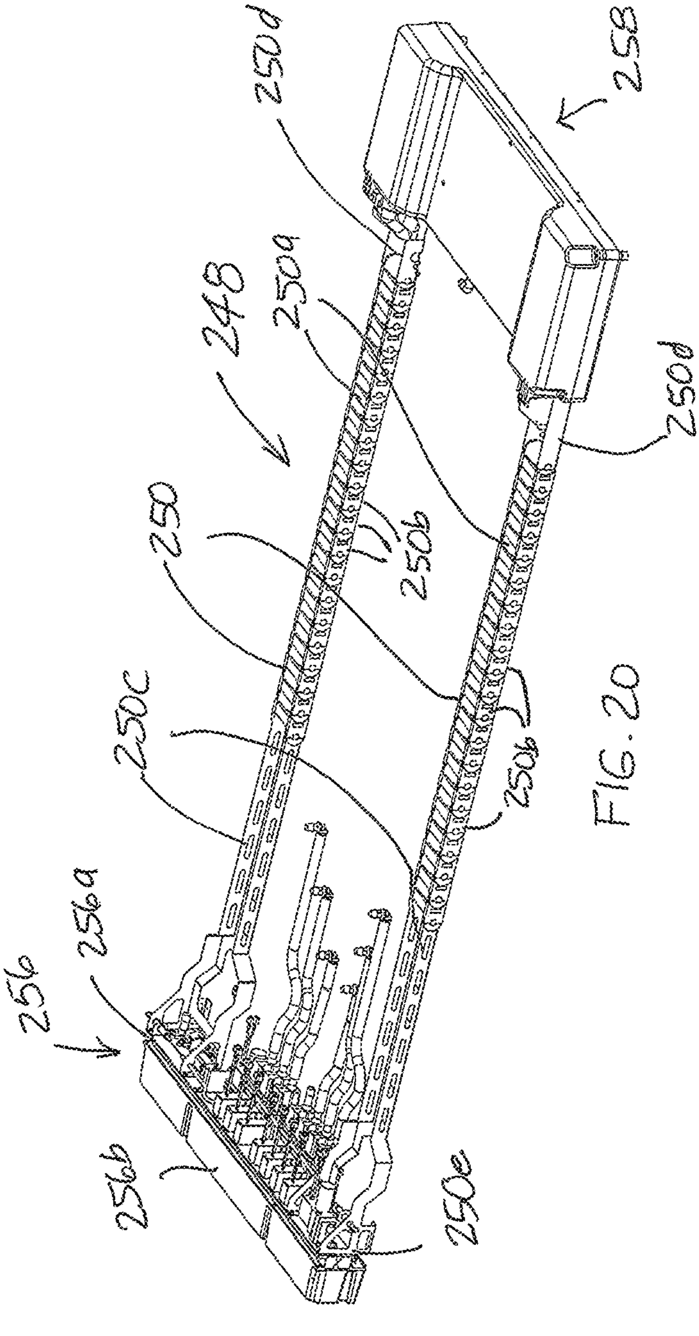
FIG. 20 is a perspective view of a frame for supporting the bladder layer and foam crib of the present invention.

Referring to FIG. 20, the numeral 248 designates another embodiment of the frame of the patient support of the present invention. Similar to frame 48, frame 248 has incorporated therein conduits for directing the flow of air through mattress from various valve assemblies and pumps, described more fully below. Frame 248 is formed from a pair of side frame members 250 and two transverse members in the form of a head end enclosure 256 and a foot end enclosure assembly 258, which forms a housing for the control system for the surface. For details of enclosure assembly reference is made to the enclosure assembly 58.

Enclosure 256, side frame members 250, and enclosure assembly 258 are connected so they form frame 248, with side frame members 250 having at least a flexible portion so that frame 248 can be articulated about one or more axes. Referring again to FIG. 20, side frame members 250 mount on one end to enclosure 256 and on their opposed ends to enclosure 258.

Figure 26:
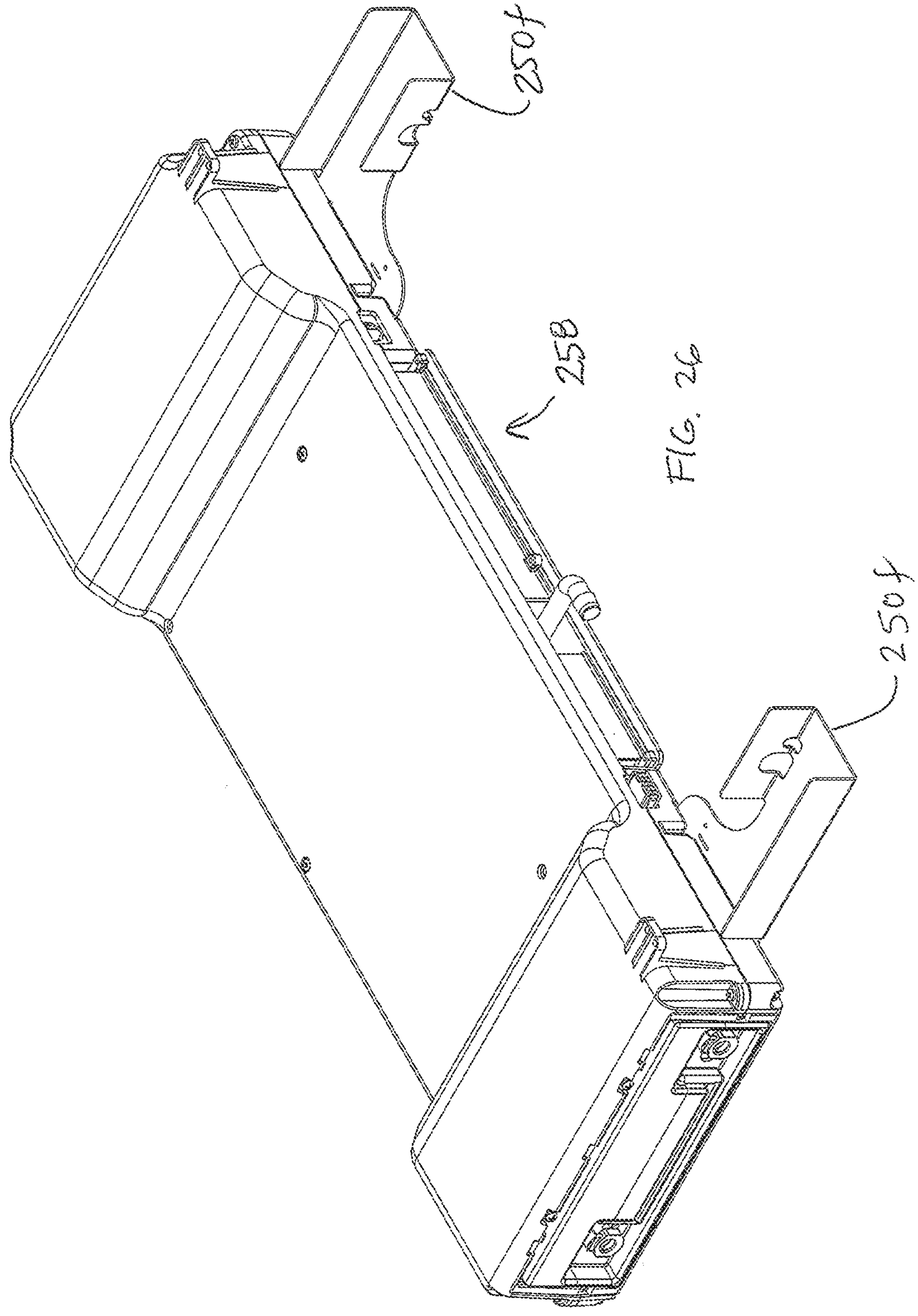
FIG. 26 is another perspective view of the control housing illustrating the mounting brackets for the frame of FIG. 20.

To allow frame 248 to flex and accommodate the surface movement (e.g. folding), side frame members 250 incorporate flexible portions 250*a*, which are formed by interconnected linkages 250*b*, with each linkage being pivotally mounted to the adjacent linkage to form flexible sections that can pivot about horizontal axes along at least a portion of the length of the surface. Flexible portions 250*a* optionally couple to rigid channel-shaped member 250*c* on one end and to rigid channel-shaped members 250*d* at their opposed ends, which respectively mount the side frame members 250 to the respective enclosures. The channel-shaped members 250*c* and 250*d* are mounted to their respective enclosures by brackets 250*e* and 250*f* (see FIG. 26 for brackets 2500.

In the illustrated embodiment, each linkage member 250*b* includes a transverse passage, which when joined with their adjacent linkages form a passageway through the flexible portions 250*a* of side frame members 250 to allow conduits, such as tubes/tubing, to extend through the side frame members. When the tubes or tubing exits the linkages they are then supported by the lower webs of the respective inverted channel-shaped members 250*c* and 250*d*. Flexible portions 250*a* of members 250 are formed from a rigid material, such as plastic or a metal, including aluminum. Similarly, channel-shaped members 250*b* and 250*c* may also be formed from a rigid material, such as plastic or a metal, including aluminum.

Figure 21:
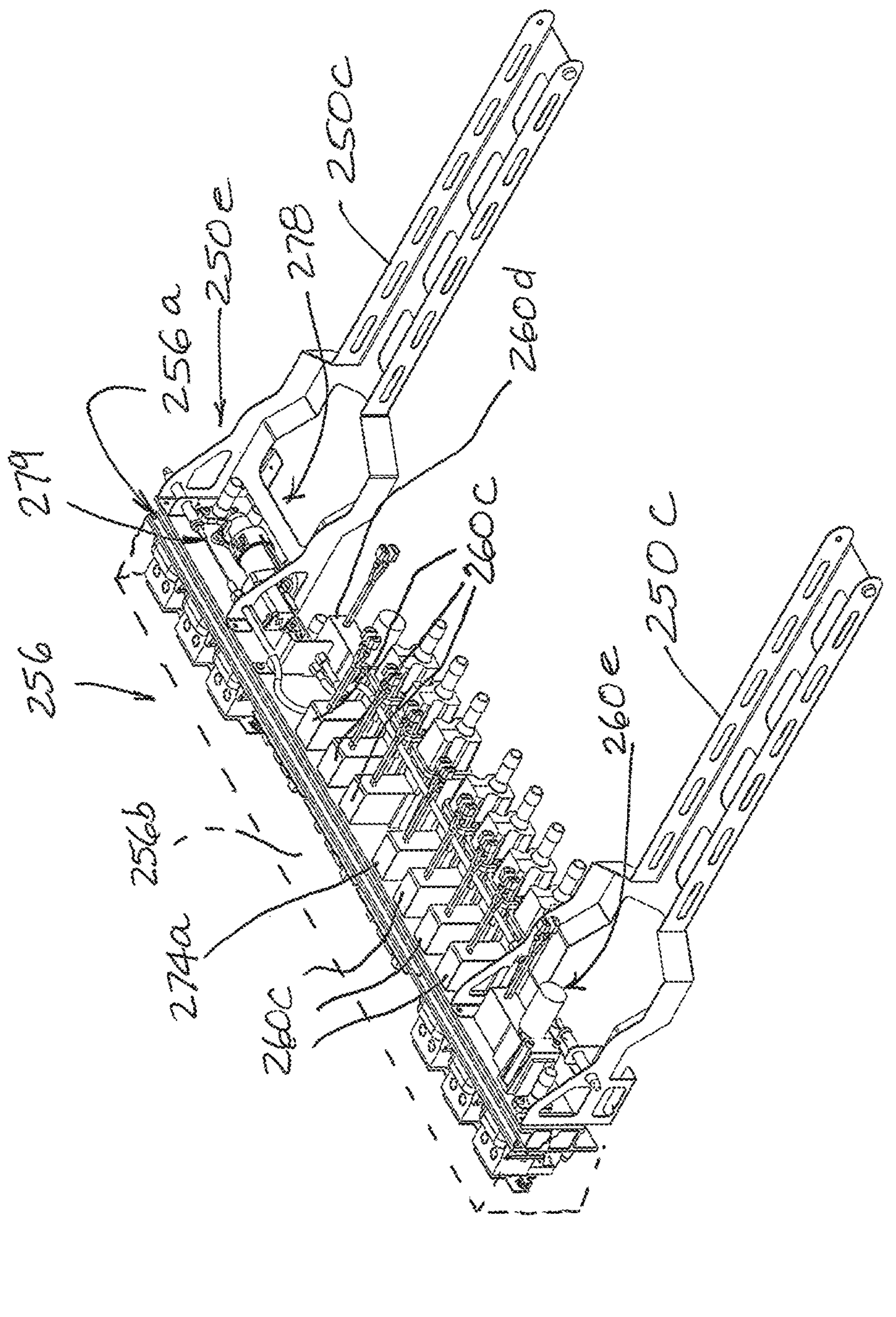
FIG. 21 is an enlarged view of the head end of the frame of FIG. 20.
Figure 22:
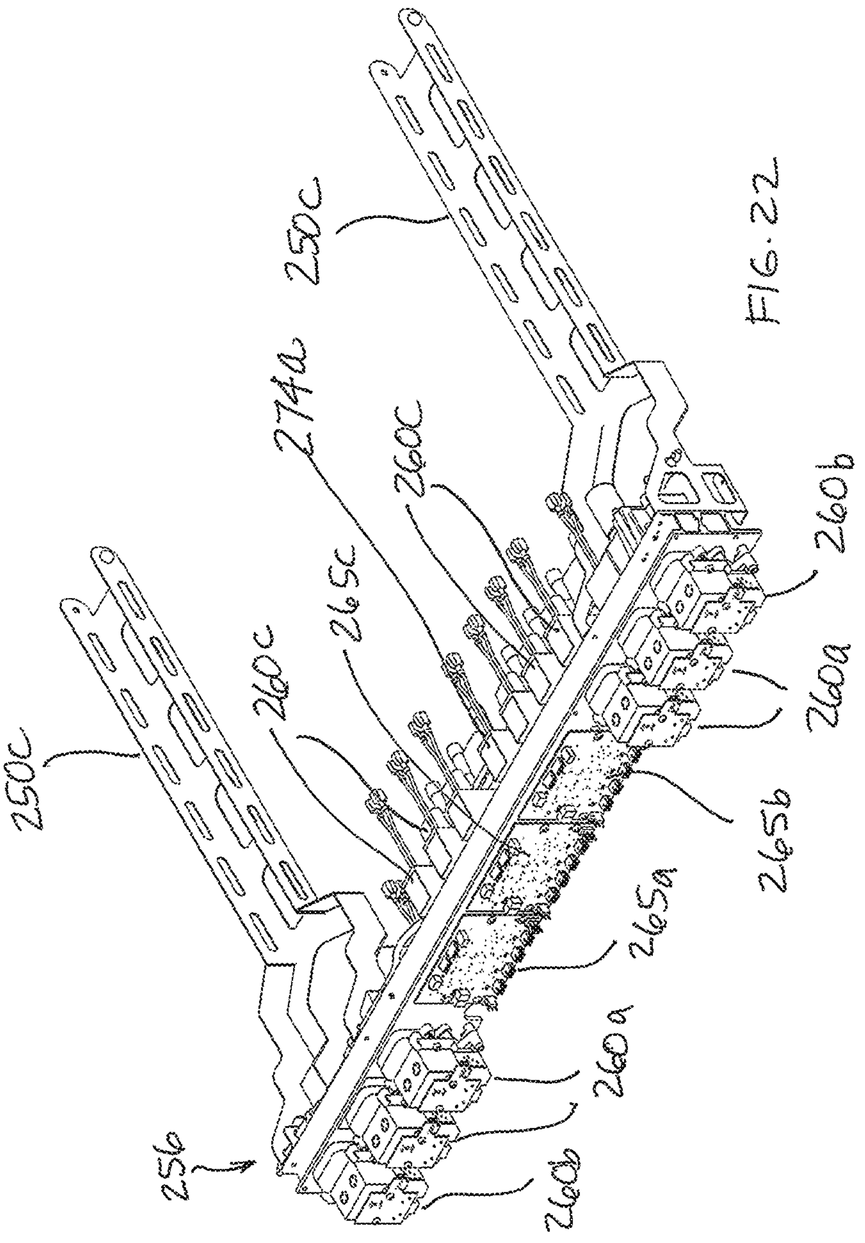
FIG. 22 is another perspective view of the head end of the frame of FIG. 20.

Similar to the previous embodiment, the conduits are provided that extend through side frame members 250 to deliver air to the bladders and for exhausting air from the bladders, for example, to administer CPR. As best understood from FIGS. 20 and 21, the respective conduits are in fluid communication with the various valves 260 provided at the head end enclosure. Referring to FIGS. 21 and 22, enclosure 256, which is formed from an extrusion 256*a* and cover 256*b*, houses a plurality of inflation valves 260*a* and, further, turn valves 260*b*, which are controlled by PC boards 265*a* and 265*b* also housed in enclosure 256, which are in communication with controller 70. In the illustrated embodiment, bladder layer 216 may include four zones, with each zone being controlled by a respective valve 260*a*. Further, each side of the surface may incorporate a turning bladder (218*d*, see FIG. 25A) as noted, with each turning bladder being inflated by its respective valve 260*b*.

Figure 23:
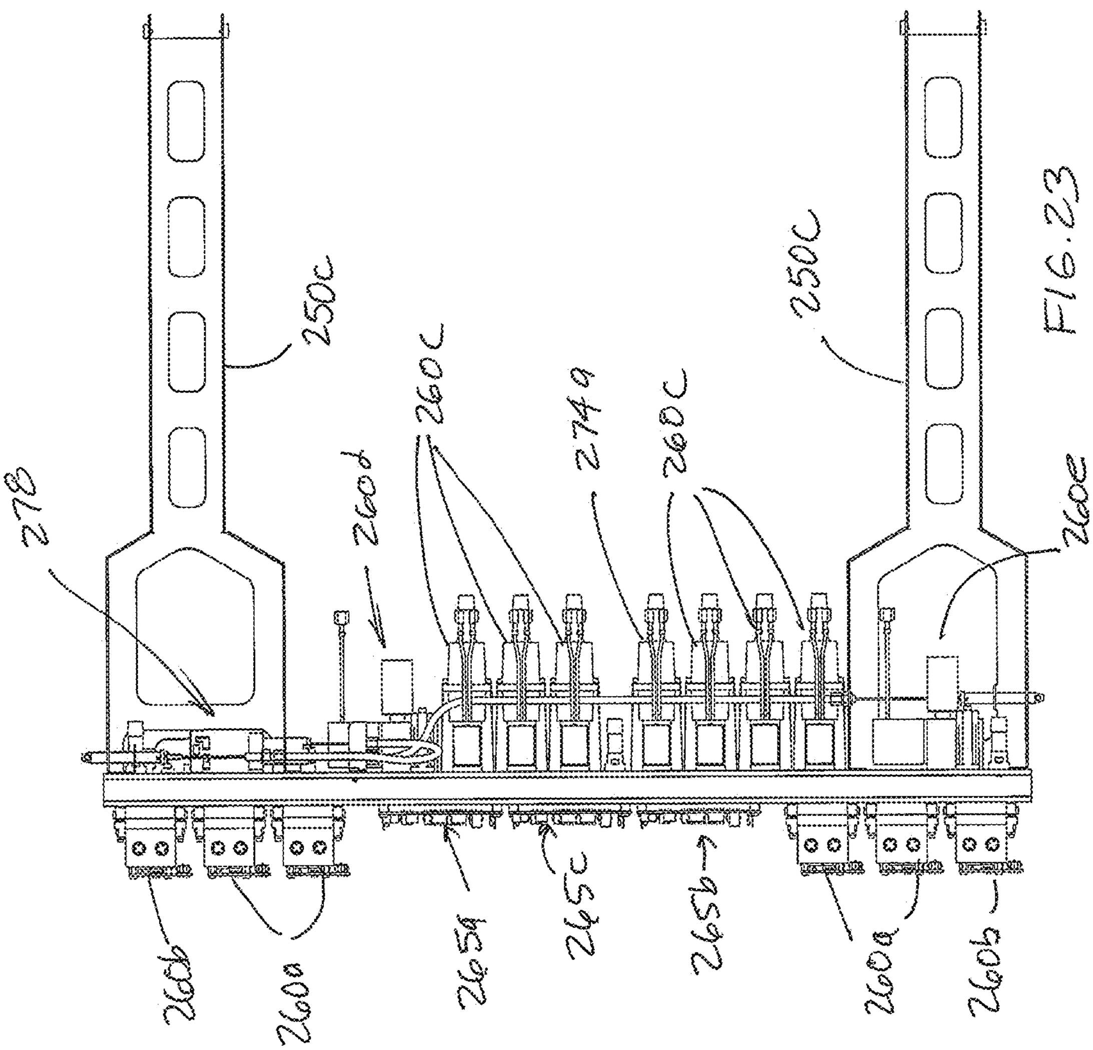
FIG. 23 is a plan view of the head end of the frame of FIG. 20.

Enclosure 256*a* also supports a plurality of percussion and vibration valves 260*c*, which deliver the pressurized air to the respective percussion/vibration bladders with sufficient pressure to generate the forces needed to provide the percussion and vibration therapy. The percussion/vibration valves 260*c* are powered by a printed circuit board 265*c*, also mounted in enclosure 256 and in communication with controller 70, which are best seen in FIGS. 21-23. In addition, the control system may include a diverter valve 260*d*, which it can use to divert exhaust air from the bladders 218*c* to bladders 218*b* and 218*a* (FIG. 15A) to avoid over-pressurization of bladders 218*c*.

As noted in reference to the previous embodiment, any one of the surfaces 210, 310, 410, 510, or 610 may incorporate a low air loss system similar to that described above. The low air loss system is supplied air via a low air loss valve 274*a* (see FIGS. 21-23). As noted above, the bladders may also be evacuated of air through the tubing or tubes that run through side frame members 250, which are in fluid communication with deflate valve 260*e* (see FIGS. 21 and 23), for a CPR event and also to control inflation of the bladders. In this manner, deflation of the respective bladders may be achieved by way of valve 260*e*, in addition to the CPR valve 278 described more fully below.

Figure 25:
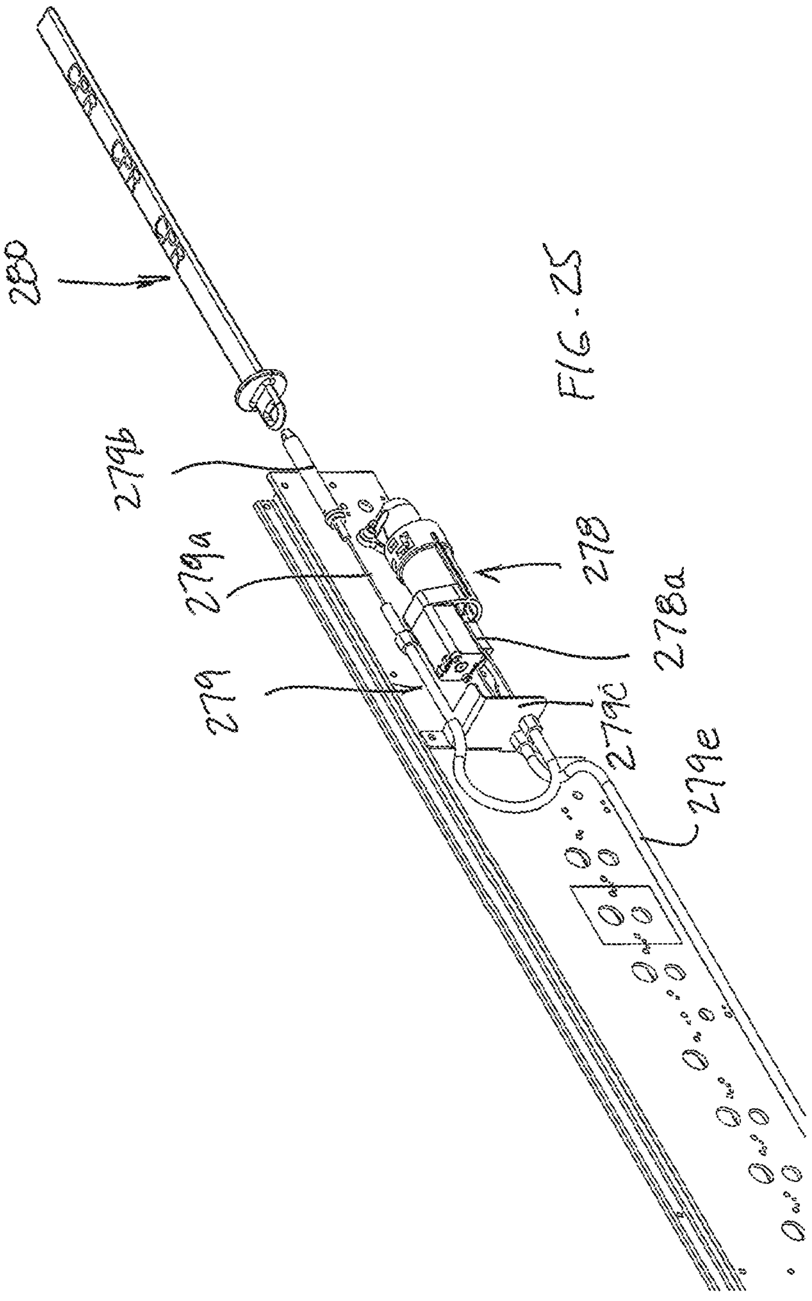
FIG. 25 is an enlarged view of the head end of the frame illustrating the illustrating the CPR valve and actuator cable system.

Referring to FIG. 25, any of the surfaces (10, 110, 210, 310, 410, or 510) may incorporate a single CPR valve 278, which is manually actuatable between a closed configuration where the flow of air from the mattress is blocked at the CPR valve, and an open position where the air can flow from the mattress through the CPR valve, and further configured to auto reset to its closed position after a CPR event. In one embodiment, the control system is in communication with the CPR valve and is configured to trigger the CPR valve to auto reset to its closed position after a CPR event. For example, the control system may includes a user input device, such as a touch actuatable device, such as a button, including a touch screen button, which is configured to trigger the CPR valve to auto reset to its closed position upon an input at said user input device.

Figure 25A:
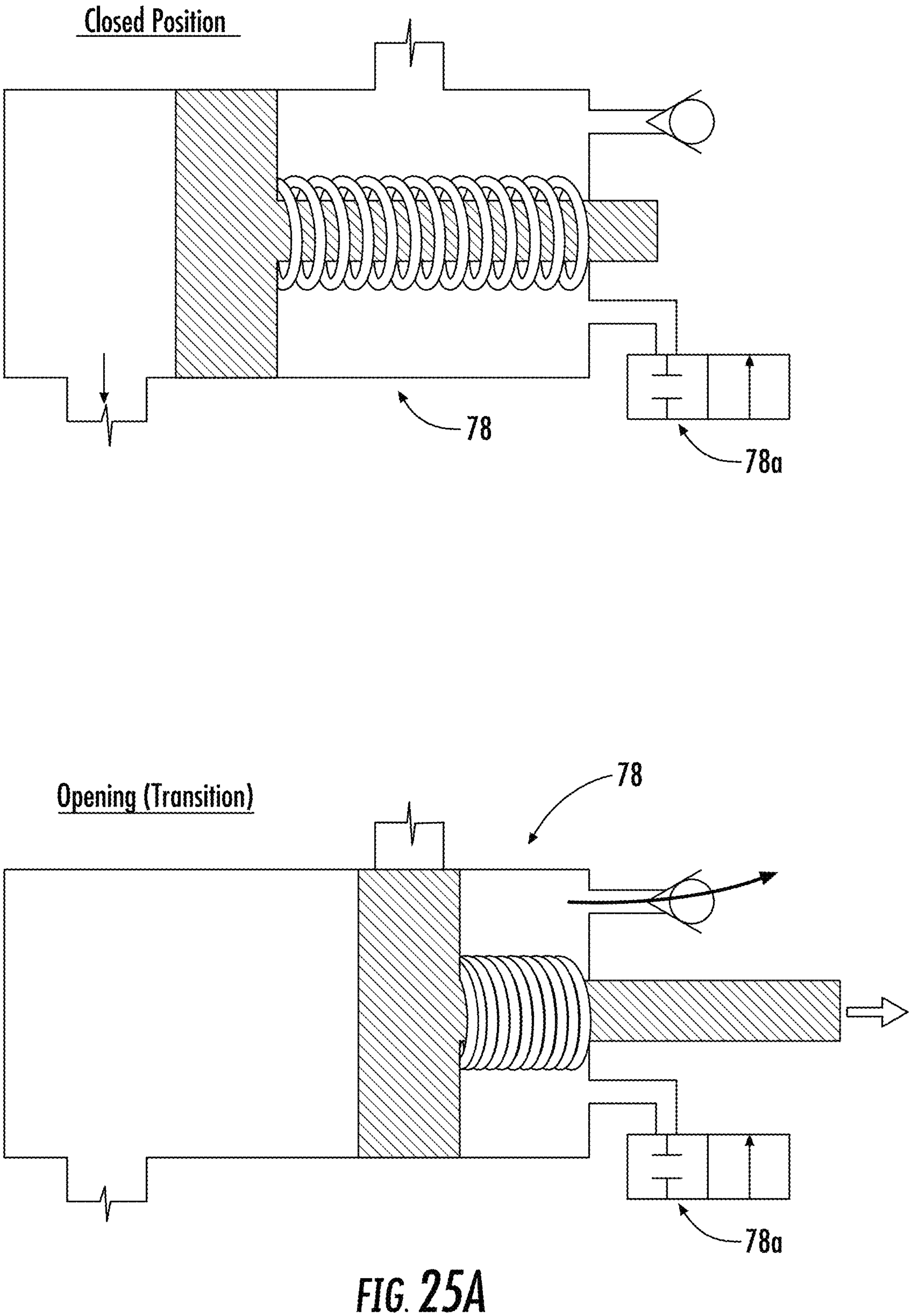
FIG. 25A is a schematic drawing of the CPR valve showing its open and closed states.

For example as shown in FIG. 25A, CPR valve 278 may include a housing with two chambers, one in fluid communication with the mattress and the other in selective fluid communication with the atmosphere. The housing includes an outlet, and a check valve and an electrically controlled valve both in fluid communication with the second chamber. Positioned in the housing are a piston and a spring, which biases the piston to a closed position wherein the outlet is isolated from the first chamber. The piston is coupled to an actuator, which when actuated moves the piston against the force of the spring and past the outlet so that the first chamber is in communication with the atmosphere and the air from the mattress can discharge through the outlet. When the piston is moved to its open position, air from the second chamber is discharged though the check valve, which generates a vacuum in the second chamber, which holds the piston its open position. The vacuum is then released by an electrically operated valve, such as a solenoid valve 278*a*, which is in communication with the control system to provide an automatic reset for the CPR valve. Once the valve 278*a* is opened, the pressure in the spring chamber is allowed to increase and the vacuum is released allowing the spring to return the piston to its closed position until the CPR tether is once again pulled. Once the CPR event is over, the user input device may be actuated to trigger the electrically operated valve to release the vacuum pressure.

Figure 24:
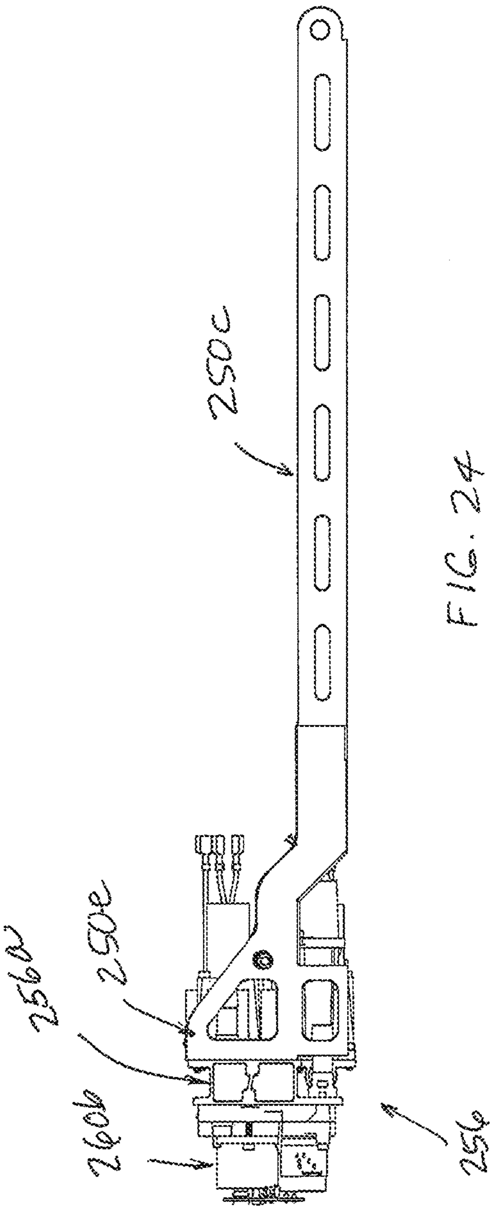
FIG. 24 is a side elevation view of the head end of the frame of FIG. 20.
Figure 24A:
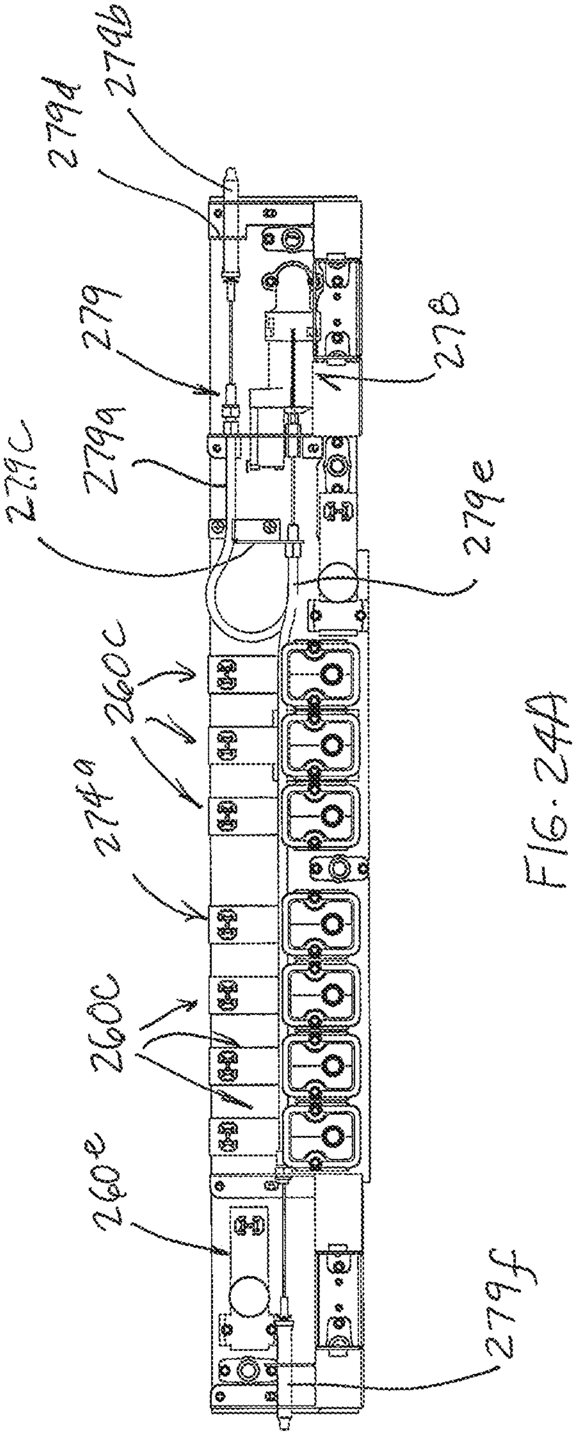
FIG. 24A is a front elevation view of the head end of the frame of FIG. 20.

To actuate the CPR valve, the surface may include a cable system 279. Referring to FIGS. 23, 24A, and 25, cable system 279 includes a first cable section 279*a* that extends from the CPR valve to the right side of the surface (as viewed in FIG. 25), with its sheath anchored to bracket 279*c*, to couple to a spring biased pin or plunger 279*b* on its other end, which is supported in a bracket 279*d* (see e.g. FIG. 24). A tether, such as a strap 280, is coupled to the plunger, which is accessible exteriorly of the surface so that an attendant can simply pull on the strap to open the CPR valve. Cable system 279 includes a second cable portion 279*e*, which extends from the CPR valve to the left side of the surface, with its sheath anchored on bracket 279*c*, and similarly couples to a plunger 279*f* (see FIG. 23) for coupling to a second tether (not shown), which is accessible exteriorly of the surface on the other side of the surface for actuation by a caregiver. When one of the tethers is actuated, the cable system opens the CPR valve (278), which moves the CPR valve's piston between a closed position and an open position in which the air in the bladders is allowed to dump through the CPR valve to the atmosphere.

Figure 27:
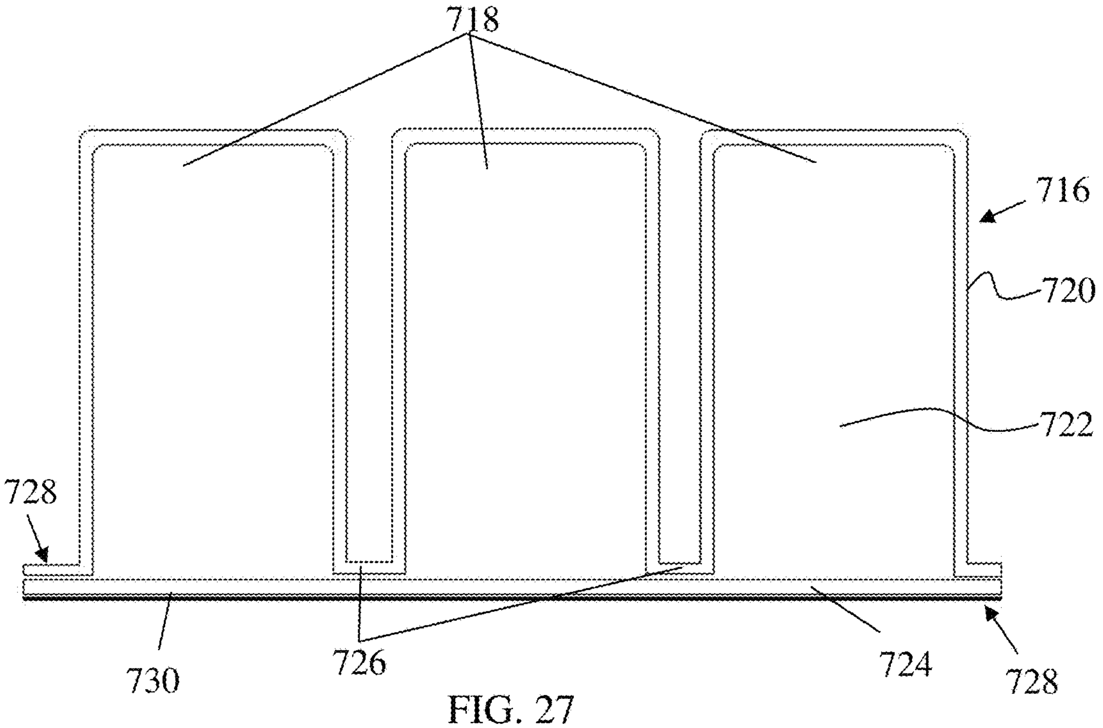
FIG. 27 is a cross-section view of another embodiment of the inflatable portion of the mattress of the present invention formed from a gelatinous elastomeric sheet.

Referring to FIG. 27, the numeral 716 designates yet another embodiment of the bladder layer of the present invention. Similar to the previous embodiments, bladder layer 716 includes a plurality of inflatable bladders 718 that are arranged in a matrix or array to form at least part of the support surface of a mattress. In the illustrated embodiment, each baldder has a height to width ratio of greater that 1:1, but the ratio of the height to width ration of bladders 718 may be 1:1 or less depending on the application. For further details of the various optional shapes and other height to width ratios of the bladders themselves and arrangement of the bladders and any surrounding foam pieces or crib, as well as the fluid passageways formed in the bladder layer to allow air flow through the bladder layer, reference is made to the previous embodiments. Further, reference is made to applications U.S. application Ser. No. 12/640,643, filed Dec. 17, 2009, entitled PATIENT SUPPORT; and U.S. application Ser. No. 12/640,770, filed Dec. 17, 2009, now U.S. Pat. No. 8,910,334, entitled PATIENT SUPPORT, for examples of foam and valves that may be incorporated into bladder layer 716, which control the flow of air into and out from the bladders to form self-adjusting bladders, which applications are incorporated by reference in their entireties herein.

Bladder layer 716 is formed from at least one sheet of gelatinous elastomeric material to increase the "stretchability" of the bladders, which helps reduce the shear stress on the skin of a patient lying on the surface formed by bladder layer 716 and, further, increases the immersion of a patient into the bladder layer. Further, with increased flexibility of the sheet forming the patient facing side of the bladders, the bladders have increased conformability to a patient's body, which together with the increased immersion can provide improved pressure distribution on the patient's body. Suitable gelatinous elastomeric materials are formed by blending an A-B-A triblock copolymer with a plasticizer oil, such as mineral oil. The "A" component in the A-B-A triblock copolymer is a crystalline polymer like polystyrene and the "B" component is an elastomer polymer like poly(ethylene-propylene) to form a SEPS polymer, a poly (ethylene-butadyene) to form a SEBS polymer, or hydrogenated poly(isoprene+butadiene) to form a SEEPS polymer. For examples of suitable gelatinous elastomeric materials and the method of making the same, reference is made to U.S. Pat. Nos. 3,485,787; 3,676,387; 3,827,999; 4,259,540; 4,351,913; 4,369,284; 4,618,213; 5,262,468; 5,508,334; 5,239,723; 5,475,890; 5,334,646; 5,336,708; 4,432,607; 4,492,428; 4,497,538; 4,509,821; 4,709,982; 4,716,183; 4,798,853; 4,942,270; 5,149, 736; 5,331,036; 5,881,409; 5,994,450; 5,749,111; 6,026,527; 6,197,099; 6,865,759; 7,060,213; 6,413,458; 7,730,566; and 7,964,664, which are all incorporated herein by reference in their entireties.

Other formulations of gelatinous elastomeric materials may also be used in addition to those identified in these patents. As one example, the gelatinous elastomeric material may be formulated with a weight ratio of oil to polymer of approximately 3.1 to 1. The polymer may be Kraton 1830 available from Kraton Polymers, which has a place of business in Houston, Texas, or it may be another suitable polymer. The oil may be mineral oil, or another suitable oil. One or more stabilizers may also be added. Additional ingredients—such as, but not limited to—dye may also be added. In another example, the gelatinous elastomeric material may be formulated with a weight ratio of oil to copolymers of approximately 2.6 to 1. The copolymers may be Septon 4055 and 4044 which are available from Kuraray America, Inc., which has a place of business in Houston, Texas, or it may be other copolymers. If Septon 4055 and 4044 are used, the weight ratio may be approximately 2.3 to 1 of Septon 4055 to Septon 4044. The oil may be mineral oil and one or more stabilizers may also be used. Additional ingredients—such as, but not limited to—dye may also be added. In addition to these two examples, as well as those disclosed in the aforementioned patents, still other formulations may be used.

As best seen in FIG. 27, bladder layer 716 is formed from a sheet 720 of gelatinous elastomeric material, which is configured, such as by molding, including injection molding, blow molding, thermoforming, or cast molding, to include a plurality of sacs or cavities 722, which form bladders 718. Sacs 722 can assume any of the shapes shown and described above, as well as other closed volume shapes, including can shaped bladders. Sheet 720 is then joined with a bottom sheet 724 to form the closed chambers of the bladders. The two sheets are joined together around their respective perimeters and around each of the sacs to form an array of discrete bladders. At least some regions of the sheets may be left un-joined (for example at 726) to form fluid passageways between some or all of the adjacent bladders so that a network of passageways can be formed in the bladder layer to allow air flow between at least some of the bladders, which reduces the amount of tubing that is require to inflate the bladders and to maintain the pressure in the bladders at the desired pressure value.

Optionally sheet 724 may be formed a gelatinous elastomeric material, either similar to sheet 720 or may be formed from another gelatinous elastomeric material, for example another of the suitable gelatinous elastomeric materials referenced above. The two sheets may then be joined by welding the two sheets together at their respective perimeters 728 and around the sacs, as will be more fully described below in reference to FIG. 29. The tubing for inflating bladder layer 716 may be inserted between the edges of the two sheets during molding so that the tubing is then captured and bonded between the two sheets. Alternately, the tubing may be post attached. For example, the tubing may be inserted into openings left during the forming process of layer 716 and then welded between the sheets. Or, the bottom sheet may have formed or insert molded therein couplers, for example, nipples that the tubing may be extended into and then clamped therein. For example, the tubing may have a flanged end that is then captured in the nipple by a clamp or nut, such as a ring clamp or nut, which extends around the nipple and tubing adjacent the flange so that the tubing is sealed in the nipple and then anchored by way the mechanical interaction between the clamp and the tubing flange.

In addition, sheet 724 may include a layer that is less stretchable than the gel, for example, a layer of non-woven material, which limits the stretchability of the sheet 724. For example, sheet 724 may be formed from a gel layer and a non-woven layer that are joined by heating the gel layer to a temperature that causes the gel layer to at least partially melt so that it becomes "sticky" and will adhere itself to (once pressed against) the non-woven layer.

Figure 28:
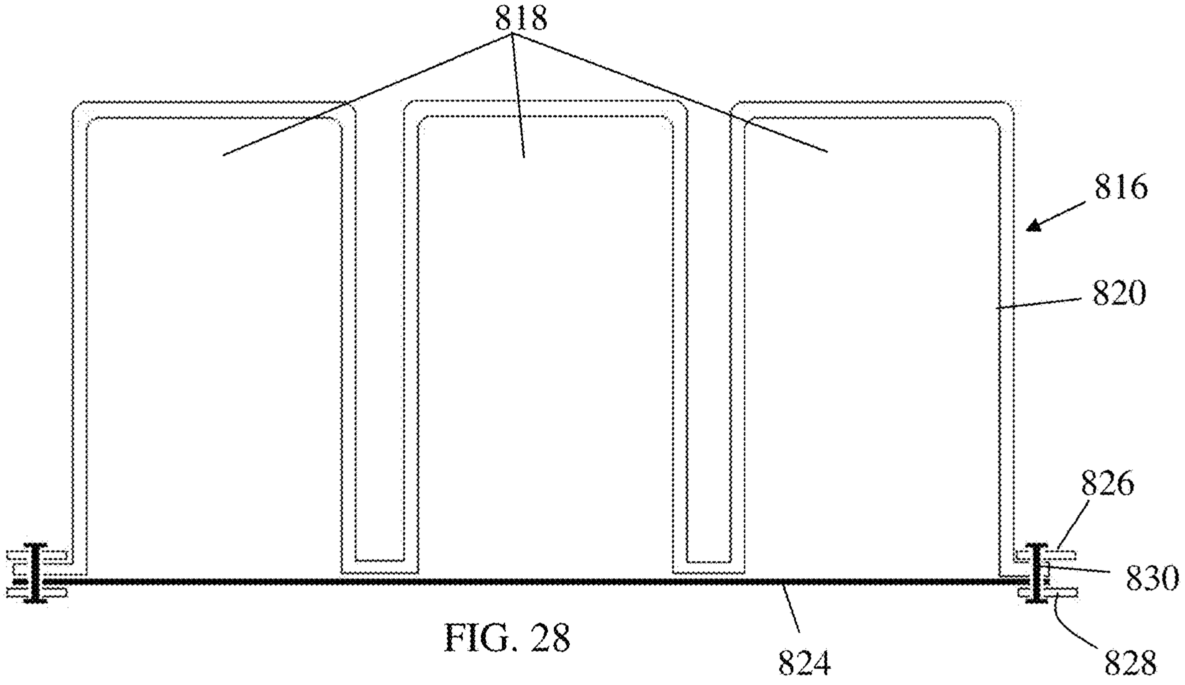
FIG. 28 is a cross-section view of another embodiment of the inflatable portion shown in FIG. 27.

As best seen in FIG. 28, a second embodiment of a gel-based bladder layer 816 is formed from a first sheet 820 of gelatinous elastomeric material, which is configured, such as by molding, including injection molding or cast molding, to include a plurality of sacs 822, similar to the previous embodiment, to form bladders 818. Sacs 822 also can assume any of the shapes shown and described above, as well as other closed volume shapes. Sheet 820 is then joined with a bottom sheet 824 to form the closed chambers of the bladders. The two sheets are joined together around their respective perimeters and around each of the sacs to form an array of discrete bladders. Again, at least some regions of the sheets may be left un-joined to form fluid passageways between some or all of the adjacent bladders so that a network of passageways can be formed in the bladder layer to allow air flow between at least some of the bladders, which reduces the amount of tubing that is require to inflate the bladders and to maintain the pressure in the bladders at the desired pressure value.

Optionally sheet 824 may be formed a less stretchy material than sheet 820, such as a non-woven material or a polyurethane or polyethylene sheet. The two sheets may then be joined by sandwiching the layers between an upper flange or strip 826 of relatively rigid material and an lower flange or strip 828 of relatively rigid material, which are then mechanically coupled together, for example, by mechanical inserts or fasteners 830, which extend through the edges of the respective sheet. The intermediate connections between adjacent bladders may also be joined by intermediate strips or flanges or washers positioned between the adjacent bladders, which are then clamped together using couplers that extend through the two sheets, or by spot welding, depending on the material of the second sheet, as will be described in reference to FIG. 29. For example, an upper lattice shaped member may be located between the bladders, which is then joined to a lower lattice shaped member or to a solid sheet by way of couplers that extend through the two sheets at the junctures of the adjacent bladders to thereby clamp and sandwich intermediate portions of the first and second sheets together.

Figure 29:
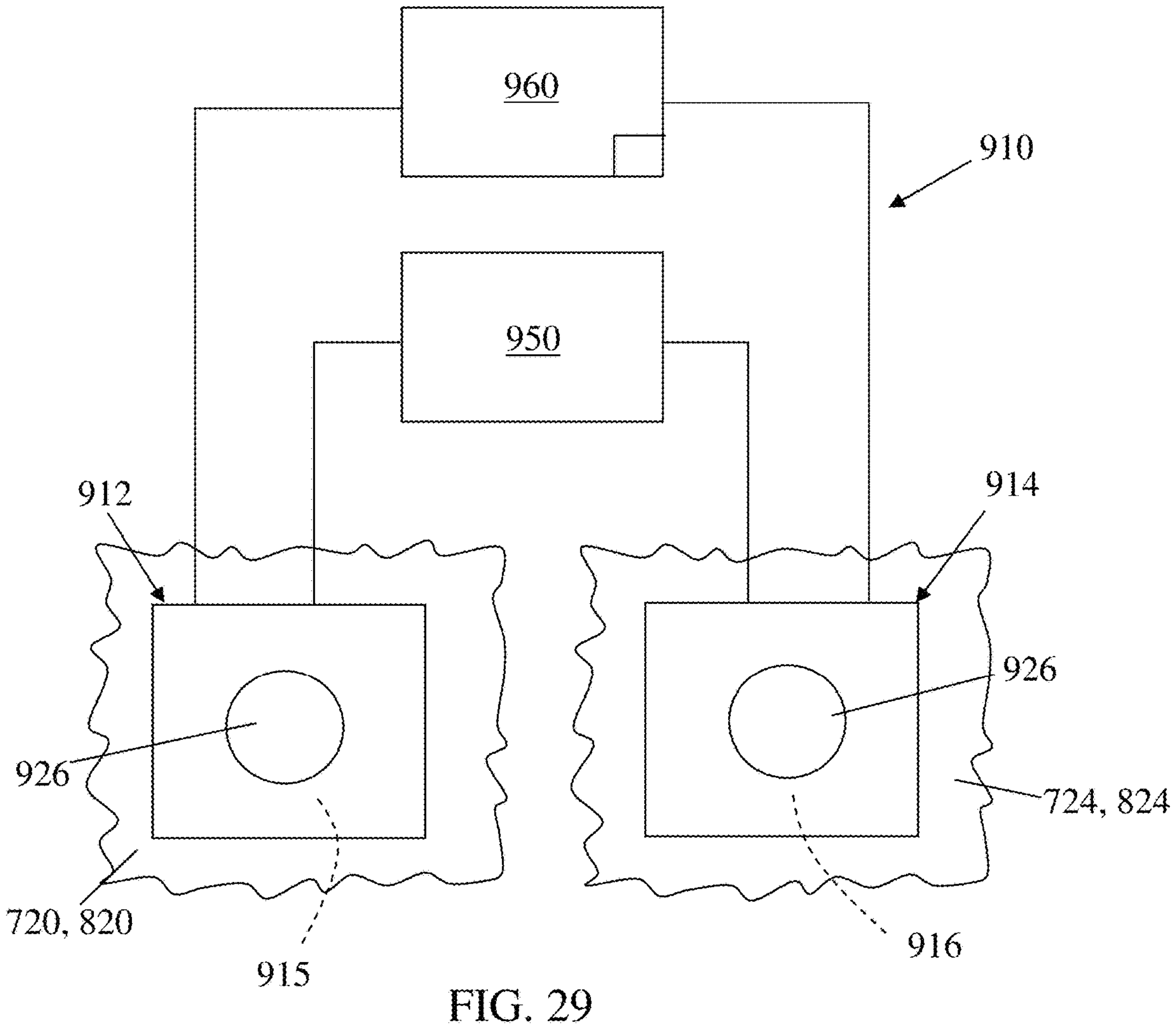
FIG. 29 is a schematic drawing of a welding apparatus suitable for welding the gelatinous elastomeric sheet.

Referring to FIG. 29, a welder device 910 is illustrated for welding the two sheets together. Welder device 910 includes a first heating/cooling member 912 that is sized and shaped to cover the region of the first sheet that is to be welded and a second heating/cooling member 914, which is sized and shaped to cover the corresponding region of the second sheet that is to be welded to the first sheet. The first heating/cooling member 912 and second heating/cooling member 914 are supported so that one or both can be moved toward the respective surfaces of the sheets that are to be welded.

Each of the first and second heating/cooling members 912, 914 has a welding surface 915, 916, which is shaped and size to correspond to the desired weld size (length and thickness). The welding surfaces 915, 916 may be any thermal conductive metal and/or polymeric material that effectively transfers a desired thermal energy (heat or cold) to the sheet. The desired transfer of heated thermal energy is in a range of about 150° F. to about 400° F., depending on the type of gel selected. Accordingly the thermally conductive metal material must be able to transfer thermal energy in that range, which metal materials include but not limited to brass, aluminum, antimony, beryllium, copper, steel, carbon steel, stainless steel, iron, bronze, gold, lead, manganese, titanium, nickel, niobium, platinum, silver, tantalum, or any other conductive metal or combination thereof. Examples of thermally conductive polymeric materials include, but not limited to, Syndiotactic polystyrene (SPS) crystalline polymers, or wholly aromatic liquid crystalline polyesters, such as poly (p-hydroxybenzoate), and poly (p-phenylene terephthalate), both impregnated with conductive metal therein. Preferably, the first and second heating/cooling members are made of conventional metallic materials.

In one embodiment, the first and second heating/cooling members are coated with polytetrafluoroethylene (PTFE) material, perfluoralkoxy (PFA) material, fluorinated ethylene propylene (FEP) material, or equivalent non-stick materials thereof. Optionally, heat is transferred to the heating/cooling member 912, 914 through thermal apertures 926. The thermal aperture 926 may receive heated air having a temperature range of 200° F. to 500° F., optionally 250° F. to 450° F., and optionally around 300° F. to 400° F. from a conventional heating source 950, such a warm or hot air blower. In another embodiment, the heating source may comprise a conventional thermoelectric heater element or a Peltier device, which transfers heat into thermal aperture 926, in the ranges noted above. Optionally, the first and second heating/cooling members may be interconnected to a thermocoupler to measure the temperatures of the respective first and second heating/cooling members. That way an operator can monitor the thermocoupler's measurements and manually control the heat applied to the first and second heating/cooling members.

The heat source may be controlled by a control system that includes a microprocessor based controller, which includes software or hardware, which is in communication with thermocoupler or thermocouplers and compares temperature readings from the thermocoupler or thermocouplers to stored acceptable temperature ranges or values for a given gelatinous elastomeric material composition, and maintains the temperatures of the first and second heating/cooling members' welding side in the desired temperature range or value. Alternatively, the operator may adjust the desired temperature to obtain the desired welding either by reading the thermocoupler(s) measurements to ensure the first and second heating/cooling members distribute the appropriate thermal energy to the gel material or by visual inspection of the weld(s). The control system may also include a timer so that once the desired temperature has been reached, the controller may transmit a signal to the timer unit to maintain that desired temperature for a given time period.

Once at the desired temperature, the member 912 and 914 have a certain thermal energy and that certain thermal energy is transferred to the sheets forming the bladder layer. For example, the energy applied to the sheets may be applied for a predetermined time frame in a range of between 1 second to 30 seconds, optionally 5 seconds to 20 seconds, and optional for about 10 to 15 seconds. The heating time frame can be extended beyond 30 seconds, depending on the thickness and material of the sheet and the size of the welds. Once the thermal energy is applied for the predetermined time frame, each first and second heating/cooling members may be cooled by ambient air or by the compressed air noted below.

In addition to a heating unit, apparatus 920 includes a cooling unit 960. Cooling unit 960, for example, may supply compressed air to thermal aperture 926 to effectively cool the first and second heating/cooling members. As noted above, the heating unit may comprise a Peltier effect device, which can be set to a cooling mode. The compressed air, or other coolant fluid (like water), may be provided by a conventional compressed air source or coolant fluid source. Similarly, the timer unit may be used to measure the amount of time the compressed air is applied to the first and second heating/cooling members. Once the allotted time is reached, the compressed air is turned off. Again, this can be controlled by the control system or manually controlled. When compressed air or dolling fluid is applied, it may be applied for at least 1 second, optionally 1 to 30 seconds, optionally 5 to 20 seconds, and alternately for about 10 to 15 seconds. Once cooled, the sheets may be removed from between the welder device.

Accordingly, the present invention provides a patient support that provides a mattress with inflatable support bladders that offer improved immersion of the patient into the surface of the mattress and, therefore, improved pressure distribution to the patient. Further, given the unitary nature of the support bladders, the need for tubing can be reduced if not eliminated to some degree.

While several forms of the invention have been shown and described, other changes and modifications will be appreciated by those skilled in the relevant art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

We claim:

1. A patient support comprising:

a mattress having an inflatable bladder, said inflatable bladder having a cavity and an upper bladder wall forming an outwardly facing side for facing and supporting the patient on the patient mattress and forming an inwardly facing side facing into said cavity;

a light transmitter operable to emit light through said cavity to impinge on said inwardly facing side of said upper bladder wall;

a light receiver operable to detect the light after only a single reflection from said inwardly facing side of said upper bladder wall, and said light receiver generating a signal responsive to detecting the single reflection of light from said inwardly facing side of said upper bladder wall; and a controller in communication with said light transmitter and being operable to determine immersion of a patient into said mattress based on said signal from said light receiver.

2. The patient support according to claim 1, wherein said mattress includes groups of said inflatable bladder, at least two bladders in one group of said groups each having said light transmitter and said light receiver associated therewith, and said controller in communication with each of said light receivers and being operable to determine the degree of immersion in said one group based on said signals from said light receivers.

3. The patient support according to claim 1, wherein said mattress includes groups of said inflatable bladder, and wherein said groups comprise zones of said mattress.

4. The patient support according to claim 2, wherein at least one bladder in each one zone includes said light transmitter and said receiver, and said controller in communication with each of said receivers and being operable to determine the degree of immersion in each zone of said zone of said mattress.

5. The patient support according to claim 1, wherein said controller converts said signals from said receiver into immersion values.

6. The patient support according to claim 5, wherein said controller compares said immersion values to stored values stored in memory of a memory device.

7. The patient support according to claim 5, wherein said memory device stores said immersion values.

8. The patient support according to claim 5, wherein said controller is configured to display said immersion values.

9. The patient support according to claim 1, wherein the light transmitter is located in said cavity.

10. The patient support according to claim 9, wherein the light receiver is located in said cavity.

11. The patient support according to claim 1, wherein said bladder includes a reflective coating on said inwardly facing side of said upper bladder wall.

12. The patient support according to claim 1, wherein said light transmitter comprises a light emitting diode.

13. The patient support according to claim 5, further comprising a display.

14. A patient support comprising:

a mattress having an inflatable bladder, said inflatable bladder having a cavity and an upper bladder wall forming an outwardly facing side for facing and supporting the patient on the patient mattress and forming an inwardly facing side facing into said cavity;

a light transmitter operable to emit light through said cavity to impinge on said inwardly facing side of said upper bladder wall;

a light receiver operable to detect a reflection of the light from said inwardly facing side of said bladder wall, and said light receiver generating a signal responsive to detecting the reflection;

a controller in communication with said light transmitter and being operable to determine immersion of a patient into said mattress based on said signal from said light receiver, wherein said controller converts said signals from said receiver into immersion values; and a display, wherein said controller is configured to display an immersion map of said mattress at said display.

15. The patient support according to claim 13, wherein said display is configured to provide a user interface to control said mattress.

16. A method of forming a patient mattress comprising the steps of:

forming a bladder having a cavity and an upper bladder wall, the upper bladder wall forming an outwardly facing side for facing and supporting the patient on the patient mattress and forming an inwardly facing side facing into said cavity;

locating a light transmitter relative to said bladder, the light transmitter being located and operable to emit light through the cavity to impinge on the inwardly facing side of the upper bladder wall;

locating a light receiver operable to detect the light after reflecting only once off the inwardly facing side of said upper bladder wall, and the light receiver operable to generate a signal responsive to detecting the light after reflecting only once from the inwardly facing side of the upper bladder wall; and providing a controller in communication with the light transmitter and being operable to determine immersion of a patient into the mattress based on the signal received by the light receiver.

17. The method according to claim 16, wherein said locating the light transmitter includes locating the light transmitter in the cavity.

18. The method according to claim 17, wherein said locating the light receiver includes locating the light receiver in the cavity.

19. The method according to claim 16, wherein said locating the light receiver and locating the light transmitter includes locating the light receiver and the light transmitter on a common substrate.

20. The method according to claim 16, wherein said forming the bladder includes forming the bladder with a reflective coating on the inwardly facing side of the upper bladder wall.

* * * * *